US011295256B2

(12) United States Patent
Whitman et al.

(10) Patent No.: US 11,295,256 B2
(45) Date of Patent: Apr. 5, 2022

(54) METHODS AND DEVICES FOR DECOMMISSIONING MICROCLIMATE SENSORS

(71) Applicant: DIVERT, INC., Concord, MA (US)

(72) Inventors: Nicholas L. Whitman, Lincoln, MA (US); Ryan R. Begin, Harvard, MA (US)

(73) Assignee: DIVERT, INC., Concord, MA (US)

( * ) Notice: Subject to any disclaimer, the term of this patent is extended or adjusted under 35 U.S.C. 154(b) by 0 days.

(21) Appl. No.: 17/028,498

(22) Filed: Sep. 22, 2020

(65) Prior Publication Data

US 2021/0081889 A1 Mar. 18, 2021

Related U.S. Application Data

(63) Continuation of application No. 17/025,756, filed on Sep. 18, 2020.
(Continued)

(51) Int. Cl.
*G06Q 10/06* (2012.01)
*G06K 9/00* (2006.01)
(Continued)

(52) U.S. Cl.
CPC ....... *G06Q 10/06315* (2013.01); *G01K 1/024* (2013.01); *G06K 9/00671* (2013.01);
(Continued)

(58) Field of Classification Search
None
See application file for complete search history.

(56) References Cited

U.S. PATENT DOCUMENTS 3,291,364 A 12/1966 Fischer
3,374,915 A 3/1968 Verhein et al.
(Continued)

FOREIGN PATENT DOCUMENTS

CA 2592214 A1 12/2007
DE 102007051403 A1 4/2008
(Continued)

OTHER PUBLICATIONS

Aung, Myo Min, and Yoon Seok Chang. "Temperature management for the quality assurance of a perishable food supply chain." Food Control 40 (2014): 198-207. (Year: 2014).*
(Continued)

*Primary Examiner* — Brian M Epstein
*Assistant Examiner* — Derick J Holzmacher
(74) *Attorney, Agent, or Firm* — GTC Law Group PC & Affiliates

(57) ABSTRACT

Methods and devices for decommissioning micro-climate sensors for generating product flow data for each of a plurality of items of sale flowing through a supply chain are disclosed. An example device may include an opening for receiving at least one micro-climate sensor and a space for storing the sensor. The device may further include a plurality of sensors operative to detect a presence of the at least one micro-climate sensor, and a sensor decommission circuit to generate a decommission command value in response to detection of the at least one micro-climate sensor.

21 Claims, 58 Drawing Sheets

Related U.S. Application Data

(60) Provisional application No. 62/902,175, filed on Sep. 18, 2019.

(51) Int. Cl.
| | |
|---|---|
| *G06Q 30/06* | (2012.01) |
| *G06Q 10/08* | (2012.01) |
| *G06Q 10/00* | (2012.01) |
| *G06Q 30/00* | (2012.01) |
| *G06Q 50/02* | (2012.01) |
| *G06Q 30/02* | (2012.01) |
| *G06Q 50/28* | (2012.01) |
| *G01K 1/024* | (2021.01) |
| *B25J 9/16* | (2006.01) |
| *G06N 20/00* | (2019.01) |
| *G06Q 20/20* | (2012.01) |

(52) U.S. Cl.
CPC ... *G06Q 10/0633* (2013.01); *G06Q 10/06393* (2013.01); *G06Q 10/06395* (2013.01); *G06Q 10/087* (2013.01); *G06Q 10/0832* (2013.01); *G06Q 10/0833* (2013.01); *G06Q 10/30* (2013.01); *G06Q 30/0185* (2013.01); *G06Q 30/0201* (2013.01); *G06Q 30/0206* (2013.01); *G06Q 30/0223* (2013.01); *G06Q 30/0627* (2013.01); *G06Q 50/02* (2013.01); *G06Q 50/28* (2013.01); *B25J 9/1697* (2013.01); *G06N 20/00* (2019.01); *G06Q 20/202* (2013.01); *G06Q 20/203* (2013.01)

(56) References Cited

U.S. PATENT DOCUMENTS

| | | | |
|---|---|---|---|
| 4,273,500 A | 6/1981 | Yates et al. | |
| 4,750,197 A | 6/1988 | Denekamp et al. | |
| 4,949,898 A | 8/1990 | Nederveld | |
| 5,161,709 A | 11/1992 | Oestreich | |
| 5,426,284 A | 6/1995 | Doyle | |
| 5,818,346 A | 10/1998 | Goodwin, III et al. | |
| 5,903,457 A | 5/1999 | Chang | |
| 6,182,849 B1 | 2/2001 | Elstone | |
| 6,216,899 B1 | 4/2001 | Vicari | |
| 6,439,345 B1 | 8/2002 | Recktenwald et al. | |
| 6,902,061 B1 | 6/2005 | Elstone | |
| 7,689,465 B1 | 3/2010 | Shakes et al. | |
| 7,791,485 B2 * | 9/2010 | Lahiri | G06K 17/00 |
| | | | 340/572.3 |
| 8,165,891 B2 | 4/2012 | Roberts | |
| 9,081,857 B1 * | 7/2015 | Huet | G06F 16/951 |
| 9,120,621 B1 | 9/2015 | Curlander et al. | |
| 9,174,883 B2 | 11/2015 | Begin et al. | |
| 9,216,857 B1 | 12/2015 | Kalyan et al. | |
| 10,005,587 B2 | 6/2018 | Whitman et al. | |
| 10,049,236 B1 * | 8/2018 | Alkarmi | G06Q 10/08 |
| 10,273,046 B2 | 4/2019 | Whitman et al. | |
| 10,556,722 B2 | 2/2020 | Whitman et al. | |
| 10,713,621 B2 * | 7/2020 | Bogolea | G06K 9/2018 |
| 10,730,662 B2 | 8/2020 | Whitman et al. | |
| 10,829,270 B2 | 11/2020 | Whitman et al. | |
| 10,853,760 B2 * | 12/2020 | Feiner | G06Q 10/0832 |
| 2001/0019056 A1 | 9/2001 | Rosenfeldt | |
| 2002/0038267 A1 | 3/2002 | Can et al. | |
| 2003/0067414 A1 | 4/2003 | Cole et al. | |
| 2004/0054634 A1 * | 3/2004 | Tak | G06Q 30/0283 |
| | | | 705/400 |
| 2004/0238400 A1 | 12/2004 | Knutsson et al. | |
| 2005/0080520 A1 | 4/2005 | Kline et al. | |
| 2005/0254732 A1 | 11/2005 | Eisenbarth | |
| 2006/0015289 A1 | 1/2006 | Shakman et al. | |
| 2006/0080819 A1 | 4/2006 | McAllister | |
| 2006/0087436 A1 * | 4/2006 | Reddy | G06K 19/07767 |
| | | | 340/572.3 |
| 2006/0106742 A1 | 5/2006 | Bochicchio et al. | |
| 2006/0255951 A1 | 11/2006 | Roeder et al. | |
| 2007/0020410 A1 | 1/2007 | Sasine et al. | |
| 2007/0055586 A1 | 3/2007 | Lucas | |
| 2007/0185751 A1 | 8/2007 | Dempers | |
| 2007/0210923 A1 | 9/2007 | Butler et al. | |
| 2007/0222600 A1 | 9/2007 | Reeves et al. | |
| 2008/0020456 A1 | 1/2008 | Choate et al. | |
| 2008/0035561 A1 | 2/2008 | Gray (Gabb) et al. | |
| 2008/0059383 A1 | 3/2008 | Mayernik et al. | |
| 2008/0294488 A1 * | 11/2008 | Gupta | G06Q 10/087 |
| | | | 705/7.26 |
| 2009/0187583 A1 | 7/2009 | Pape et al. | |
| 2010/0002224 A1 | 1/2010 | Vincent et al. | |
| 2010/0267102 A1 | 10/2010 | Begin et al. | |
| 2010/0299097 A1 | 11/2010 | Threlkeld et al. | |
| 2011/0040660 A1 | 2/2011 | Allison et al. | |
| 2011/0084840 A1 * | 4/2011 | Mercier | G07C 9/28 |
| | | | 340/572.1 |
| 2011/0168593 A1 | 7/2011 | Neufeld et al. | |
| 2011/0218670 A1 | 9/2011 | Bell et al. | |
| 2012/0075071 A1 | 3/2012 | Liu et al. | |
| 2012/0095823 A1 * | 4/2012 | Tak | G06Q 10/087 |
| | | | 705/14.38 |
| 2012/0271740 A1 * | 10/2012 | Connors | G06Q 10/087 |
| | | | 705/28 |
| 2012/0303492 A1 * | 11/2012 | Connors | G06Q 10/0833 |
| | | | 705/28 |
| 2013/0214938 A1 * | 8/2013 | Kim | G06Q 30/00 |
| | | | 340/870.07 |
| 2014/0180953 A1 | 6/2014 | Westcott et al. | |
| 2014/0222521 A1 * | 8/2014 | Chait | G06Q 10/0637 |
| | | | 705/7.36 |
| 2014/0222522 A1 * | 8/2014 | Chait | G06Q 10/0637 |
| | | | 705/7.36 |
| 2014/0261189 A1 * | 9/2014 | Chait | A01K 43/00 |
| | | | 119/6.8 |
| 2014/0273178 A1 | 9/2014 | Lesueur et al. | |
| 2014/0278630 A1 | 9/2014 | Gates et al. | |
| 2014/0279600 A1 * | 9/2014 | Chait | G06Q 30/018 |
| | | | 705/317 |
| 2014/0313055 A1 * | 10/2014 | Warkentin | G01N 33/02 |
| | | | 340/870.16 |
| 2014/0379588 A1 | 12/2014 | Gates et al. | |
| 2015/0066570 A1 | 3/2015 | Hellen et al. | |
| 2015/0114061 A1 | 4/2015 | Eten et al. | |
| 2015/0324760 A1 | 11/2015 | Borowski et al. | |
| 2015/0348252 A1 | 12/2015 | Mask | |
| 2016/0012337 A1 * | 1/2016 | Kaye | G06N 20/00 |
| | | | 706/12 |
| 2016/0019497 A1 | 1/2016 | Carvajal | |
| 2017/0008671 A1 | 1/2017 | Whitman et al. | |
| 2017/0010149 A1 | 1/2017 | Whitman et al. | |
| 2017/0011276 A1 * | 1/2017 | Mehring | G06K 9/4652 |
| 2017/0011362 A1 | 1/2017 | Whitman et al. | |
| 2017/0011363 A1 | 1/2017 | Whitman et al. | |
| 2017/0011364 A1 | 1/2017 | Whitman et al. | |
| 2017/0011580 A1 | 1/2017 | Huang et al. | |
| 2017/0193434 A1 * | 7/2017 | Shah | G06K 9/00664 |
| 2017/0200135 A1 | 7/2017 | Whitman et al. | |
| 2017/0224552 A1 | 8/2017 | Lavon et al. | |
| 2017/0255901 A1 * | 9/2017 | Bermudez Rodriguez | G06Q 10/0833 |
| 2017/0262910 A1 * | 9/2017 | Allen | G06Q 10/087 |
| 2017/0300856 A1 * | 10/2017 | Wilkinson | G06K 19/0717 |
| 2017/0330207 A1 | 11/2017 | Labrie et al. | |
| 2017/0344935 A1 | 11/2017 | Mattingly et al. | |
| 2017/0363349 A1 * | 12/2017 | McHale | F25D 29/003 |
| 2018/0005295 A1 * | 1/2018 | Howell | G06Q 30/0631 |
| 2018/0007453 A1 | 1/2018 | Taylor | |
| 2018/0046975 A1 | 2/2018 | Jones et al. | |
| 2018/0068532 A1 | 3/2018 | Jones et al. | |
| 2018/0107576 A1 * | 4/2018 | Walden | H04W 4/02 |
| 2018/0109928 A1 * | 4/2018 | Walden | G06T 7/70 |
| 2018/0114415 A1 * | 4/2018 | Mattingly | H04Q 9/00 |
| 2018/0155080 A1 | 6/2018 | Whitman et al. | |
| 2018/0189725 A1 * | 7/2018 | Mattingly | G06K 19/0723 |

(56) References Cited

U.S. PATENT DOCUMENTS

| | | | |
|---|---|---|---|
| 2018/0196401 A1* | 7/2018 | Lagares-Greenblatt | ..................... G06Q 50/00 |
| 2018/0224150 A1* | 8/2018 | Lewis | ................... F25D 29/008 |
| 2018/0374127 A1* | 12/2018 | Walden | .............. G01G 19/4144 |
| 2019/0112102 A1 | 4/2019 | Whitman et al. | |
| 2019/0112103 A1 | 4/2019 | Whitman et al. | |
| 2019/0112104 A1 | 4/2019 | Whitman et al. | |
| 2019/0147396 A1* | 5/2019 | Bohling | ................... G06N 5/04 705/28 |
| 2019/0149725 A1* | 5/2019 | Adato | ................ H04N 1/32144 348/158 |
| 2019/0164128 A1* | 5/2019 | Millhouse | ........ G06Q 10/06312 |
| 2019/0213532 A1* | 7/2019 | Brightwell | ......... G06Q 30/0637 |
| 2019/0215424 A1* | 7/2019 | Adato | .................... G06Q 50/28 |
| 2019/0235538 A1* | 8/2019 | Yost | .................... G06Q 10/0832 |
| 2019/0236531 A1* | 8/2019 | Adato | ................ G06K 9/00771 |
| 2019/0263219 A1* | 8/2019 | Spath | ................. G06Q 10/0832 |
| 2019/0264976 A1* | 8/2019 | Kim | ........................ F25D 29/00 |
| 2019/0285603 A1* | 9/2019 | Velez | ..................... G06Q 10/04 |
| 2019/0287055 A1* | 9/2019 | Wicks | ..................... G06Q 10/087 |
| 2019/0385115 A1* | 12/2019 | Biermann | .............. G01K 1/024 |
| 2020/0051040 A1 | 2/2020 | Whitman et al. | |
| 2020/0097776 A1* | 3/2020 | Kim | ...................... G06K 9/6267 |
| 2020/0218296 A1* | 7/2020 | Tiwari | ................. G01N 21/255 |
| 2020/0286032 A1* | 9/2020 | Bogolea | ................. G06K 9/033 |
| 2020/0361659 A1 | 11/2020 | Whitman et al. | |
| 2021/0081867 A1 | 3/2021 | Whitman et al. | |
| 2021/0081868 A1 | 3/2021 | Whitman et al. | |
| 2021/0081883 A1 | 3/2021 | Whitman et al. | |
| 2021/0081966 A1 | 3/2021 | Whitman et al. | |
| 2021/0082022 A1 | 3/2021 | Whitman et al. | |
| 2021/0117918 A1* | 4/2021 | Bogolea | ................. H04N 7/181 |

FOREIGN PATENT DOCUMENTS

| | | | |
|---|---|---|---|
| EP | 2419384 A4 | 8/2014 | |
| WO | 2008049582 A3 | 6/2009 | |
| WO | 2010121197 A1 | 10/2010 | |
| WO | 2012069839 A1 | 5/2012 | |
| WO | 2016109563 A1 | 7/2016 | |
| WO | WO-2016109563 A1 * | 7/2016 | ............ G01N 33/02 |
| WO | 2017007913 A1 | 1/2017 | |
| WO | 2017068569 A1 | 4/2017 | |
| WO | WO-2017068569 A1 * | 4/2017 | ........... G06Q 10/087 |
| WO | 2019094085 A1 | 5/2019 | |
| WO | WO-2019094085 A1 * | 5/2019 | ............... G06N 5/04 |
| WO | 2019139779 A1 | 7/2019 | |
| WO | WO-2019139779 A1 * | 7/2019 | ......... G06Q 30/0637 |
| WO | 2019178425 A1 | 9/2019 | |
| WO | WO-2019178425 A1 * | 9/2019 | ......... G06Q 30/0283 |
| WO | 2019245717 A1 | 12/2019 | |
| WO | WO-2019245717 A1 * | 12/2019 | ............ G01K 1/024 |
| WO | 2021055812 A1 | 3/2021 | |

OTHER PUBLICATIONS

Kim, Woo Ram, et al. "Freshness Gauge based cold storage management: A method for adjusting temperature and humidity levels for food quality." Food Control 47 (2015): 510-519. (Year: 2015).*

Kaya, Aydin, et al. "Sensor failure tolerable machine learning-based food quality prediction model." Sensors 20.11 (2020): 3173. (Year: 2020).*

Bowman, Paul, et al. "Sensor based condition monitoring." Building radio frequency identification for the global environment (Bridge) Euro RFID project (2009). (Year: 2009).*

Aung, et al., "Temperature management for the quality assurance of a perishable food supply chain", Food Control 40, 2014, 99. 198-207.

Heising, "Intelligent packaging for monitoring food quality: a case study on fresh fish", Wageningen University, Apr. 16, 2014, 27 pages.

Kaya, et al., "Sensor failure tolerable machine learning-based food quality prediction model", Sensors 20.11, 2020, 18 pages.

Kim, et al., "Freshness Gauge based cold storage management: A method for adjusting temperature and humidity levels". Food Control 47, 2015, pp. 510-519.

Nassar, et al., "Compliant plant wearables for localized microclimate and plant growth monitoring", Flexible Electronics, Sep. 10, 2018, 12 pages.

PCT/US2020/051585, "International Application Serial No. PCT/US2020/051585, International Search Report and Written Opinion dated Feb. 3, 2021", Divert, Inc., 36 pages.

PCT/US2020/051585, "International Application Serial No. PCT/US2020/051585, Invitation to Pay Additional Fees and, Where Applicable, Protest Fee dated Oct. 5, 2020", Divert, Inc., 2 pages.

SGS, "Improving the Meat Supply Chain, From Farm to Retailer", <https://www.sgs.com/en/news/2014/03/improving-the-meat-supply-chain-from-farm-to-retailer>, Mar. 31, 2014, 4 pages.

Biogen, "Anaerobic Digestion of Farm and Food Processing residues", p. 1-55.

Cicek, "Membrane Bioreactors in the Treatment of Wastewater Generated from Agricultural Industries and Activities", p. 1-32.

Featsent, "Food Donation A Restaurateur's Guide", National Restaurant Association, Nov. 2007, 50 pages.

George, "Focus on Anaerobic Digestion", p. 1-4.

PCT/US2016/041300, "Application Serial No. PCT/US2016/041300, International Search Report and Written Opinion dated Sep. 30, 2016", Feed Resource Recovery, Inc., 10 pages.

PCT/US2016/041300, "International Application Serial No. PCT/US2016/041300, International Preliminary Report on Patentability and Written Opinion dated Jan. 18, 2018", Divert, Inc., 8 Pages.

Pye-Smith, et al., "Transporting food", p. 1-5.

U.S. Appl. No. 16/985,523, filed Aug. 5, 2020, Pending, Nicholas L. Whitman.

U.S. Appl. No. 17/025,756, filed Sep. 18, 2020, Pending, Nicholas L. Whitman.

* cited by examiner

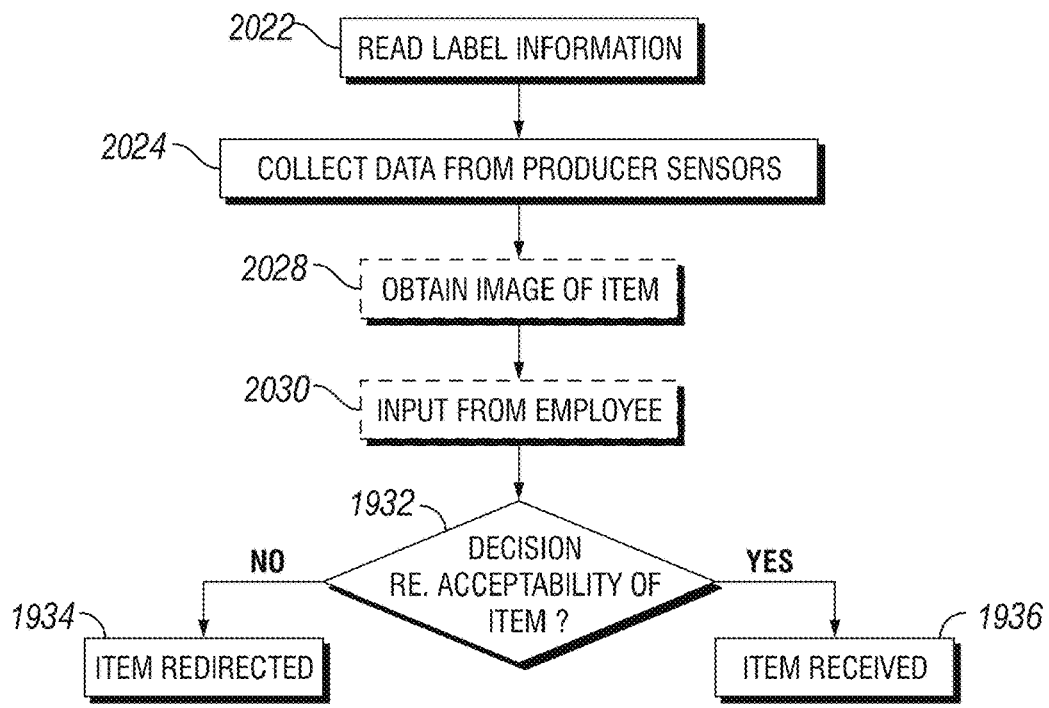
FIG. 20
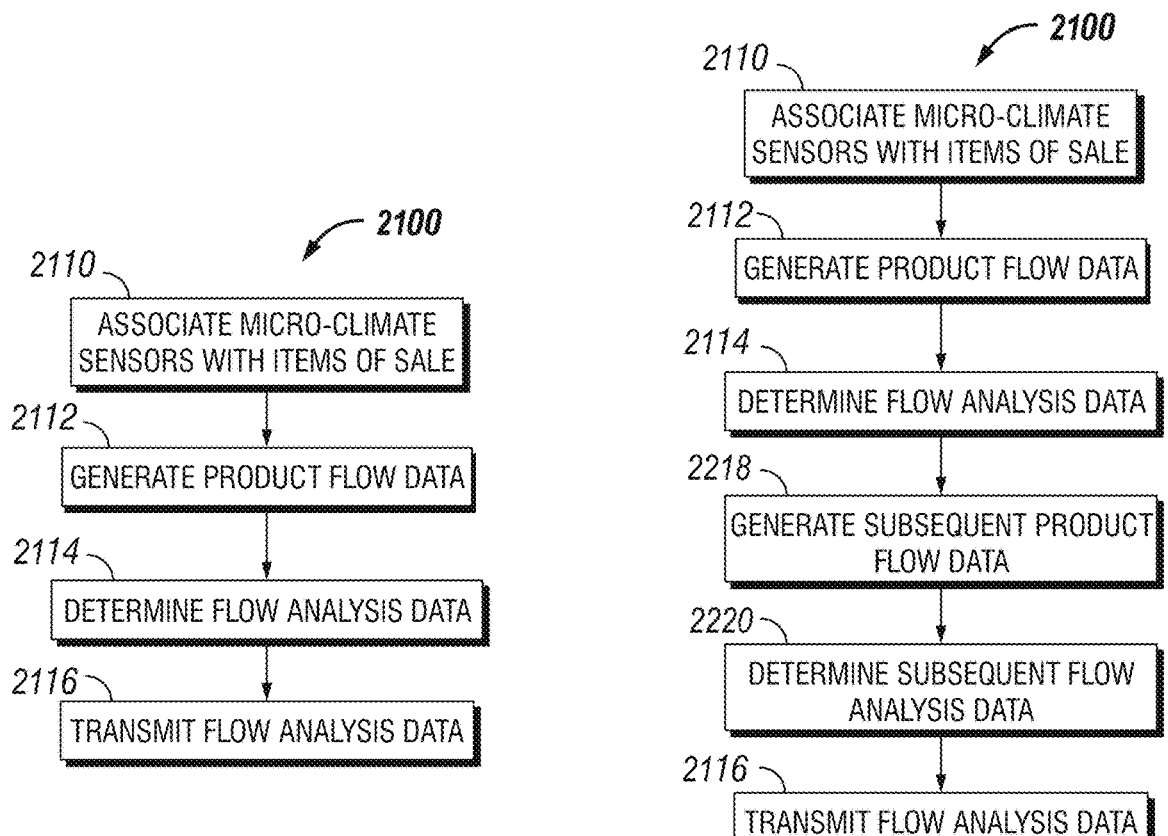
FIG. 21
FIG. 22

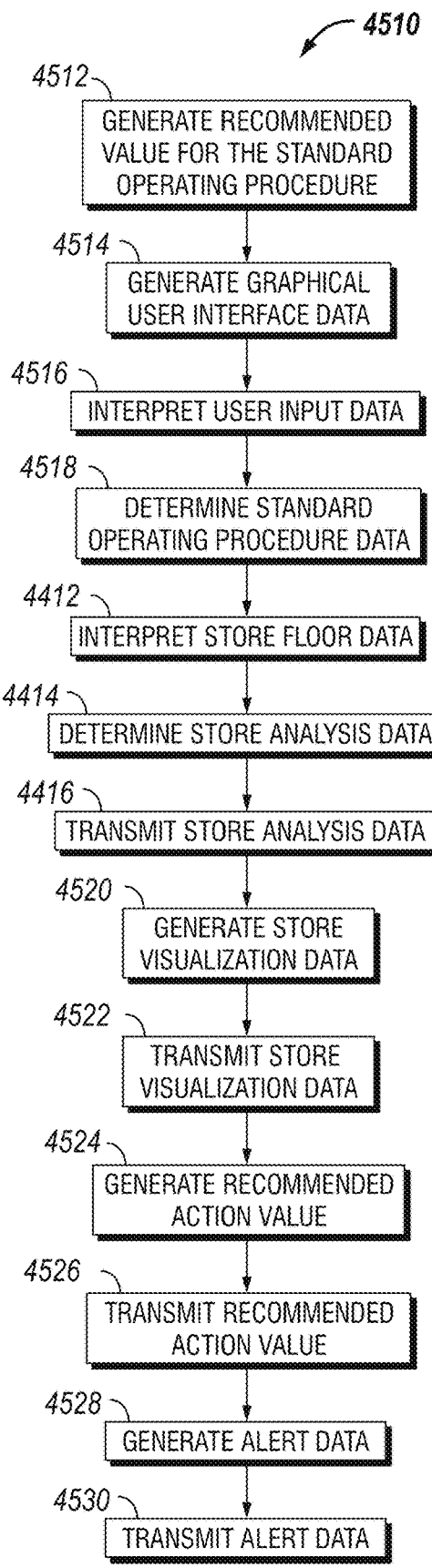
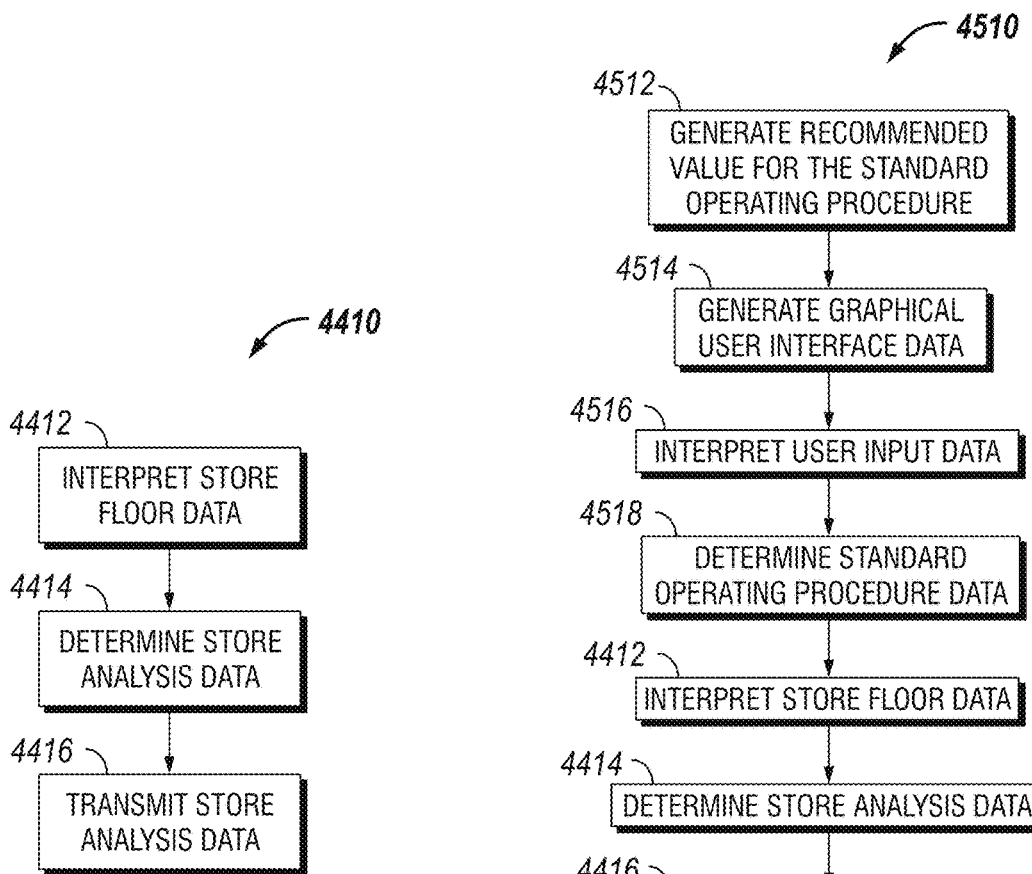
FIG. 44
FIG. 45

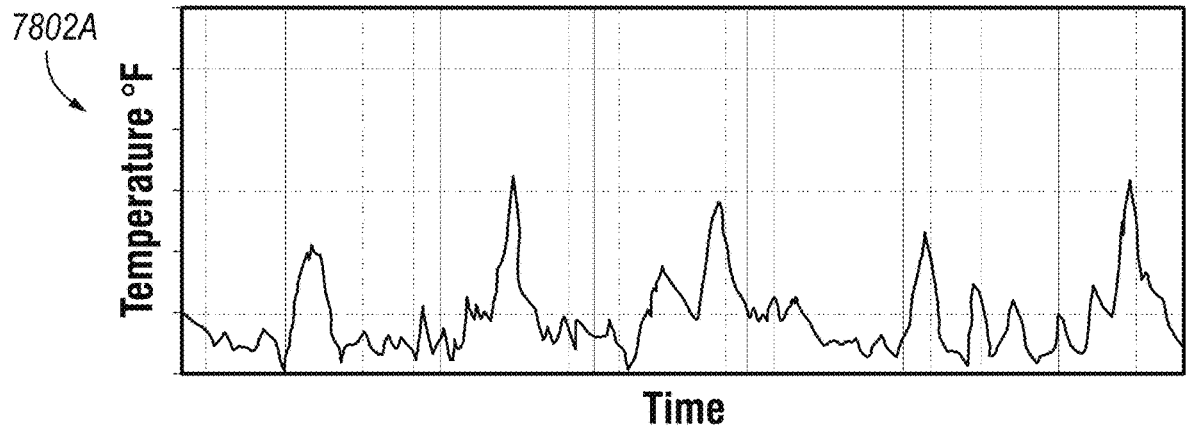
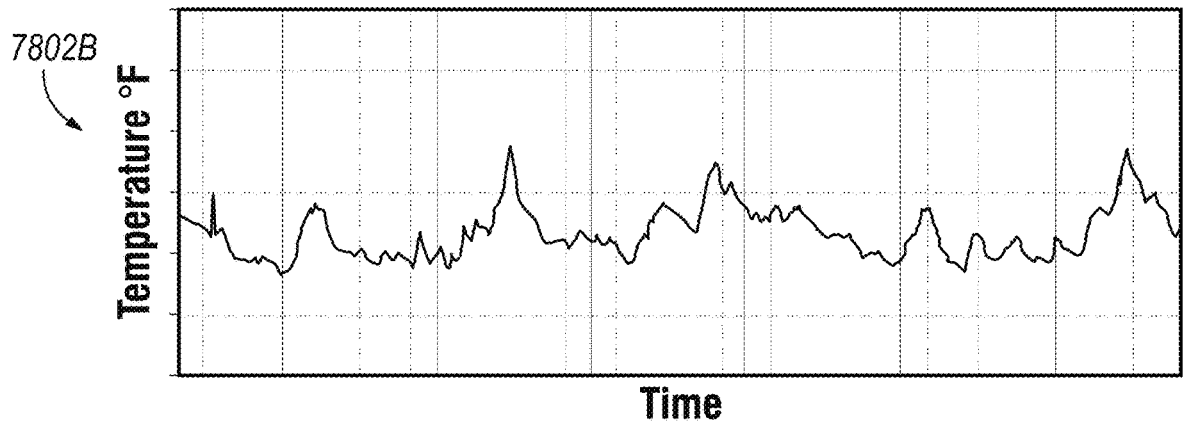
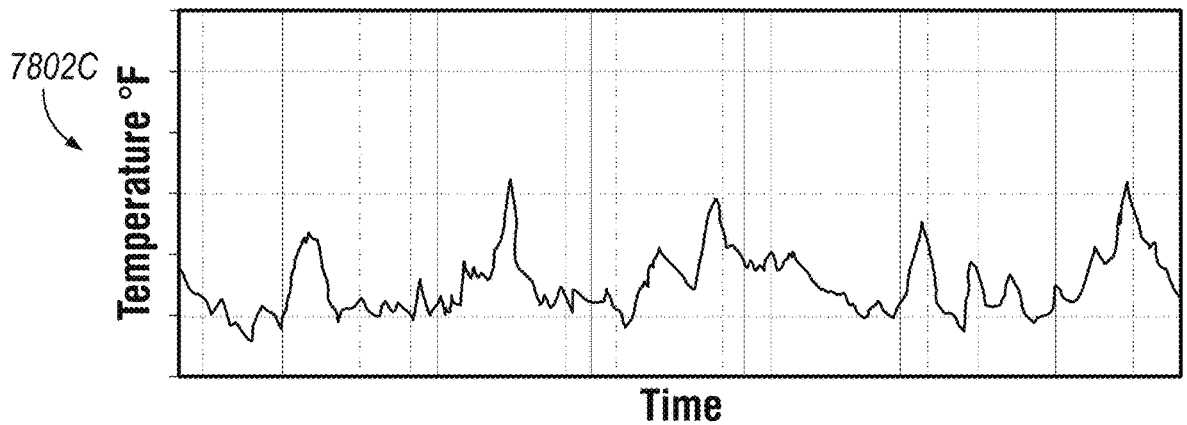
FIG. 78

Fresh Vision Report - Store XXX
14 OCT - OCT 20

| DESCRIPTION | ITEM CODE | CATEGORY | TOTAL DISPOSITIONED |
|---|---|---|---|
| PEACHES | YYYY | STONE FRUITS | 70 |
| STRAWBERRY 1LB | YYYY | BERRIES | 61 |
| PLUMBS | YYYY | STONE FRUITS | 60 |
| RED RASPBERRIES 6OZ | YYYY | BERRIES | 32 |
| GUAVAS | YYYY | TROPICAL EXOTIC FRUIT | 17 |
| ORG RUSSET POT 6Z | YYYY | POTATOES | 15 |
| BARTLETT PEARS | YYYY | PEARS | 15 |
| RED GRAPES | YYYY | GRAPES | 14 |
| 2LB STRAWBERRY | YYYY | BERRIES | 11 |
| FRUIT TRAY | YYYY | VALUE ADDED FRUIT | 10 |

*FIG. 81*

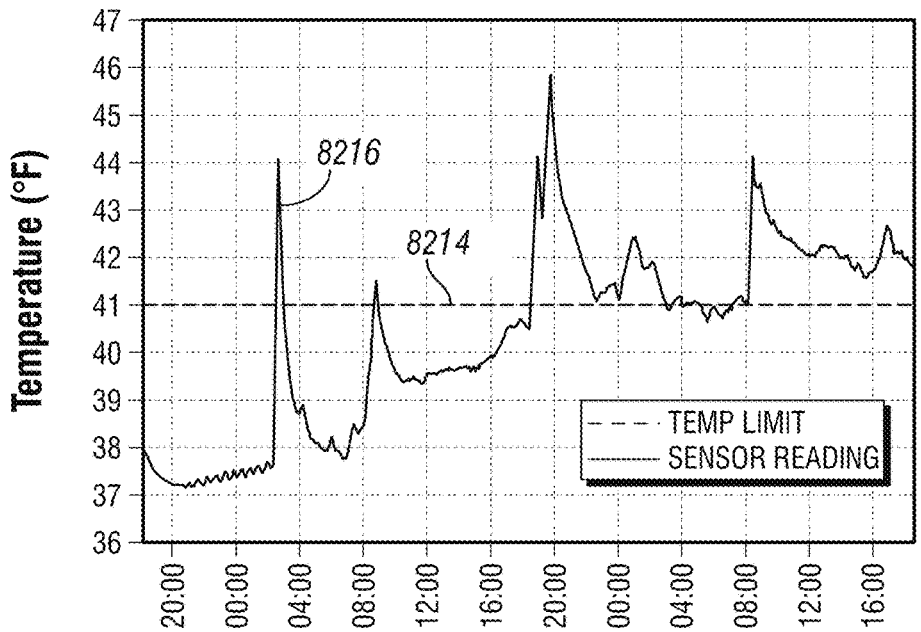

*FIG. 82*

METHODS AND DEVICES FOR DECOMMISSIONING MICROCLIMATE SENSORS

CROSS-REFERENCE TO RELATED APPLICATIONS

This application is a continuation of U.S. Nonprovisional patent application Ser. No. 17/025,756, filed Sep. 18, 2020, and entitled "SYSTEMS AND METHODS FOR TRACKING PRODUCT ENVIRONMENT THROUGHOUT A SUPPLY CHAIN."

U.S. Nonprovisional patent application Ser. No. 17/025,756 claims the benefit of priority to U.S. Provisional Patent Application Ser. No. 62/902,175, filed Sep. 18, 2019, and entitled "SYSTEMS AND METHODS FOR MONITORING PERISHABLE GOODS".

Each of the foregoing applications is incorporated herein by reference in its entirety.

BACKGROUND

Field

This system relates to monitoring quality of perishable goods/items throughout the distribution and retail lifecycles.

Description of the Related Art

Current approaches produce limited data regarding perishable items because all aspects of the item's lifecycle are not monitored, reported, or otherwise analyzed. There is a need for a system to monitor the variable conditions to which items are exposed as they move from a distribution center to a retail location, and then through and after disposition. Further, there remains a need to provide retailers with insight into the quality of goods being received, the quality of goods being disposed of, and assistance in identifying contributory factors related to the quality of the item.

SUMMARY

Currently, there is a need to provide retailers with insight and data regarding how foods or goods are being handled and their environment throughout their life cycle, from a point of production, such as a farm, through transportation, and distribution center, to a store display case, including in store handling. Further, a retailer would benefit from being able to link the environmental and handling data to information regarding standard operating procedures (SOPs), human behavior and potential deviations from SOPs. While there are some systems that may provide information at specific points in time, e.g., the temperature of a freezer, or a transport vehicle, this data is not linked with human behavior. There is a need to be able to link the environmental data to SOPs and human behavior to facilitate the ability to take corrective action based on the data.

An example method for monitoring and reporting on the condition of a plurality of individual items of sale throughout a supply chain may include associating at least one micro-climate sensor with a corresponding individual item of sale in the plurality and then generating, via the plurality of micro-climate sensors, product flow data for each corresponding item of sale. In some embodiments, the reference to micro-climate sensors may include mobile sensors and/or facility sensors. Mobile sensors may include micro-climate sensors that are mobile and travel with their corresponding individual item of sale for a period of time. Facility sensors may include micro-climate sensors that remain stationary and provide data regarding environment, and/or equipment related data, e.g., power usage of a cooler, associated with the items of sale. The example method may further include determining flow analysis data from the product flow data for each corresponding item of sale and transmitting the flow analysis data.

An example apparatus may include a product flow data processing circuit to interpret product flow generated from each of a plurality of items of sale flowing through a supply chain and a standard operating procedure (SOP) data processing circuit to interpret SOP data. The example apparatus may further include a flow analysis circuit to determine flow analysis data in response to the product flow data, and an SOP deviation circuit to determine deviation data based at least in part on the flow analysis data and the SOP data, wherein the deviation data indicates a deviation from the SOP data. The example apparatus may further include a deviation provisioning circuit structured to transmit the deviation data.

An example method may include associating at least one micro-climate sensor with a corresponding item of sale of a first plurality of items of sale, generating, via the at least one micro-climate sensor, first product flow data for the first plurality of items of sale while flowing through a supply chain, and removing of the at least one micro-climate sensor from the corresponding item of sale of the first plurality. The example method may further include associating the at least one micro-climate sensor with a corresponding item of sale of a second plurality of items of sale, generating, via the at least one micro-climate sensor, second product flow data for each of the second plurality of items of sale while flowing through the supply chain, and determining product flow analysis data based on the first and the second product flow data. The example method may further include transmitting the product flow analysis data.

A method of decommissioning a plurality of micro-climate sensors for generating product flow data for each of a plurality items of sale flowing through a supply chain is disclosed. An example method may include receiving at an opening of a repository device, at least one micro-climate sensor of the plurality, and detecting, via a plurality of sensors, a presence of the at least one micro-climate sensor. An example method may further include generating, in response to detecting the presence of the at least one micro-climate sensor, a decommission command value, transmitting the decommission command value to the at least one micro-climate sensor, wherein the decommission command value transitions the at least one micro-climate sensor to a decommissioned mode, and storing the at least one micro-climate sensor in a space of the repository device.

A store for vending a plurality of items of sale is disclosed. An example store may include a floor with one or more containers disposed on the floor and structured for presenting the plurality of items of sale. The store may further include a plurality of micro-climate sensors disposed on the floor and structured to generate store floor data corresponding to each of the plurality of items of sale. The store may further include a server structured to determine, based at least in part on standard operating procedure (SOP) data corresponding to a SOP of the store, store analysis data from the store floor data. The server may be further structured to transmit the store analysis data, wherein the store analysis data comprises a measure value of the store's compliance with the SOP. The store may further include an in-store network structured to transmit the store floor data from the plurality of micro-climate sensors to the server.

A system is disclosed. An example system may include: an electronic mobile device structured to generate visual disposition data from a plurality of items of sale in a store; and a server. The server of the example system may generate processed disposition data via image processing the visual disposition data, determine disposition analysis data from the processed disposition data, and transmit the disposition analysis data. In the example system, the disposition analysis data may include an indication of a causal event for a disposal of at least one item of sale of the plurality.

A method is disclosed. An example method may include interpreting flow analysis data corresponding to a plurality of items of sale flowing through a supply chain for an entity, and interpreting store analysis data corresponding to the plurality of items of sale while disposed on a floor of a store. The example method may further include interpreting disposition analysis data corresponding to disposal of some of the plurality of items of sale, and determining a score value based at least in part on the flow analysis data, the store analysis data, and the disposition analysis data.

A system is disclosed. An example system may include a first plurality of micro-climate sensors each associated with a corresponding individual item of sale and structured to generate and transmit product flow data of the individual item of sale of a plurality of items of sale flowing through a supply chain for an entity and a second plurality of micro-climate sensors disposed on a floor of a store and structured to generate floor data corresponding to the plurality of items of sale while disposed on the floor. The system may further include: a mobile electronic device structured to generate visual disposition data from at least some of the plurality of items of sale; and a server. The server may be structured to: determine flow analysis data from the product flow data; determine store analysis data from the floor data; and determine a score value based at least in part on the product flow data, the floor data, and the visual disposition data.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures:

FIG. 20 depicts an example work-flow utilizing an in-take system in accordance with an embodiment of the system for product management;

FIG. 21 depicts a method in accordance with an embodiment of the system for product management;

FIG. 22 depicts another method in accordance with an embodiment of the system for product management;

FIG. 44 depicts a method in accordance with an embodiment of the system for product management;

FIG. 45 depicts a method in accordance with an embodiment of the system for product management;

FIG. 78 shows examples of differences in temperature profile based on location in a produce cooler;

FIG. 81 depicts an example of a report that may be generated by the system described herein;

FIG. 82 depicts an example of a report that may be generated by the system described herein.

DETAILED DESCRIPTION

Figure 1:
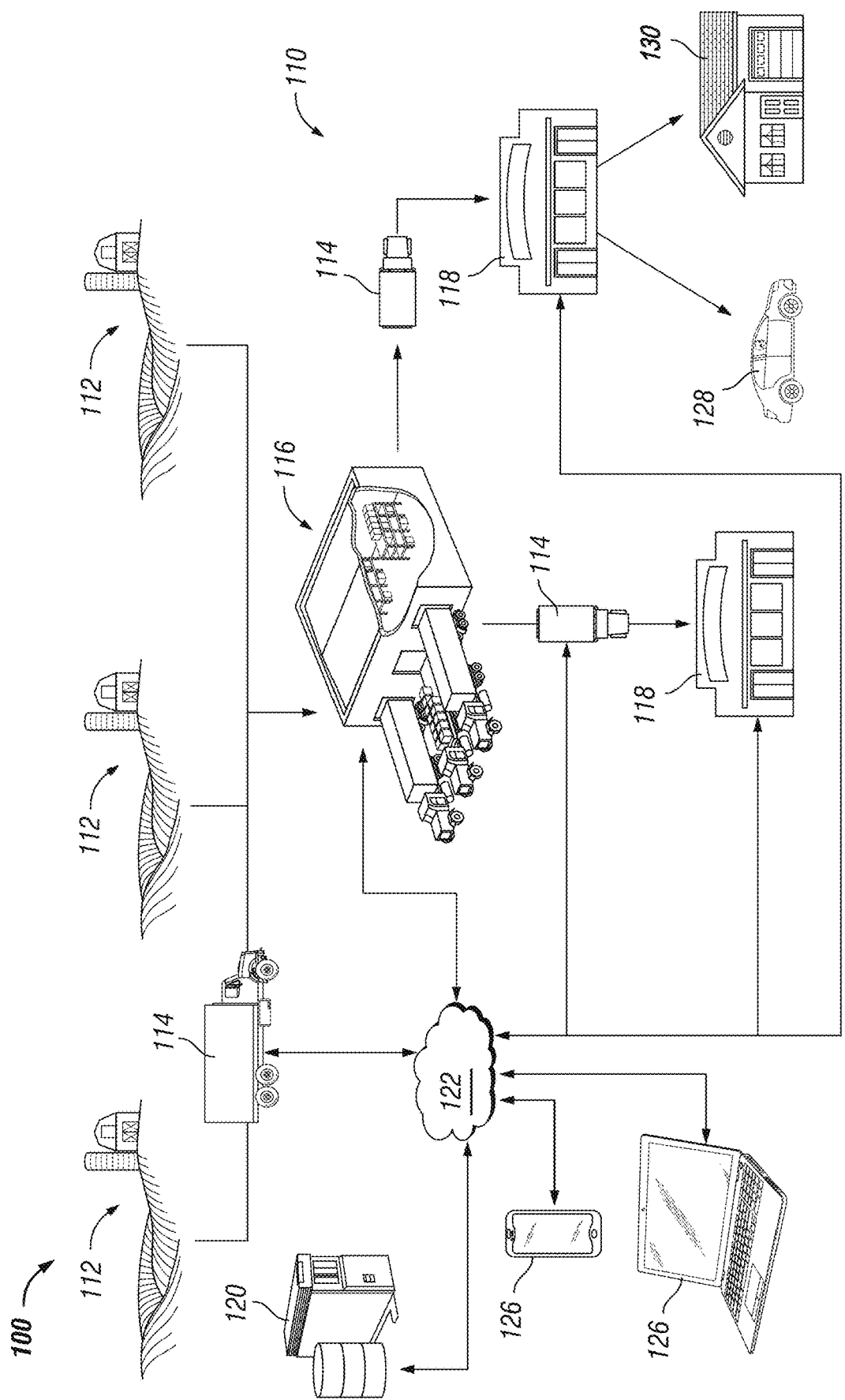
FIG. 1 is a schematic diagram of an embodiment of a system for product management.

References herein to systems, modules, circuits, or engines, are meant to include PCB circuits, ASICS, FPGAs, mixed hardware and software implementations and the like. The term "flowing", as used with respect to an item of sale (and/or product) and a flow chain, refers to the movement of the item of sale across and/or storage at locations/positions of the supply chain, e.g., source, transportation, distribution center, store, a location in a store, a customer location, and/or any location therebetween where items of sale may be acted upon by supply chain staff and/or other entities. A customer location may include a customer in store, a customer's vehicle, a customer's residence or workplace or a location therebetween, and the like. A "sale-improvement" action, as used herein, may include any type of action performed to increase the likelihood that one or more items of sale may be consumed (purchased) by an end user (customer). Non-limiting examples of sale-improvement actions may include moving an item of sale to a new location and/or discounting the item of sale. A "deviation", as used herein, may include any occurrence that is not in conformance with an intended course of action, e.g., a SOP. Non-limiting examples may include delays in a supply chain, exposure of an item of sale to non-SOP compliant environment (e.g. temperature or humidity deviations), excessive storage time of an item of sale in a storage unit, failure to discount an item of sale with respect to a particular time period or event, e.g., failure to coupon a bag of lettuce if it is within X number of days of a corresponding sell-by date or after experiencing a life shortening event. A "product-life shortening event" or "product-quality reducing" event, as used herein, includes any type of occurrence that may reduce the commercial appeal of an item of sale. Non-limiting examples include exposure to non-SOP compliant temperatures and/or handling practices, damage to product packaging and/or a consumable portion of an item of sale, delays in supply chain, etc. "Product flow data" may include any type of data associated with one or more items of sale flowing through a supply chain. Non-limiting examples may include temperatures, humidity, travel and/or storage times, shape, color (e.g., ripeness or bruising) both as a profile over time, cumulative data, summarized data, statistics or derivatives associated with same, and the like. "Flow analysis data", as used herein, may include processed and/or analyzed product flow data. Non-limiting examples include contiguous data with respect to travel and/or storage times, temperatures, ripeness, actionable items, etc. An "actionable item", as used herein, may refer to a combination of different types of data, e.g., temperature, time and location, that provide an indication of causal event and/or process that may result in a deviation. Non-limiting examples may include an indication that items of sale are spending more time on a loading dock than allowed for in a corresponding SOP which is resulting in the items of sale experiencing life-shortening events due to non-SOP compliant temperatures. A "stocking event", as used herein, may include an event involving: loading an item of sale onto transport at a producer (source), receiving an item of sale at a distribution center, storage of an item of sale at a distribution center, packing an item of sale at a distribution center, loading an item of sale onto a transport vehicle at the distribution center, repositioning of an item on the transport vehicle during the movement of the item of sale from the distribution center to the final store location; receiving an item of sale at a store location, moving an item of sale from the receiving dock to an appropriate location (e.g., a freezer, cold store, back room storage, and the like), positioning an item of sale on the display floor, movement of an item of sale between the display floor and a back storage area such as a produce cooler, movement of an item of sale between locations on the display floor, movement of an item of sale as part of assembly of a customer order, transport and holding of a customer order in-store for pick-up, transport of a customer order to a customer site, and/or the like.

Further, while the present disclosure describes a system for product management with respect to perishable goods, it is to be understood that embodiments of the present disclosure may be applicable to other scenarios wherein the conditions surrounding the generation, transport and/or delivery of an item/object need to be monitored.

Referring now to FIG. 1, an embodiment of a product management system is shown 100 for monitoring and/or reporting on the condition of a plurality of individual items of sale 210 (FIG. 2) throughout a supply chain 110 is shown. The supply chain 110 may include one or more sources 112, transportation vehicles 114, distribution centers 116, and/or stores 118, locations in stores, holding area for customer pickup (curbside 128 or in-store), transportation vehicle to a customer's location 130, and locations therebetween. An item of sale 210 may be a commercial product generated by the sources 112. Non-limiting examples of items of sale 210 include produce products, dairy products, meat products, fish products, and/or any other type of consumable product which is subject to spoilage, e.g., perishable, including frozen products. In embodiments, an item of sale 210 may include a discrete amount of a product, e.g., a box of bananas. In embodiments, the item of sale 210 may be a stock keeping unit (SKU). In embodiments, an item of sale 210 may be an entire pallet of a product. In embodiments, wherein the discrete amount is a box or a pallet of product, the product associated with the box or pallet may be of different types.

In embodiments, the sources 112 may be farms, factories, packaging centers, and/or any type of facility that generates an item of sale 210 or a product that will form part of an item of sale 210, e.g., a product prior to be being packaged for shipment and/or sale. Once generated by a source 112, the items of sale 210 may be loaded on to a transportation vehicle 114 for transportation to the distribution center 116 or for transportation directly to a store 118. A store 118 may be any type of facility structured to distribute and/or sell an item of sale 210 to an end consumer of the item of sale 210. Non-limiting examples of stores 118 may include supermarkets, farmer's markets, food pantries, cafeterias, restaurants, and/or food stands.

Figure 2:
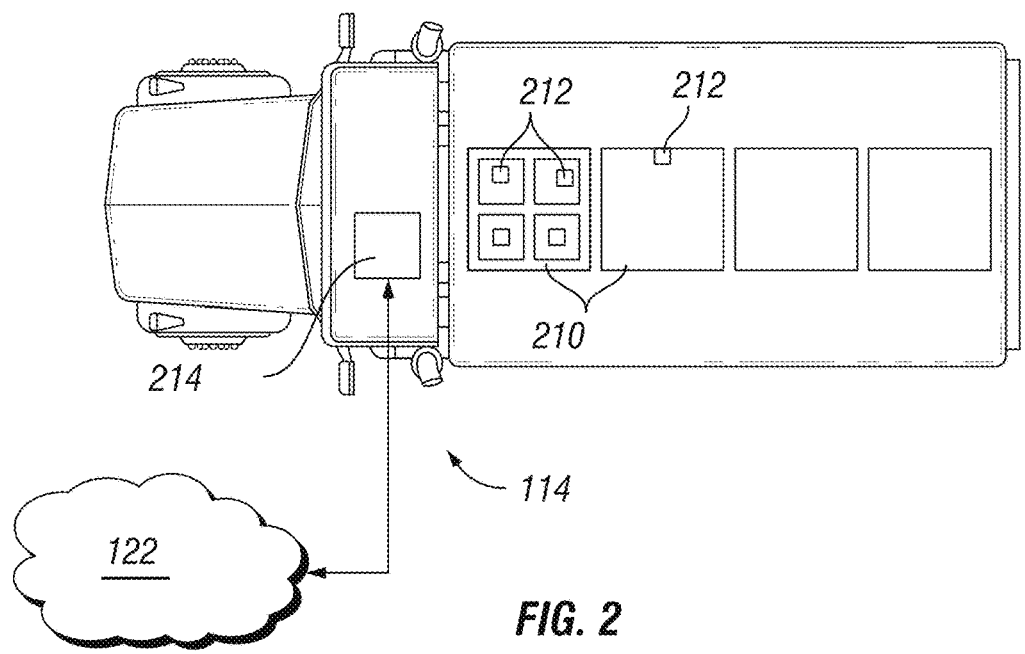
FIG. 2 is a schematic diagram of a vehicle in accordance with an embodiment of the system for product management.

Turning briefly to FIG. 2, the product management system 100 (FIG. 1) may include one or more micro-climate sensors 212 which are associated with corresponding items of sale 210. As will be explained in greater detail bellow, the micro-climate sensors 212 generate and transmit product flow data. While FIG. 2 depicts the micro-climate sensors 212 within a vehicle 114, it is to be understood that the micro-climate sensors 212 may be associated with, and/or attached to, the items of sale 210 at any portion of the supply chain 110, e.g., at a source 112, distribution center 116, store 118, a location in a store, a customer location, and/or any point/location therebetween.

Returning to FIG. 1, the product management system 100 may further include one or more servers 120 in communication with the micro-climate sensors 212 via a network 122. The one or more servers 120 may be structured to interpret the product flow data and determine flow analysis data. The product management system 100 may further include one or more electronic devices 126, e.g., desktops, laptops, smart phones, tables, and/or other types of smart devices, that communicate with the one or more servers 120 via the network 122. In embodiments, the one or more servers 120 may transmit the flow analysis data to the one or more electronic devices 126 which may be structured to interpret and display the flow analysis data and/or data derived therefrom.

Figure 3:
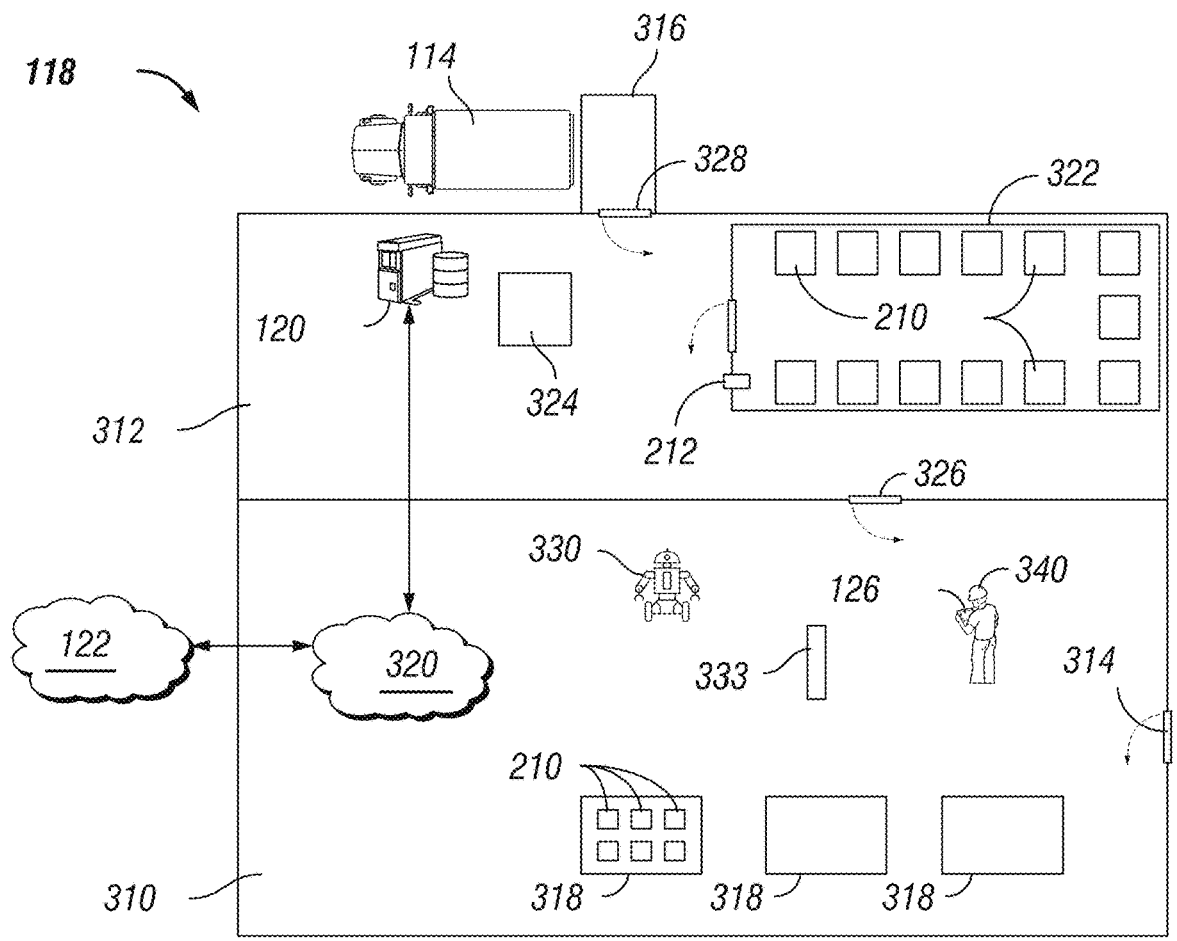
FIG. 3 is a schematic diagram of a store in accordance with an embodiment of the system for product management.

Moving to FIG. 3, a non-limiting example of a store 118 is shown. The store 118 may include a floor 310, a backroom 312, a main entrance 314, a loading dock 316 (also referred to herein as a receiving dock or a holding dock), one or more containers 318 for presenting the items of sale 210, one or more of the servers 120, and/or an in-store network 320. The store 118 may further include a walk-in refrigerator 322 (also referred to as a cooler, a walk-in cooler, a produce cooler, a store room, a storage facility, and the like), and/or a repository device 324.

The floor 310 may be a front portion of the store 118 where the containers 318 present the items of sale 210 to customers for purchase. The floor 310 may include the main entrance 314. The floor 310 may be connected to the backroom 312 via an entryway/door 326.

The backroom 312 may be a location in the store 118 where items of sale 210 are stored until needed on the floor 310, wherein items of sale 210 may be moved from the backroom 312 to the containers 318 via "u-boats" 333. The backroom 312 may be connected to the loading dock 316 via entryway/door 328.

The loading dock 316 may be a portion of the store 118 structured to facilitate loading and/or unloading of items of sale 210 from a transportation vehicle 114.

Figure 4:
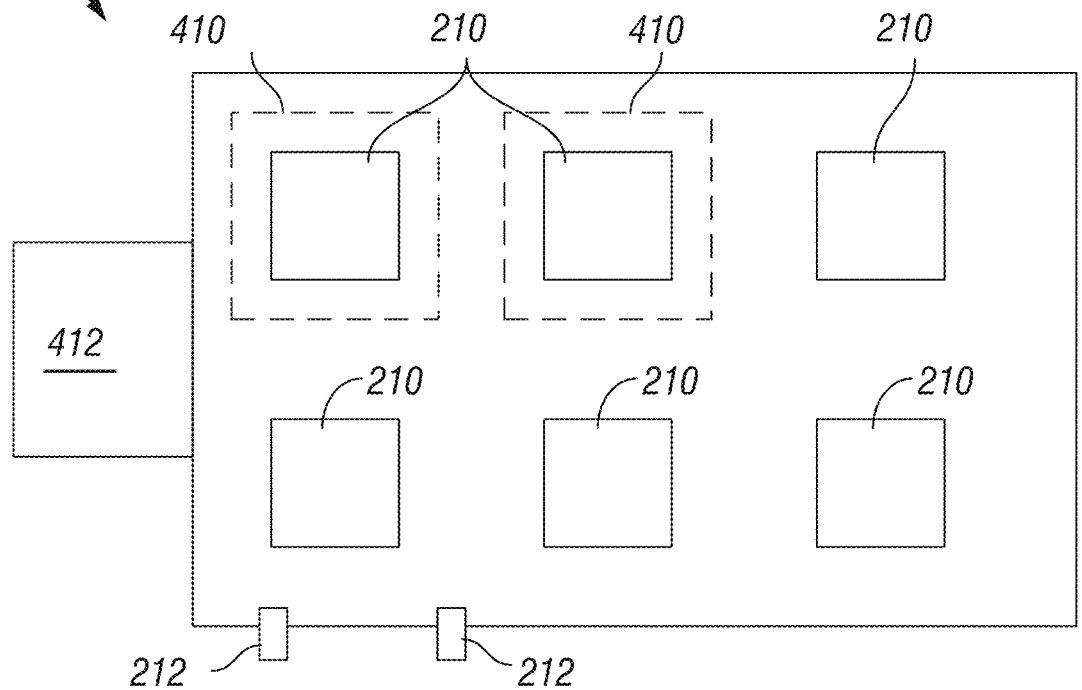
FIG. 4 is a schematic diagram of a container for presenting items of sale in accordance with an embodiment of the system for product management.

A non-limiting example of a container 318 is illustrated in FIG. 4. The container 318 may include one or more spaces 410 for one or more items of sale 210. The container 318 may further include one or more micro-climate sensors 212 for monitoring the items of sale 210 while in the container 318. In embodiments, the container 318 may be climate controlled, e.g., refrigerated/cooled or heated. The micro-climate sensors 212 may be disposed at various locations on, under, within, and/or near the container 318. The container 318 may include a network communication device 412 for placing the micro-climate sensors 212 in communication with the servers 120 via the in-store network 320 and/or network 122.

Figure 5:
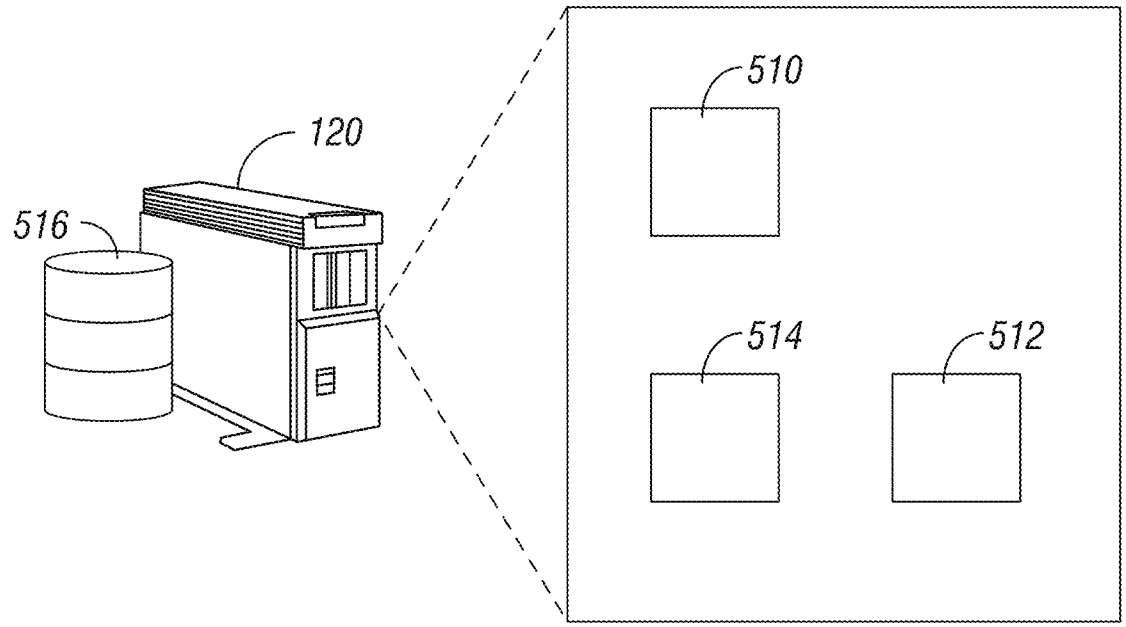
FIG. 5 is a schematic diagram of a sever in accordance with an embodiment of the system for product management.

As shown in FIG. 5, the one or more servers 120 may include one or more processors/CPUs 510 and memory 512. The one or more servers 120 may further include one or more network cards 514. The one or more servers 120 may further communicate with a local and/or remote data base 516.

Figure 6:
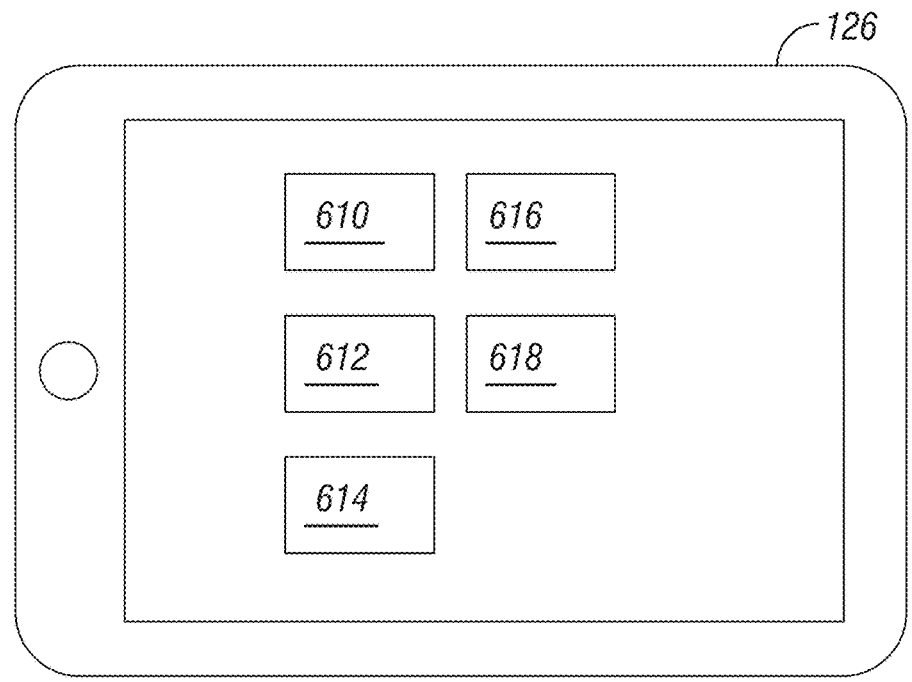
FIG. 6 is a schematic diagram of an electronic device in accordance with an embodiment of the system for product management.

FIG. 6 depicts a non-limiting example of an electronic device 126 for use in the product management system 100. The electronic device 126 may include one or more processors/CPUs 610, memory 612, and/or networking devices 614. In embodiments, the electronic device 126 may include a camera 616 and/or bar-code scanner/reader 618.

Figure 7:
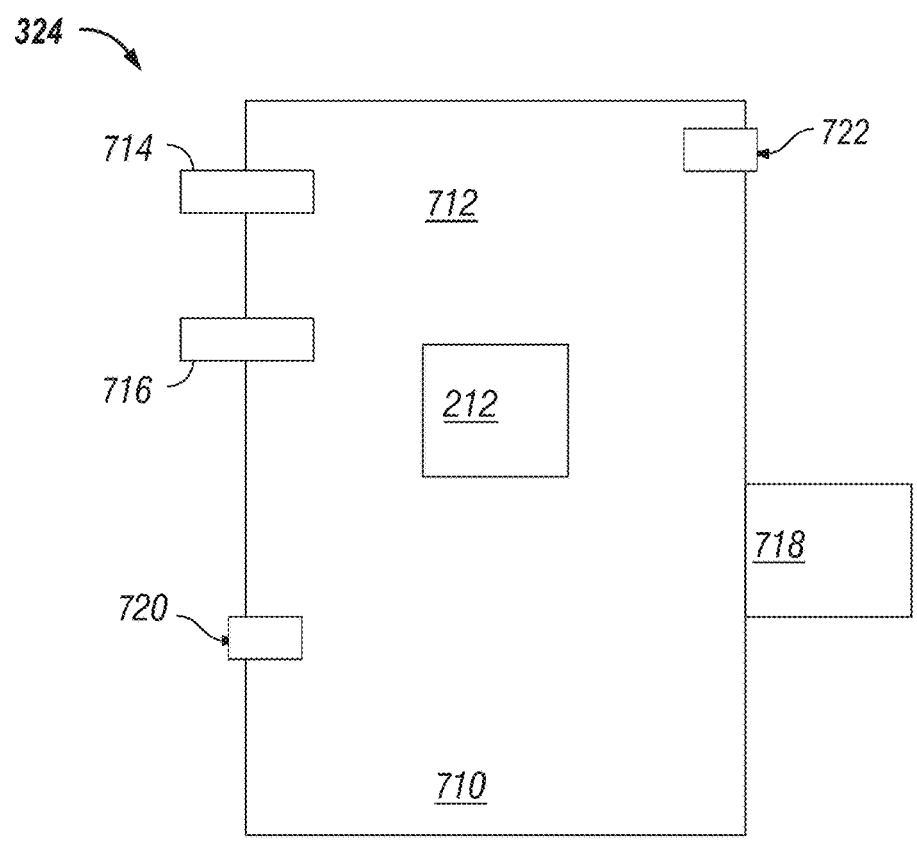
FIG. 7 is a schematic diagram of a repository device in accordance with an embodiment of the system for product management.

Illustrated in FIG. 7 is a non-limiting example of the repository device 324. The repository device 324 may include a body 710 that defines a space 712 for holding/containing/storing one or more micro-climate sensors 212. The body 710 may have an opening 722 (e.g., a covered opening) for receiving micro-climate sensors 212 that are to be decommissioned (permanently or temporarily). In embodiments, decommissioning of a micro-climate sensor 212 may refer to transitioning the sensor 212 to a state where the sensor 212 does not collect and/or transmit data from an item of sale 210. In embodiments, decommissioning of a micro-climate sensor 212 may refer to placing a marker in the data collected by the micro-climate sensor 212 indicating that data after that point in the data is not valid. The body 710 may further include an opening 720 (e.g., a covered opening) that provides access to remove decommissioned micro-climate sensors 212 from the space 712. The repository device 324 may include a network device 718 structured to communicate with the one or more servers 120 and/or electronic devices 126 via the networks 320 and/or 122. The repository device 324 may include one or more sensors 714 structured to detect the presence of a micro-climate sensor 212 within, or near, the space 712. The one or more sensors 714 may be laser-based, radar-based, sonar-based, visual-imagery based, e.g., optical cameras, magnetic based, RFID based and/or any other type of sensing device capable of detecting the presence of another object. The repository device 324 may further include one or more sensor communication devices 716 structured to communicate with the one or more micro-climate sensors 212. In a non-limiting example, a micro-climate sensor 212 may be passed through the opening 722 into the space 712 where it is detected by the one or more sensors 714. Upon detection of the micro-climate sensors 212, the one or more sensor communication devices 716 may transmit a decommission command to the micro-climate sensor 212 and/or the one or more servers 120. In embodiments, the one or more sensors 714 may be further structured to detect whether the space 712 is full or empty and/or other properties, e.g., a status, of the repository device 324. In embodiments, the repository device 324 may transmit a message to the one or more servers 120 and/or electronic devices 126 indicating a status of the repository device 324, e.g., full, empty, etc. As will be understood, the repository device 324 may provide for collection and decommissioning of the micro-climate sensors 212 as part of recycling of the micro-climate sensors 212. For example, the repository device 324 may detect when it is full and send a notification message to initiate pickup, e.g., backhauling and/or mailing, of the micro-climate sensors 212.

Figure 8:
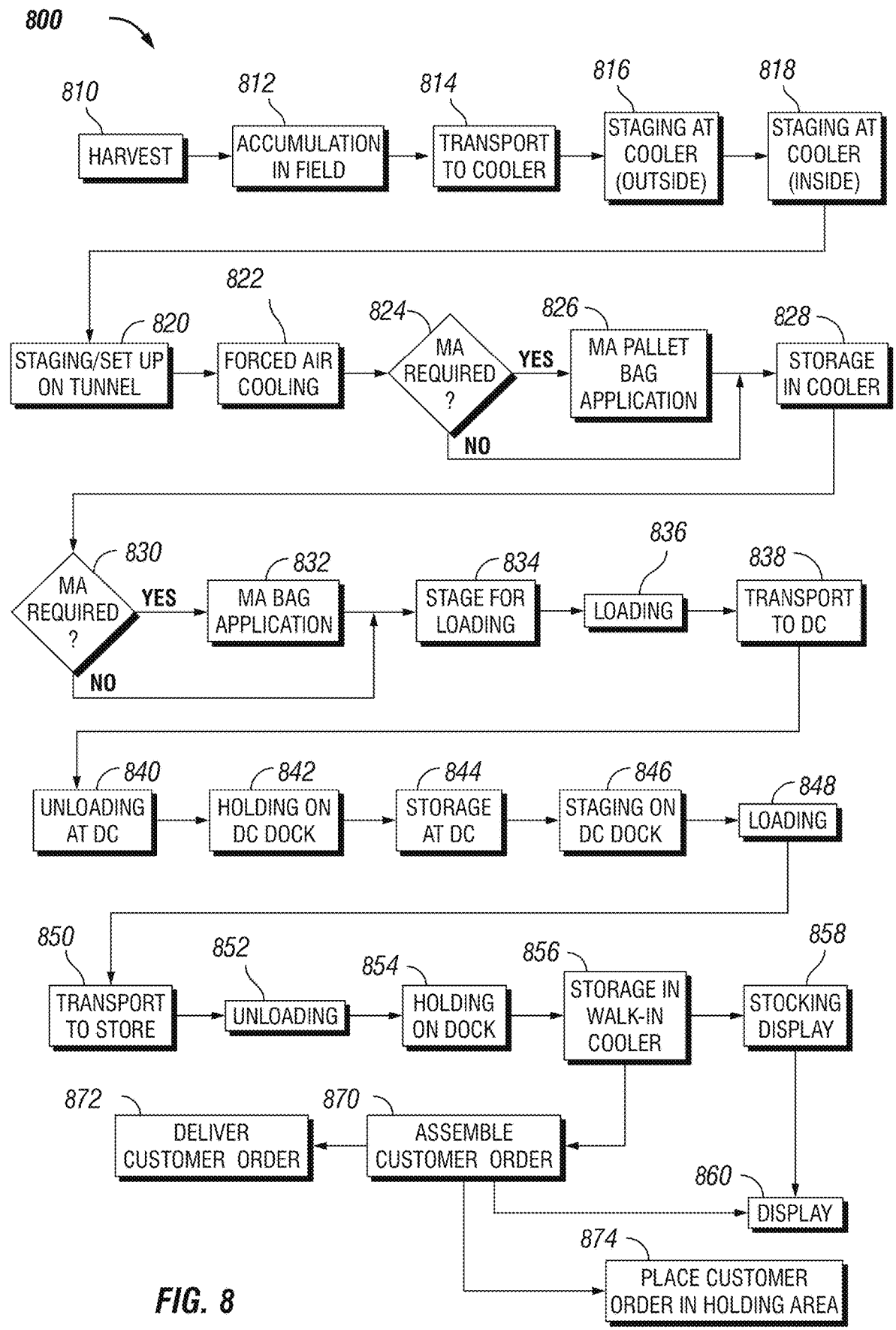
FIG. 8 is a schematic diagram of a supply flow chain in accordance with an embodiment of the system for product management.

Turning to FIG. 8, in view of the disclosure herein, a flowchart depicting a method 800 of moving items of sale 210 through the supply chain 110 (FIG. 1) is shown in accordance with an embodiment of the present disclosure. It is to be understood that embodiments of the method 800 may include fewer or additional stages than the ones depicted in FIG. 8. Accordingly, in embodiments, the method 800 may include harvesting 810 product, e.g., produce, that will form an item of sale 210. Harvesting 810 may be accomplished at a source 112. The harvested product may then be accumulated 812 in a field and transported 814 to a cooler. The product may be staged outside 816 and/or inside 818 of the cooler. Further staging 820 may be performed followed by force air cooling 822. The method 800 may further include determining 824 whether modified atmosphere assistance (MA) is required, and if so, performing 826 a modified atmosphere pallet bag application. The method 800 may further include storing 828 the product in a cooler. The method 800 may further include another determination 830 of whether modified atmosphere (MA) is required and, if so, performing 832 performing another modified atmosphere (MA) bag application. The method 800 may further include staging 834 the product for loading, loading 836 the product, and/or transporting 838 the product (as items of sale 210) to a distribution center 116. The method 800 may further include unloading 840 the items of sale 210 at the distribution center 116 and/or holding 842 the items of sale on a dock of the distribution center 116. The method may further include storing 844 the items of sale at the distribution center 116. The method 800 may further include staging 846 the items of sale on the distribution center dock and then loading 848 the items of sale, e.g., on a vehicle 114 for transport 850 to a store 118. The method 800 may further include unloading 852 the items of sale 210 on loading dock 316 of the store 118. The method 800 may include holding 854 of the items of sale on the loading dock 316. The method 800 may further include storing 856 the items of sale 210 in a walk-in cooler 322. The method 800 may further include stocking 858 the items of sale 210 for display 860 in a container 318 to consumers. In embodiments, the method 800 may further include assembling a customer order 870 by picking items of sale 210 for a customer's order from a floor 310 or a backroom 312 in a store 118. The method 800 may further include either delivering the customer order 872 to a customer location 130 or placing the customer orders in a holding area 874 for in-store or curbside pickup 128 by the customer.

Figure 9:
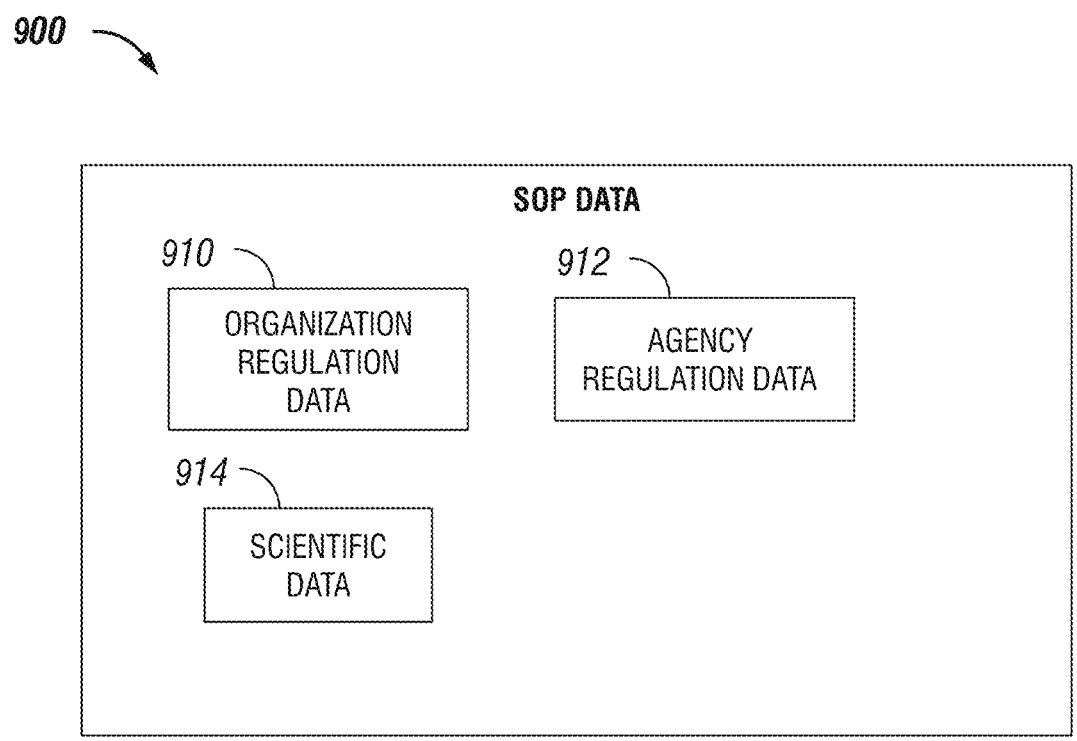
FIG. 9 is a block diagram of a standard operating procedure data in accordance with an embodiment of the system for product management.

As will be understood, one or more of the above stages for the method 800 may be governed by one or more SOPs 900 (FIG. 9). A SOP may be a collection of rules and/or guidelines with respect to transportation, handling, storing, and/or other actions associated with items of sale 210. SOPs 900 may be based at least in part on one or more of organizational regulations 910, e.g., company policy, state and/or federal agency regulations 912, scientific data 914 and/or consensus, and/or other sources of information regarding the handling of items of sale. A SOP 900 may define ranges of conditions, e.g., temperature, moisture, color, etc., for a particular type of product. The ranges may correspond to certain points in the products lifespan and/or position in the supply chain 110. The SOP may define time periods for certain portions, e.g., the stages in method 800, of the supply chain 110. For example, a SOP may define that an item of sale of strawberries may not be left on a loading dock 316 for more than thirty (30) minutes. A SOP may further define that an item of sale 210 should be discounted (or disposed) if the items of sale 210 has not sold within a certain numbers of days of being in a container 318 and/or within a storage area, e.g., 322. A SOP may further define a length of time from when a customer order is assembled to when it is received by the customer.

Figure 10:
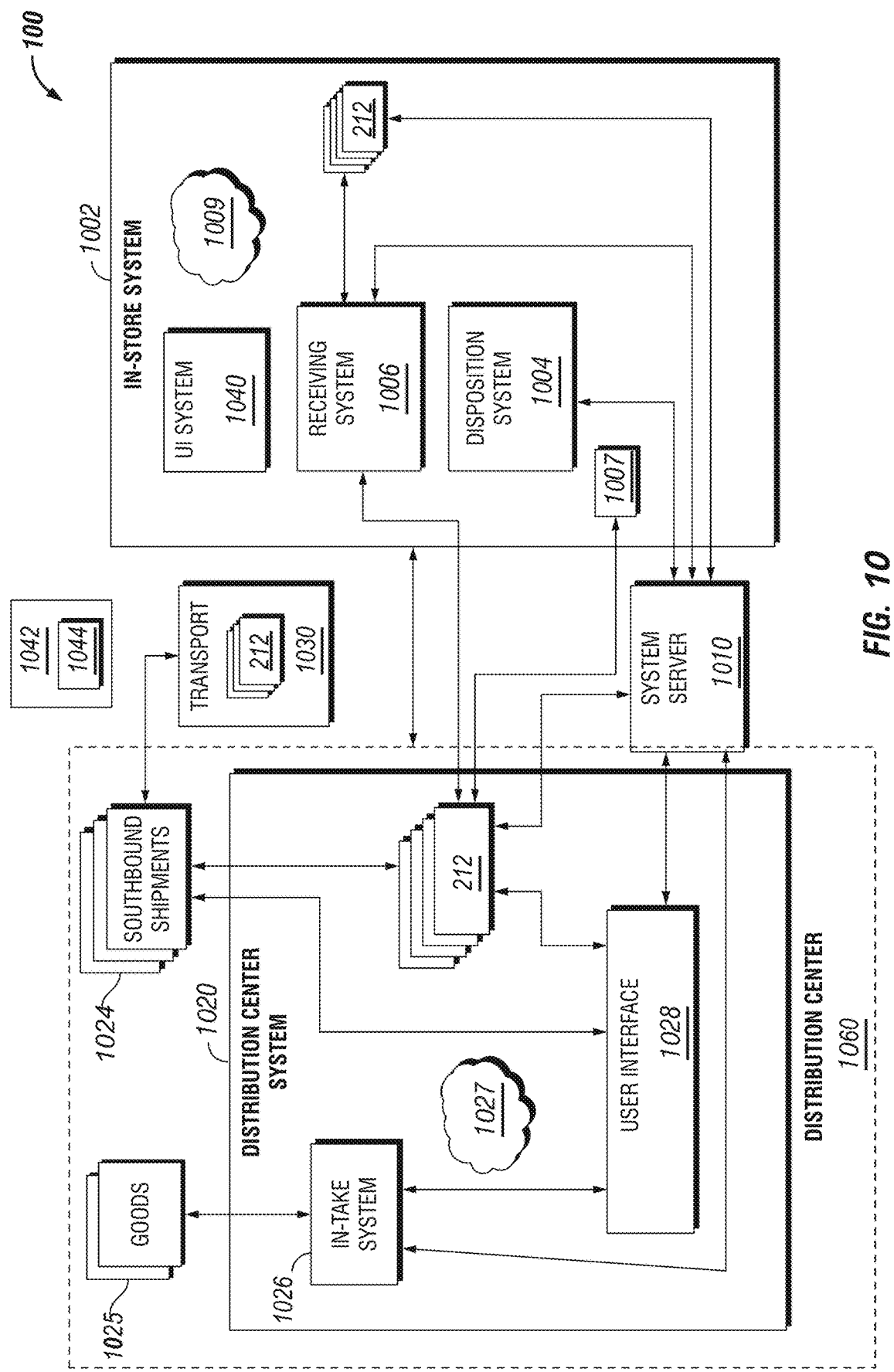
FIG. 10 depicts components of an embodiment of the system for product management.

Referring now to FIG. 10, a block diagram of an embodiment of the product management system 100 is depicted. The product management system 100 may include a plurality of in-store systems 1002, distributed across a plurality of retail locations. An in-store system 1002 may include a receiving system 1006 for accepting incoming goods, a disposition system 1004, which enables the capture of data regarding products that are being discarded, an in-store network 1009, which may be the same and/or different than network 320 (FIG. 3), and a variety of micro-climate sensors 212, which may be the micro-climate sensors, e.g., sensors 212 in FIGS. 3 and 4, deployed throughout the store, e.g., in containers 318 or store rooms 322. In addition, the product management system 100 may include a plurality of micro-climate sensors 212, which may be the same and/or different from micro-climate sensors 212, which are placed on or in proximity to transported goods during transport between the distribution center and a plurality of stores. Such sensors may provide transport and in-store product data, such as the examples shown in FIGS. 1, 2, and 3. In addition, the product management system 100 may include a plurality of micro-climate sensors 212 which monitor environmental data, such as temperature, humidity, light level, and the like, as well as situational information such as location of a product in store, movement information regarding infrastructure components (e.g. status of freezer or cooler door), status of in store equipment (e.g., cycling as produce misters, or run-time on a freezer), product movement, and/or the like. Micro-climate sensors 212 may be associated with a profile indicating what is being measured and where it is located. The micro-climate sensors 212 may be placed in such a way that it detects and/or records the conditions "experienced" by the product being monitored. In an illustrative example, a micro-climate sensor 212 may be placed in a freezer. It may be preferable to place the micro-climate sensor 212 on a shelf, similar to a frozen product, rather than attaching it to a large surface in the freezer, such as a side of the freezer, which may act like a cold sink and be less likely to reflect temperature fluctuations seen by corresponding products/items of sale.

Data from the sensors described herein may be communicated to the system server 1010, e.g., as floor data, and, in some embodiments, directly to the disposition system 1004. The system server 1010 may be one of the one or more servers 120 (FIG. 1). Data may be communicated using the in-store network 1009 which may be an existing cellular network using 3G, 4G, or 5G and the like, a local WiFi network (IEEE 802.11x), a short range network (e.g., Bluetooth, Bluetooth Low Energy, ZigBee, 6LoWPan, LTE-M1, NB-IoT, and the like), and the like. The system server 1010, e.g., one of the servers 120 (FIG. 3), may be co-located with the disposition system 1004, at a distribution center 116, at a remote location, or distributed between locations. The system server 1010 may receive the data from the disposition system 1004, from micro-climate sensors 212 associated with the sensor, located in-store, and located on transport vehicles, related product systems such as point of sale data, ordering data, delivery data, and the like.

The product management system 100 may include a distribution center system 1060. A distribution center system 1060 may include an in-take system 1026, a user interface 1028, and a distribution center network 1027. The distribution center may store received goods 1025 which are subsequently distributed across a plurality of outbound shipments 1024 intended for different locations. The product management system 100 further includes a plurality of micro-climate sensors 212 which may be placed in with specific goods in the outbound shipments 1024 to evaluate conditions seen by the specific good during transport to a store. Data may be communicated between the in-take system 1026, the system server 1010, micro-climate sensors 212 and user interface 1028 using network 1027 which may be an existing cellular network using 3G, 4G, or 5G and the like, a local WiFi network (IEEE 802.11x), a short range network (e.g. Bluetooth, Bluetooth Low Energy, ZigBee, 6LoWPan, LTE-M1, NB-IoT, and the like), and the like. The distribution center may include a plurality of received goods 1025.

At the distribution center, a plurality of the micro-climate sensors 212 may be placed in with a specific good, e.g., item of sale 210, in the outbound shipments 1024 to evaluate conditions to which that specific good is exposed during transport to the store. The micro-climate sensors 212 may be designed to measure local environmental data for a specific SKU, a type of item (e.g., strawberries or berries where there may be more than a single SKU), or other subset of items of sale. In an illustrative and non-limiting example, a micro-climate sensor 212 may be placed on or in proximity to the pallet or case of strawberry claim shells to measure the conditions to which the pallet or case is exposed. In embodiments, a sensor 212 could be placed in the clamshell(s) themselves to measure the specific temperature and humidity experienced by the strawberries. Micro-climate sensors 212 may be placed with goods based on value of goods, sensitivity of goods (e.g., leafy greens and avocados are very sensitive to environment), disposition history for a type of good at a specific store, store configuration and sales data, and the like. A disposition history for a type of good at a store may show the frequency with which a given item type is thrown away, reasons for disposition (e.g., items past sell-by data, items damaged, items spoiled), and in what quantities. Using this data, the system server 1010 may look for outliers (e.g., for a given item across stores, relative to historical store data for that item type, relative to disposition rates for similar items at the same store, and the like) and correlate the disposition history with changes in related data such as transportation history for the outliers, changes in climate correlating with the outliers, and the like.

Figure 11:
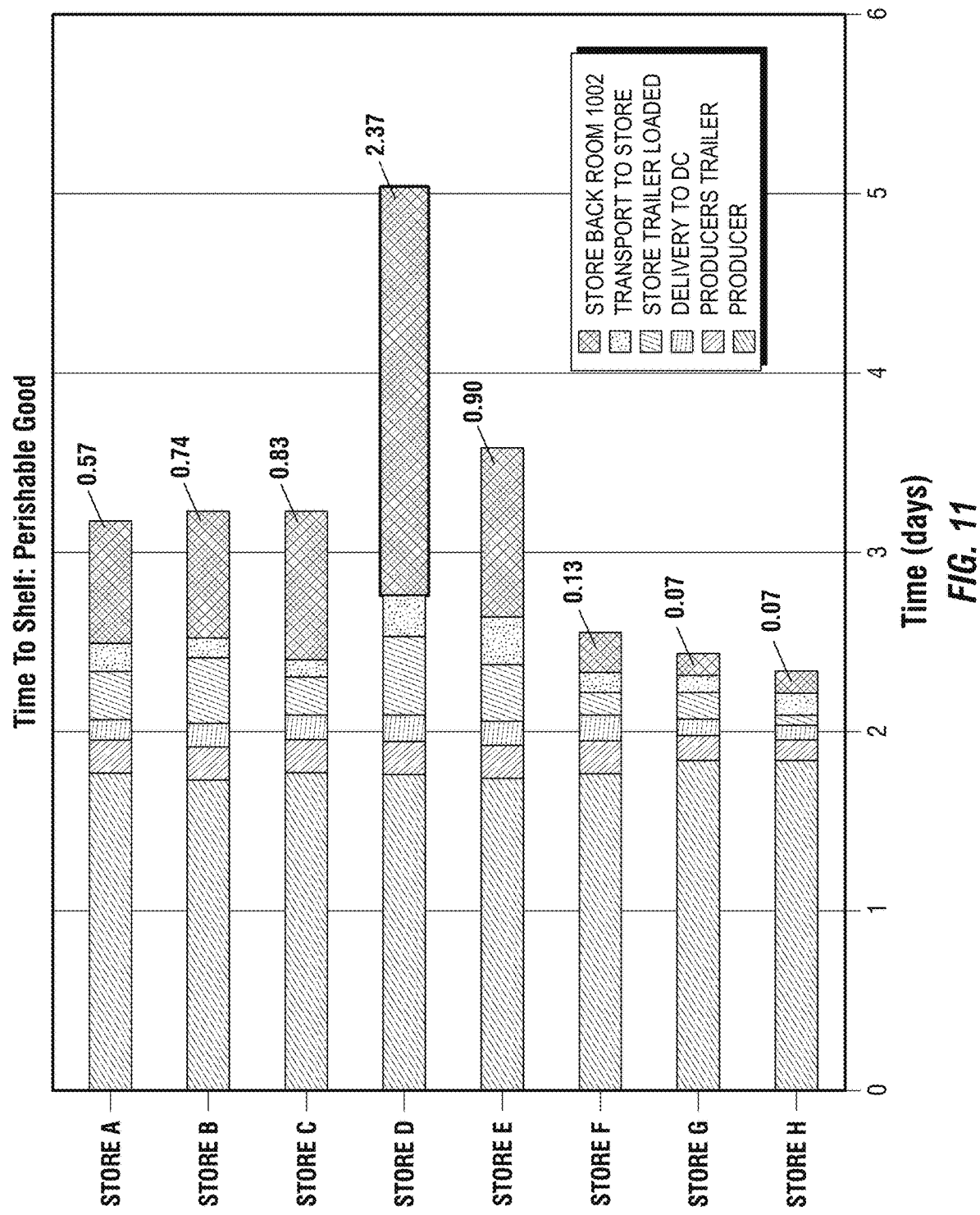
FIG. 11 shows an example of a time to shelf graph in accordance with an embodiment of the system for product management.
Figure 12:
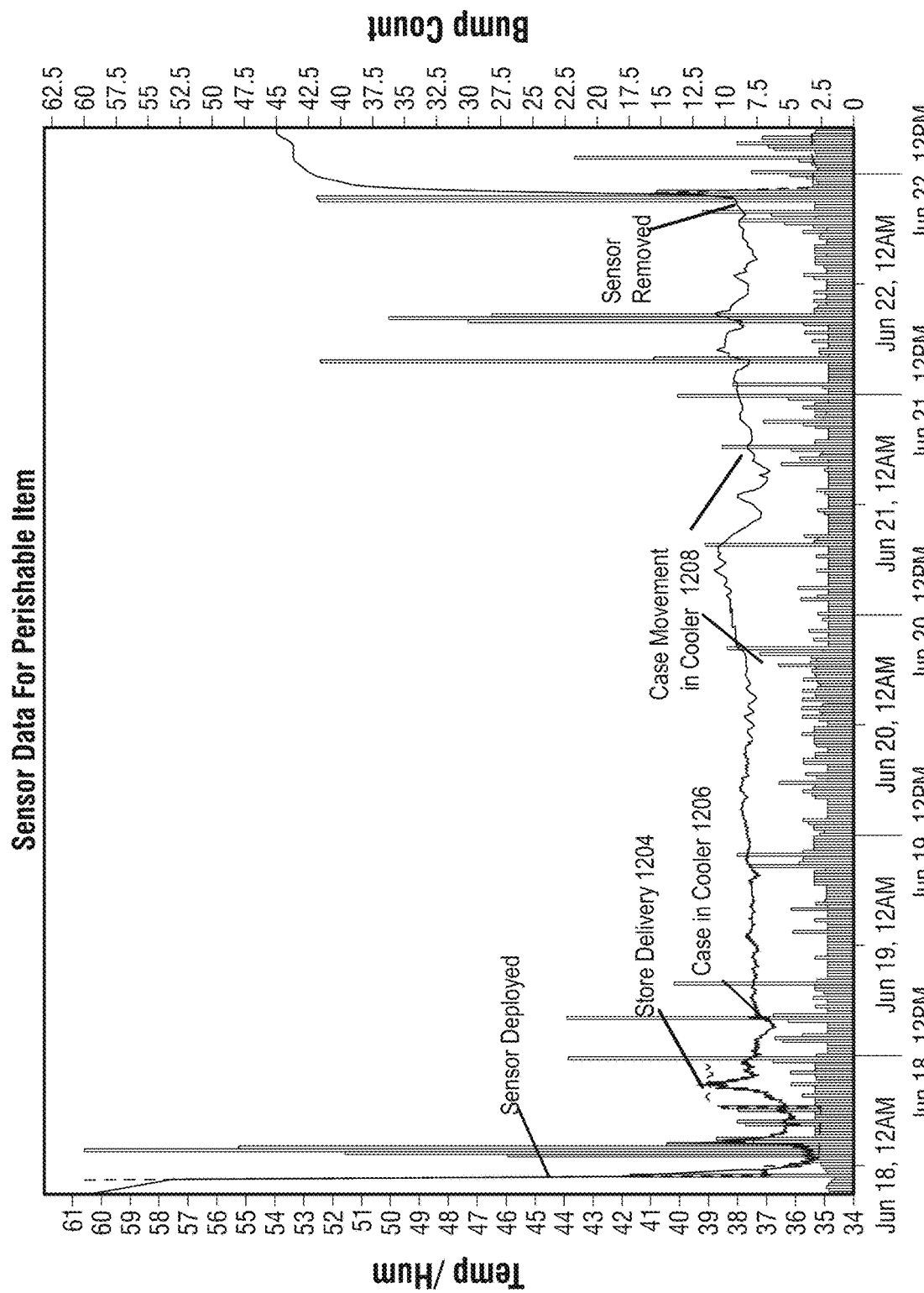
FIG. 12 shows an example of micro-climate sensor data in accordance with an embodiment of the system for product management.

For example, turning to FIG. 11, a data chart showing the distribution of time to shelf for a perishable good, e.g., item of sale 210 is shown. While there may be some variability in the time to load a store trailer and transport the good to a store, there is often a large variability in the amount of time a particular good spends in a "store back room 1002", e.g., 312 in FIG. 3. In particular, the time spent in the back room for Store D may be significantly longer than that of other stores. FIG. 12 shows the micro-climate sensor 212 data associated with a perishable good at Store D. The uptick in temperature and humidity 1204 may indicate arrival at the store, followed by a decrease in temperature 1206 as the item is moved into storage in the produce cooler. The movement data 1208 indicates that the item was largely stationary in the cooler for four (4) days, while other items were stacked on top as indicated by the occasional movement spikes.

Figure 13:
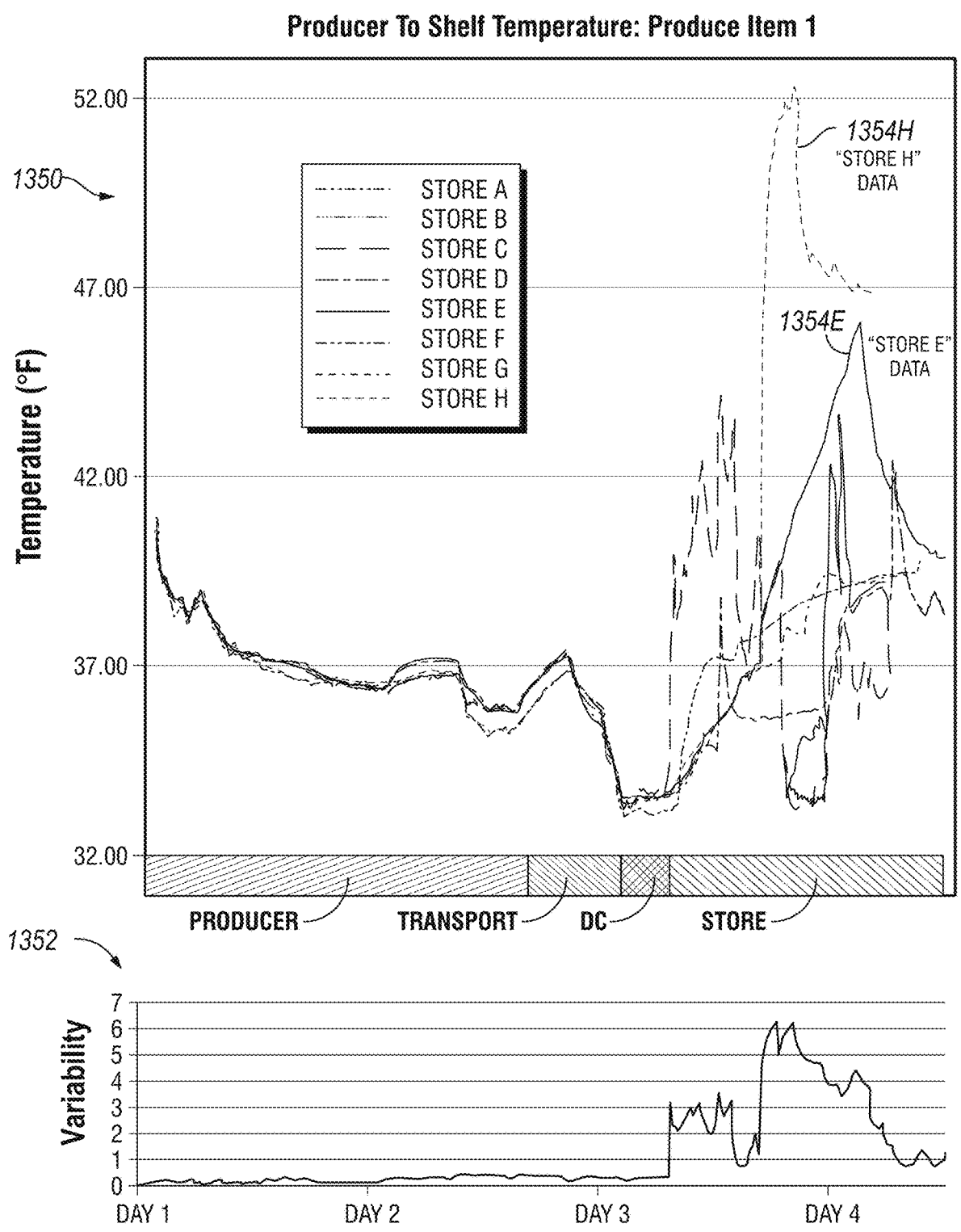
FIG. 13 depicts example data from a set of micro-climate sensors in accordance with an embodiment of the system for product management.

Referring to FIG. 13, an example of a temperature graph 1350 showing temperatures measured by a series of micro-climate sensors 212 associated with a quantity of a single produce item (e.g., bagged lettuce or strawberry clam shells) over time as they travel from producer to distribution center (DC) to individual stores is depicted. An associated variability graph 1352 depicts an increase in variability at the stores. However, the data for the individual stores shown in the temperature graph 1350 indicates that there may be individual stores (e.g. "Store E data" 1354E and "Store H" 1354H) which show higher than average temperature variability. If this higher temperature variability correlates with higher disposition rates, additional data, such as location correlated with the higher temperatures, may be identified and recommendations made. As an illustrative example, the gradual increase in temperature shown in the data for "Store E" 1354E may occur while the item is sitting in a case, e.g., container 318, on the retail floor, possibly indicating a problem with the case or that the item is being left on the floor too long. As an illustrative example, the rapid increase in temperature shown in the date for Store H" may indicate that the item was left on a loading dock or other location with no environmental control. Temperature data may be combined with additional data to facilitate overall understanding. In an illustrative example, data may include movement or vibration date where a change may indicate a change in transportation status (e.g., arrival or departure from a location), stacking of containers (either within a storage area or onto a U-boat 333 (FIG. 3) for stocking), and the like. Micro-climate sensors 212 may provide data regarding how the equipment is working (e.g., is the cooling cycling appropriately), whether doors have been left open, and the like. Additional data may include light levels indicating when a box has been opened or an item is on display. Additional data may include humidity data that may provide insight into whether misting complies with SOP, overall environmental conditions, and the like. Additional data may include EMF data for proximity sensing to assist in location identification. Additional data may come from others systems such as order data, inventory data, and the like.

Figure 14:
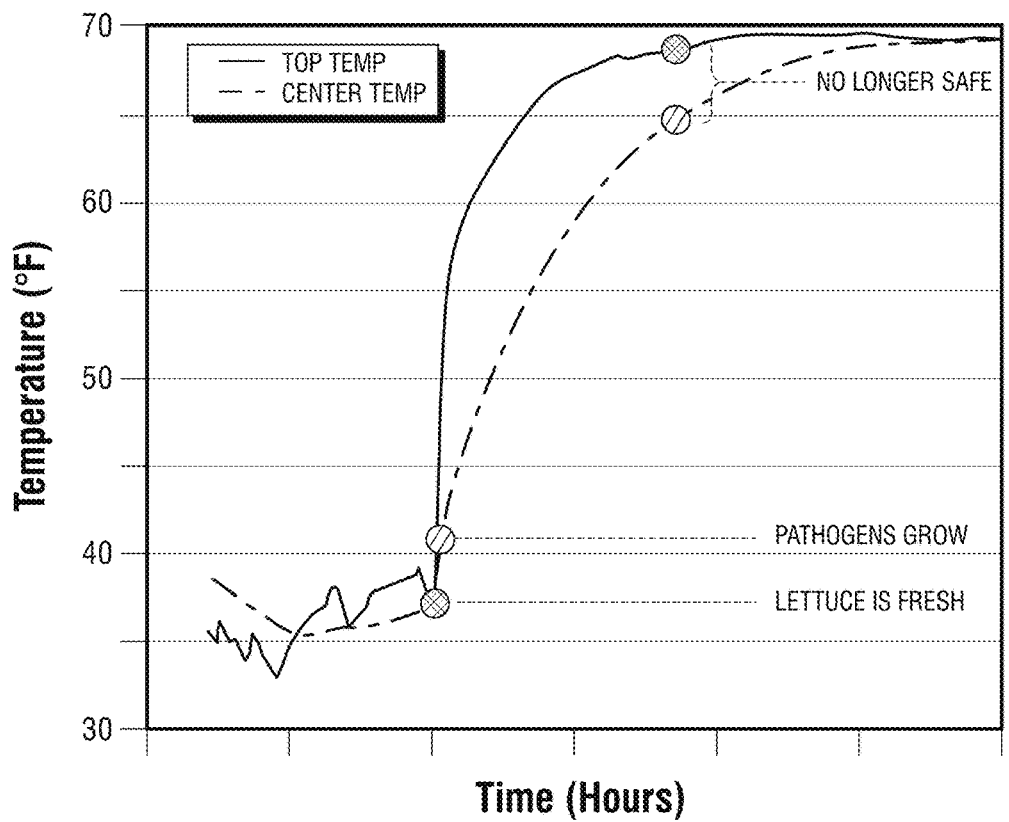
FIG. 14 depicts an example temperature profile with notation regarding key product quality transitions.

FIG. 14 depicts an example temperature profile for a product indicating differences in temperature based on placement of micro-climate sensors 212 the with notation regarding key product quality transitions.

Figure 15:
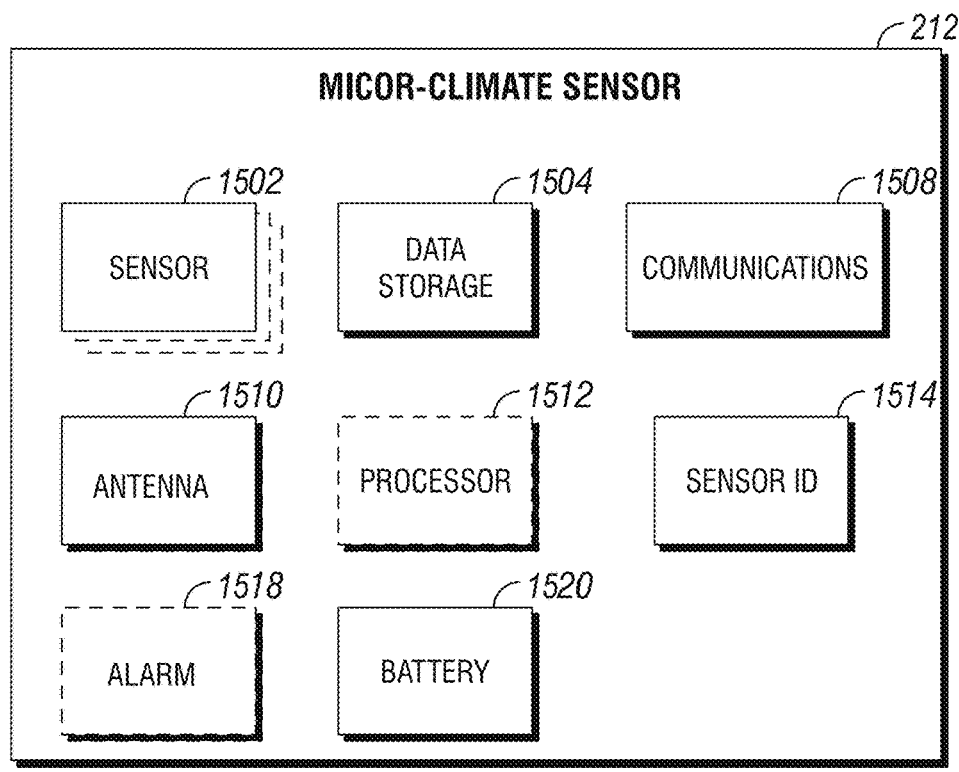
FIG. 15 depicts an embodiment of a micro-climate sensor in accordance with an embodiment of the system for product management.

Referring to FIG. 15, a micro-climate sensor 212 may include one or more sensors 1502, a data storage 1504, a communications facility 1508, a unique sensor ID 1514, a battery 1520, and/or an antenna 1510. There may be a processor 1512 to interpret the data from the sensors 1502 and, in some embodiments, activate an alarm 1518. In embodiments, the communications facility 1508 and antenna 1510 may support communication with an RFID reader. In embodiments, the communications facility 1508 and antenna 1510 may support network communications with a system server 1010 or a disposition system 1004 using the in-store network 1009 which may be an existing cellular network using 3G, 4G, or 5G and the like, a local WiFi network (IEEE 802.11x), a short range network (e.g. Bluetooth, Bluetooth Low Energy, ZigBee, 6LoWPan, LTE-M1, NB-IoT, and the like), and the like. The sensors 1502 may include a thermometer and a humidity sensor, a light sensor (both intensity and color temperature), an accelerometer, a proximity sensor and the like. The battery 1520 may be rechargeable, or replaceable. The micro-climate sensors 212 may be reusable. A micro-climate sensor 212 may be strategically packed with targeted goods being shipped to a store (e.g., in a cardboard tray holding clamshell of strawberries). As will be described in greater detail below, in embodiments, a micro-climate sensor 212 may be removed from the incoming shipment for return to the distribution center after the targeted goods have been unloaded, after they have been shelved, upon sale, upon disposition, or the like. In embodiments, upon receipt by the store, some of the micro-climate sensors 212 may no longer be needed and may be returned to the distribution center as part of a back-haul operation, others may be collected when product is placed on shelves or sold.

Figure 16:
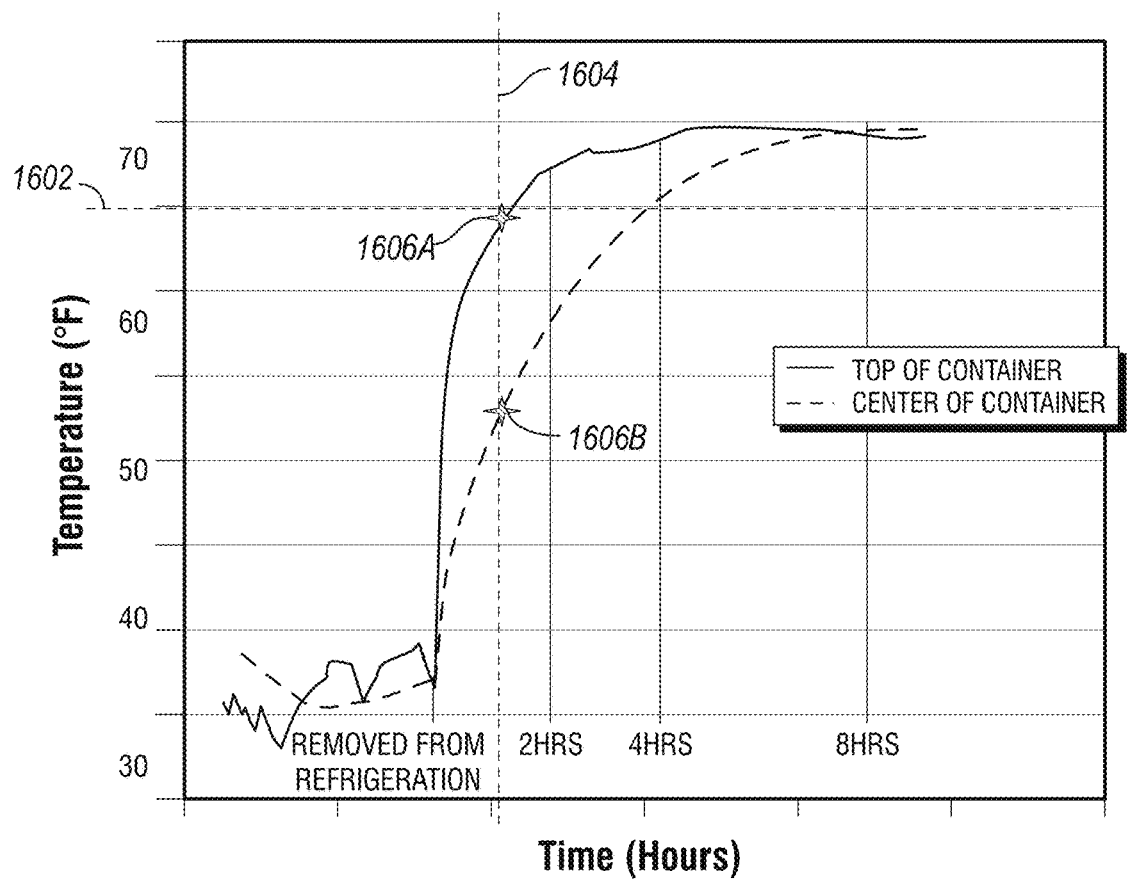
FIG. 16 depicts an example of position dependency of micro-climate sensor data in accordance with an embodiment of the system for product management.

In embodiments, there may be calibrations associated with individual micro-climate sensors 212 or sensors 1502. In embodiments, there may be profiles or models that map the target product being measured with the micro-climate sensor 212 to the environment being experienced by the product being monitored. For example, product in the center of a container of perishable goods may have a different thermodynamic profile and response times than that of product or a micro-climate sensor at the top of the container. If a micro-climate sensor 212 is placed at the top of the container, a calibration may predict the environment seen by product at the center of the container as shown in FIG. 16. In an illustrative and non-limiting example, FIG. 16 depicts the temperature at the top of the container 1606A, which may be a container 318 (FIGS. 3 and 4) and the temperature at the center of the same container 1606B over time. In the example shown in FIG. 16, the temperature at the top of container 1606A (and product/item of sale 210 positioned there) may increase more rapidly that the temperature the center of the container 1606B (and product/item of sale 210 positioned there). Product at the top of the container may cross a temperature threshold 1602 at which point the product deteriorates (e.g., the produce outgasses, starts to mold, and the like) earlier than that of product at the center of the container. A micro-climate sensor 212 may have different alarm or alert conditions for identifying when product in the container may be approaching the temperature threshold 1602 based on the location of the micro-climate sensor 212 in the container. In the example of FIG. 16, for an alarm or alert to be initiated at a given time 1604 before any of the product crosses the temperature threshold 1602, a micro-climate sensor 212 may trigger the alarm at a different temperature 1606A, 1606B depending on a calibration for the micro-climate sensors which is based, at least in part, on location in the container.

A micro-climate sensor 212 may store measure and store data from one or more of its sensors 1502 on a periodic or scheduled basis or in response to a measurement from the specific sensor 1502 or a related sensor 1502 (e.g. measuring the same item of sale, a related item of sale, a transport of facilities sensor and the like), a query from the system, and the like. The standards used for measuring and storing data may be based on industry specifications, criteria provided by a receiving store or chain, and the like. In an illustrative example, temperature and humidity may be recorded every five (5) minutes under normal conditions but every minute once a threshold temperature or humidity has been reached.

Figure 17:
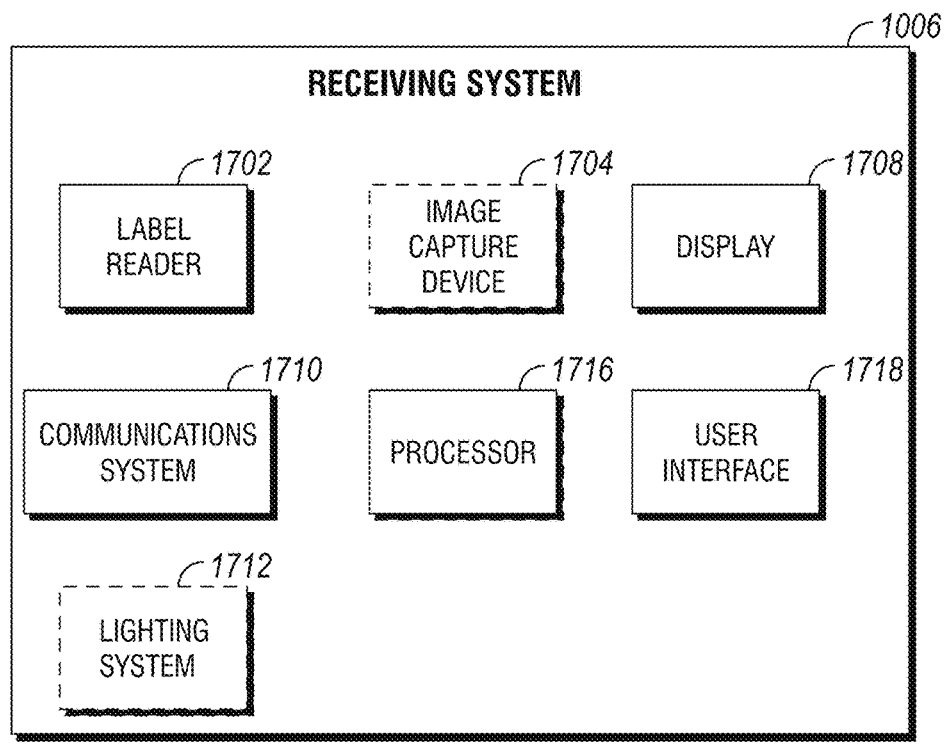
FIG. 17 depicts components of a receiving system in accordance with an embodiment of the system for product management.
Figure 18:
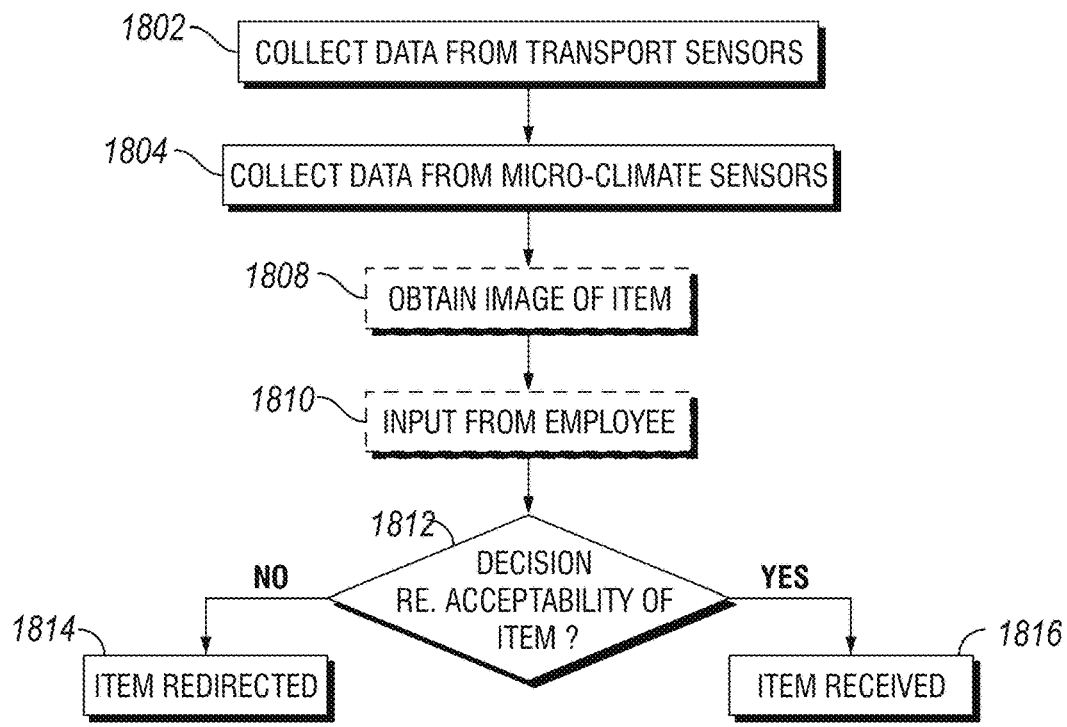
FIG. 18 depicts an example work-flow utilizing a receiving system in accordance with an embodiment of the system for product management.

Referring to FIGS. 17-18, a receiving system 1006 may include a label reader 1702, a display 1708, a processor 1716, a communications system 1710, and/or a user interface 1718. In some embodiments a receiving system 1006 may also include an image capture device 1704 and/or a lighting system 1712. Micro-climate sensors 212 associated with a transport vehicle 114 may be in communication with the receiving system, via the in-store network 1009, which may be the same as network 320 (FIG. 3), with the system server 1010, which may be the same as server 120, with a distribution center system 1060, via a distribution center network 1027, or with any of the above using an existing cellular network using 3G, 4G, or 5G and the like. In this way, data from the micro-climate sensors 212, e.g., micro-climate sensors 212 within the supply chain 110, may be collected at 1802 (FIG. 18). As goods are unloaded from the transport, e.g., 114, data may be collected from micro-climate sensors 212 (step 1804) embedded with the goods being unloaded using the in-store network 1009 to communicate data to the receiving system 1006 and/or the system server 1010. An optional picture of the incoming item, e.g., 210, may be obtained 1808. The image may be obtained as part of standard operating procedure (e.g. take pictures of incoming fruit), in response to a suggestion based on data from the micro-climate sensors 212 and/or the transport sensors 132, and the like. An employee receiving the goods may also provide user input 1810 regarding the state of an item (e.g. received poor quality, received out of code, product out of temperature, product out of code, and the like) and a count of the item. Depending on user input, additional images may be requested.

A decision 1812 regarding acceptability of an incoming item, e.g., an item of sale 210, may be made as described elsewhere herein. In an illustrative example, data from the micro-climate sensors 212 may result in the product being rejected for food safety reasons, which may be based at least in part on a SOP 900 (FIG. 9) associated with transport such as temperature out of range, amount of time above or below a threshold, and the like. The rejection may be for both the product with which the micro-climate sensors 212 are associated (e.g. leafy greens) and/or for goods in close proximity during transit. In an illustrative example, a micro-climate sensor 212 associated with strawberry clamshells may show a temperature out of range. While there may not be a micro-climate sensor 212 associated with nearby blueberries, they may also be assumed to have been out of temperature. While the blueberries may not be rejected outright on the basis of data from sensors associated with other produce in near proximity, the blueberries may be subject to additional scrutiny. Additionally, if the two products or types or products are transported on a common pallet, insight may be gained into whether the handling of the blueberries is in compliance with an SOP.

If an item, e.g., 210, is determined to be unacceptable, it may be redirected 1814. Redirection may include disposal if the item is completely unsalvageable. Redirection may include donation to a food pantry, for example, if shelf life is determined to be shortened given transport history, as determined by transport sensors 132 and micro-climate sensors 212, but where the item is still edible. If an item is determined to be unacceptable at receiving, data that contributed to the determination as well as other, related, data (e.g., producer, data from other micro-climate sensors associated with that transport (either for that store or intended for another store but on the same transport), store infrastructure and the like) may be provided to the system server 1010 where the system server 1010 may calculate analytics, add the material to a training set for the machine learning module 6602 (FIG. 66), disposition history 6610 (FIG. 66), and the like. The machine learning module 6602 may also be referred to as a machine learning circuit, a machine learning engine, and the like herein. Further, the data may be analyzed for trends across stores, trends associated with a particular supplier, transporter, transporter route, and the like to determine contributory conditions.

If an item, e.g., 210, is determined to be acceptable, the item may be received 1816 by the store. Once the item has been received, it may be logged in the store's inventory, moved to appropriate storage (e.g. a freezer, cooler, back room, and the like). Data about the received item may be provided to a store manager, item specific manager (e.g. produce manager, dairy manager), and recommendations made regarding the item. In an example, data from the micro-climate sensors 212 and/or transport sensors may result in an alert or recommendation associated with certain goods such as an indication of reduced shelf life due to transport conditions (e.g. extended time above a threshold temperature) and the need to sell the item quickly. This may include recommendations to shelve the items directly rather than storing and shelving according to a "first in first out" (FIFO) procedure. A recommendation may include a markdown sticker, promotion, an impromptu sale on the item, changes in future ordering, and the like. A recommendation may include a recommendation to file a claim against a vendor, request credit from a vendor, and the like.

In embodiments, a subset of the micro-climate sensors 212 received with incoming goods/items of sale 210 may be removed and returned to the distribution center with the return of the transport, e.g., 114, to the distribution center. In embodiments, a subset of the micro-climate sensors 212 may remain with the incoming product and continue to monitor the environment being experienced by the product from receipt until sale or disposition. Upon completion of the in-store life cycle of the product, the associated micro-climate sensors 212 may be collected and returned to the distribution center where they may be reused.

Figure 19:
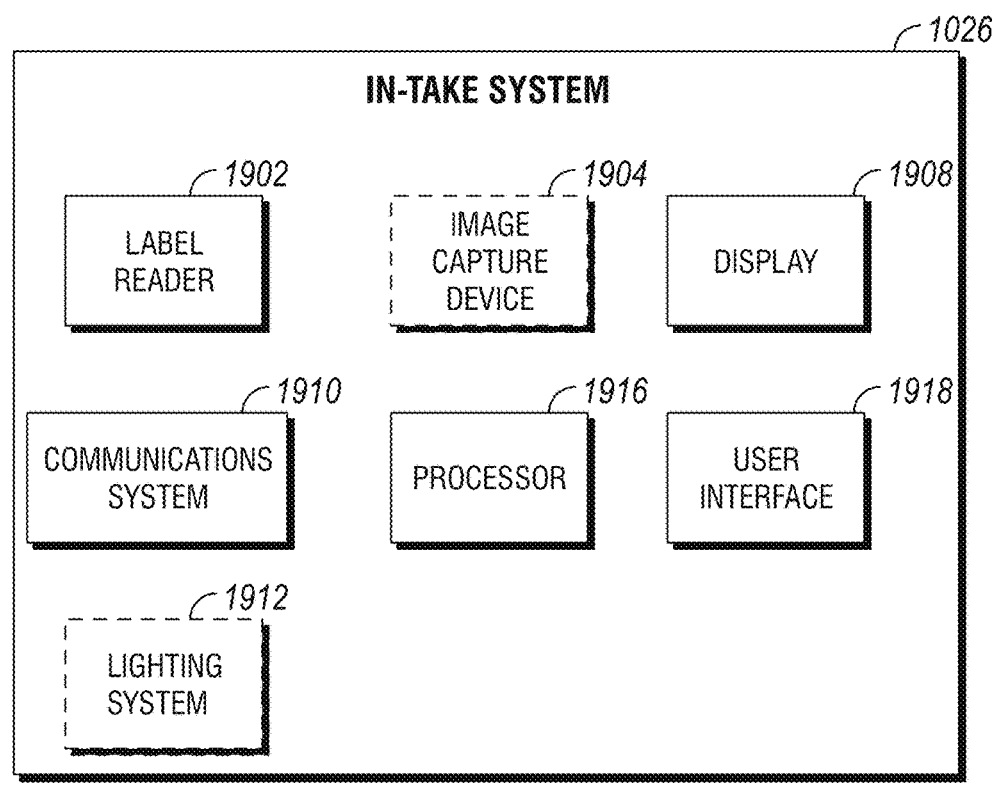
FIG. 19 depicts components of an in-take system in accordance with an embodiment of the system for product management.

Referring to FIG. 19, an in-take system 1026 at the distribution center 116 may evaluate goods being received at the distribution center in a similar fashion to the receiving system 1006 at a store. An in-take system 1026 may include a label reader 1902, a display 1908, a processor 1916, a communications system 1910, and/or a user interface 1918. In some embodiments an in-take system 1026 may also include an image capture device 1904 and/or a lighting system 1912.

Referring to FIG. 20, upon arrival of a delivery at the distribution center, a label associated with the item, e.g., item of sale 210, may be read 2022 and any data from sensors provided by the producer collected 2024. In some embodiments, an image of the item may be obtained 2028 and/or input from the receiving employee 2030. All of this data may be associated with the item being received at the distribution center, and an evaluation made 1812 regarding the acceptability of the item as described elsewhere herein. If the item is deemed acceptable it may be received 1816 and stored with received goods 1025 in appropriate conditions (e.g., freezer, cooler, and the like). If the item is not deemed acceptable or deemed marginally acceptable the item may be redirected 1814. Unacceptable items may be refused and returned to the producer or discarded. Vendor credit may be requested based on unacceptable or marginally acceptable items. Repeated examples may result in negotiations with the vendor regarding ongoing product quality issues. Marginally acceptable items with shorted shelf life or reduced quality may be received and given expedited handling such as direct placement on shelves rather than first in/first out stocking, marked down, couponed, and the like.

Referring now to FIG. 21, a method 2100 for monitoring and reporting on the condition of a plurality of individual items of sale 210 throughout a supply chain 110 is shown. The method 2100 may include associating 2110 at least one micro-climate sensor 212 with a corresponding individual item of sale 210 in the plurality. In embodiments, the micro-climate sensors 212 may be associated with a selectable subset of the items of sale 210 of the plurality. The method 2100 may further include generating 2112, via the plurality of micro-climate sensors, product flow data for each corresponding item of sale 210. The method 2100 may further include determining 2114 flow analysis data from the product flow data. The flow analysis data may be for an individual item of sale 210 and/or for multiple items of sale 210. In embodiments, the flow analysis data is for a type of product represented by the individual item of sale 210. In embodiments, each of the items of sale 210 of the plurality is a SKU. The method 2100 may further include transmitting 2116 the flow analysis data.

Turning now to FIG. 22, in embodiments, method 2100 may further include generating 2118, via the plurality of micro-climate sensors 212, subsequent product flow data for each of a subsequent plurality of items of sale 210 flowing through the supply chain 110; and determining 2220 subsequent flow analysis data from the subsequent flow data. In embodiments, the supply chain 110 may include a source 112, e.g., a farm. In embodiments, the supply chain 110 may include a distribution center 116 and/or a store 118. In embodiments, the supply chain 110 may include a source 112, a distribution center 116, a transport vehicle 114, a store 118, locations within a store 118, transport to a customer location 130, and locations therebetween.

Figure 23:
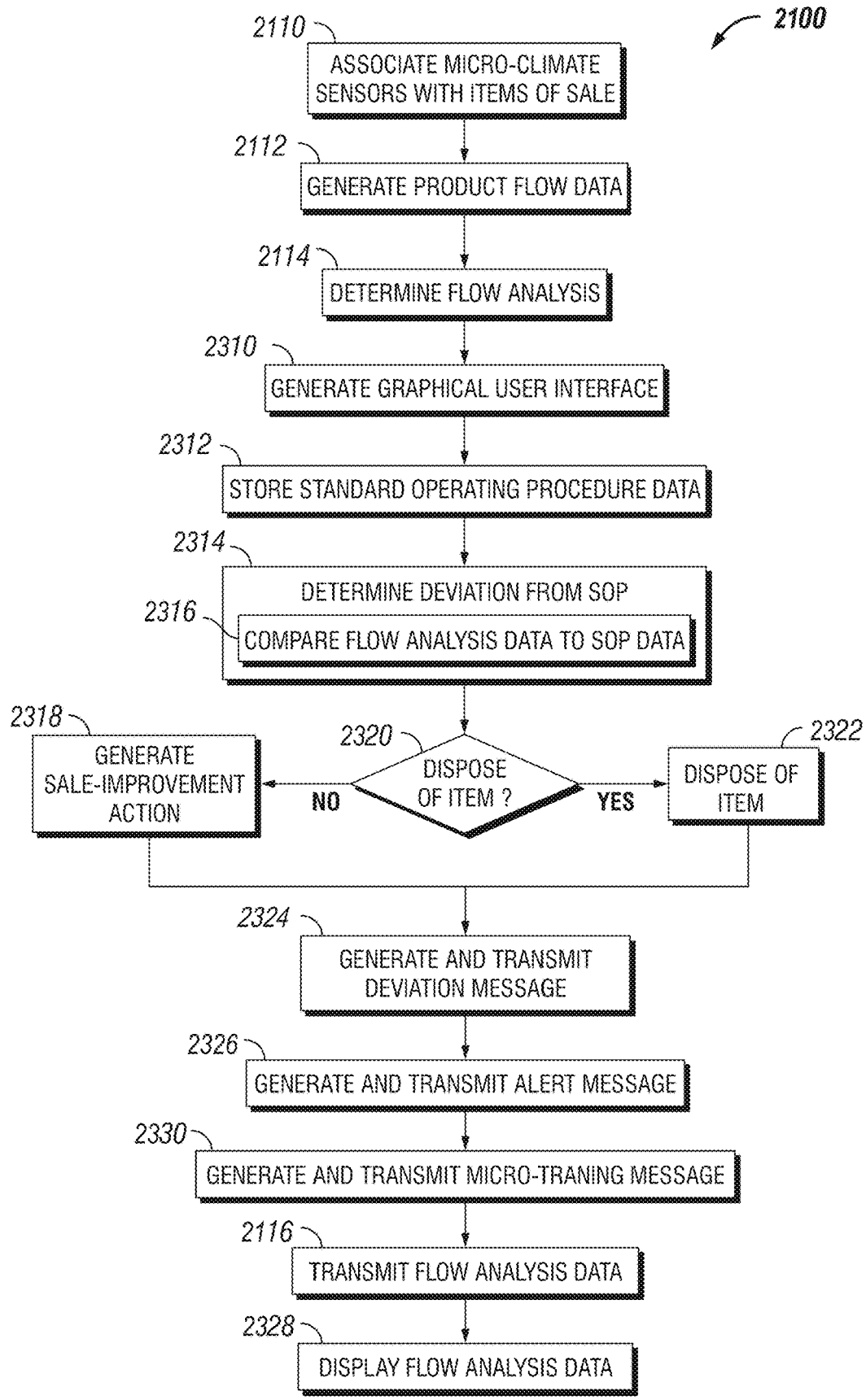
FIG. 23 depicts a method in accordance with an embodiment of the system for product management.

Turning now to FIG. 23, the method 2100 may include generating 2310, based at least in part on the flow analysis data, a graphical user interface that depicts a contiguous view of the flow analysis data for at least one of the items of sale 210 of the plurality along the supply chain 110. For example, in embodiments, the graphical user interface provides a view of the condition of an item of sale from the source all the way to the store floor. In embodiments, the flow analysis data may include an indication that an item of sale 210 has experienced a product-life shortening event or product-quality reduction event, e.g., exposure to temperature non-compliant with a SOP. Non-limiting examples of product-life shortening events or product-quality reduction events may include non-SOP compliant temperatures, detection of moisture within a product packaging, detection of outgassing due to product decay and/or damage to the product packaging and/or consumable portion of the item of sale 210.

In embodiments, the method 2100 may include storing 2312 SOP data, corresponding to a SOP, and/or determining 2314 a deviation from the SOP data based at least in part on the flow analysis data. In embodiments, determining 2314 the deviation may include comparing 2316 the flow analysis data to the SOP data. In embodiments, the deviation may be based at least in part on a time of transit of at least one item of sale 210 along the supply chain 110. For example, it may be determined that a door to a vehicle 114 (FIG. 1) was left open too long, thus exposing items of sale 210 within the vehicle to non-SOP compliant temperatures. In embodiments, the deviation may be based at least in part on a time period of unloading an item of sale 210 at a point along the supply chain 110, e.g., loading dock 316 (FIG. 3), and/or a stocking event. In embodiments, the deviation may be based at least in part on a temperature of at least one item of sale 210 at a point along the supply chain 110. For example, in embodiments, an item of sale 210 may experience a temperature that is non-compliant with a SOP while being unloaded from a vehicle 114 and/or while being stocked into a container 318. For example, in embodiments, a customer order may experience a time that is non-compliant with an SOP while being transported from a store 118 to a customer location 130.

In embodiments, the method 2100 may include, in response to determining 2314 the deviation, generating 2318 a sale-improvement action for at least one item of sale 210. In embodiments, the sale-improvement action may be moving the at least one item of sale 210 and/or discounting the at least one item of sale 210. In embodiments, the method 2100 may further include determining 2320 that at least one item of sale 210 should be disposed of and, if so, disposing 2322 of the at least one item of sale 210.

Figure 24:
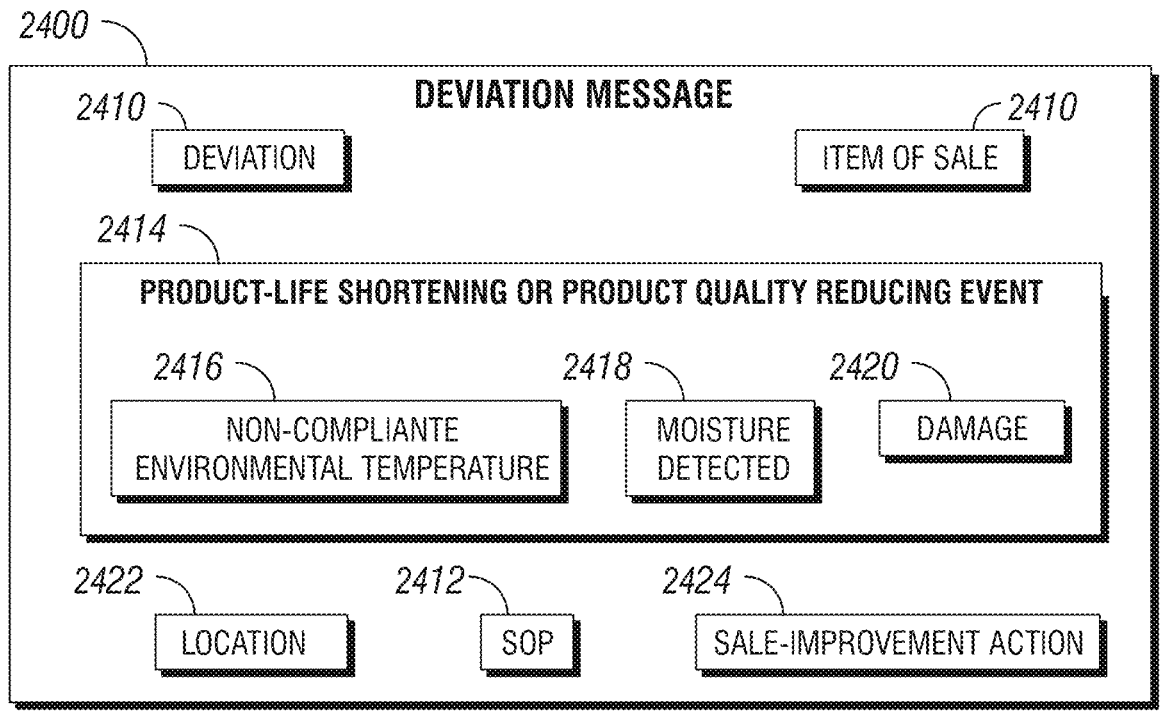
FIG. 24 depicts a deviation message in accordance with an embodiment of the system for product management.
Figure 25:
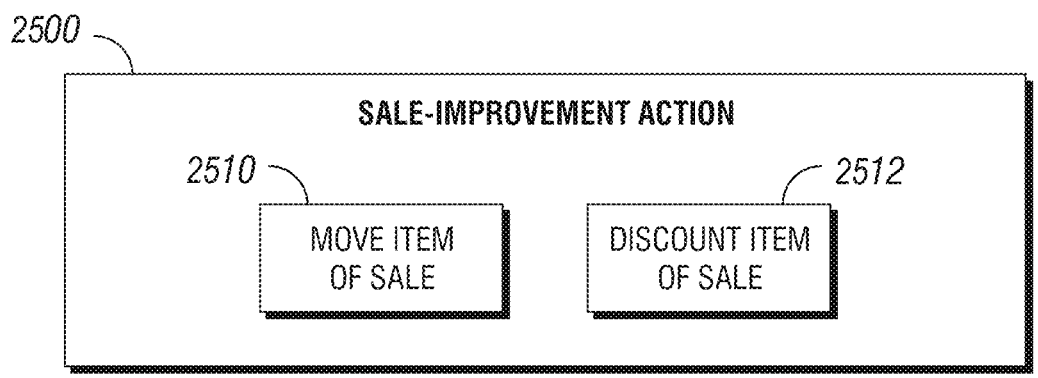
FIG. 25 depicts a sale-improvement action in accordance with an embodiment of the system for product management.

In embodiments, the method 2100 may further include generating and transmitting 2324 a deviation message 2400 (FIG. 24) that corresponds to the deviation. The deviation message may include an indication 2410 of the deviation to include identifying the affected items of sale 2410, 210. The deviation message may include an indication 2412 of the portion of the SOP that has been deviated from. The deviation message 2400 may include an indication of a product-life shortening or product-quality reducing event 2414, which may be a non-SOP compliant environmental temperature 2416, detected moisture 2418, and/or damage 2420, as described here and in other portions of this disclosure. The deviation message 2400 may further include location data 2422 corresponding to the location of the event giving rise to the deviation. The deviation message 2400 may include an indication 2424 of a sale-improvement action 2500 (FIG. 25). The sale-improvement action may include moving 2510 and/or discounting 2512 an item of sale 210 and/or any other sale-improvement action described herein. Generation and transmission 2326 of the deviation message 2400 may occur before substantial injury is imparted on an associated item of sale 210.

In embodiments, the method 2100 may further include generating 2326 and transmitting an alert message in response to determining 2314 the deviation. The alert message may include an indication of the deviation. The alert message may correspond to, and/or be structured to generate, a visual indication, an audio indication, and/or a text-based indication. The alert message may correspond to, and/or be structured to provide a micro-training event such as how to prevent future occurrences. The alert message may include a location of an item of sale 210 associated with the deviation. The alert message may be generated and transmitted 2326 when immediate, or near immediate, action, e.g., counteracting the condition giving rise to the deviation, needs to be taken to prevent substantial injury to an associated item of sale 210. For example, a server, e.g., 120 (FIG. 1) may determine that a box of strawberries is presently being exposed to temperatures above those specified in a SOP, wherein the server 120 proceeds to generate and send an alert message to a mobile electronic device, e.g., 126 (FIG. 3) in the possession of a store 118 employee 340. Upon receiving the alert, the employee 340 of the store 118 may then evaluate the strawberries and either dispose of them or apply a sale-improvement action, e.g., discount them or move them to a colder location. The method 2100 may further include displaying 2328 the flow analysis data, e.g., on a graphical interface in accordance with those described herein. The method 2100 may further include generating and displaying a micro-training event 2330, e.g., on a graphical interface in accordance with those described herein.

Figure 26:
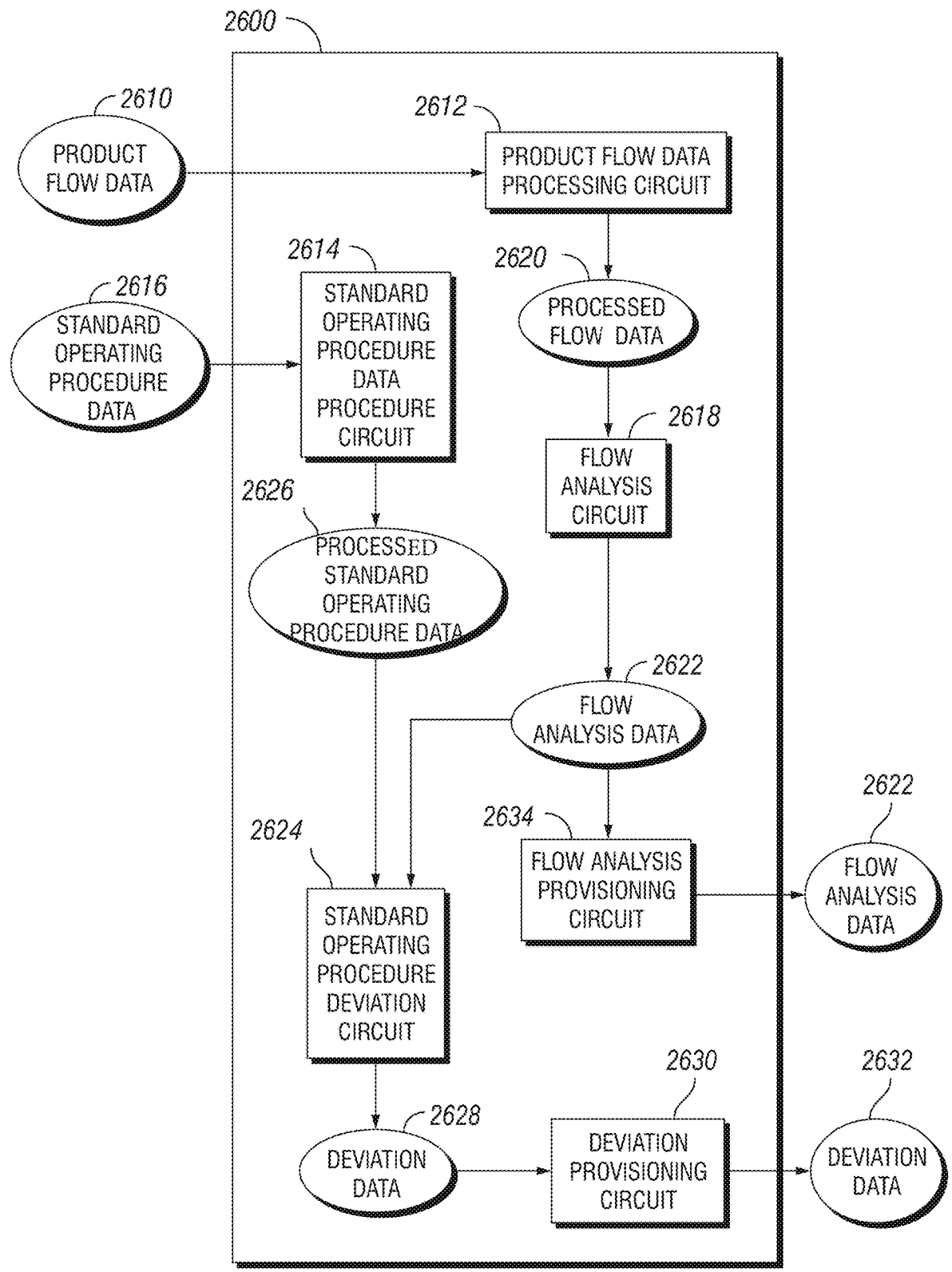
FIG. 26 depicts an apparatus in accordance with an embodiment of the system for product management.

Referring to FIG. 26, a non-limiting example of a system may be implemented using apparatus 2600 for processing product flow data 2610. The apparatus 2600 may be a server 120 and/or an electronic device 126. The apparatus 2600 may include a product flow data processing circuit 2612 to interpret product flow data 2610 generated from each of a plurality of items of sale 210 (FIG. 2) flowing through a supply chain 110 (FIG. 1). The apparatus 2600 may include a standard operating procedure (SOP) data processing circuit 2614 to interpret SOP data 2616, which may result in processed SOP data 2626. The apparatus 2600 may include a flow analysis circuit 2618 to determine flow analysis data 2620 in response to the product flow data 2622. The apparatus 2600 may include a SOP deviation circuit 2624 to determine deviation data 2628 based at least in part on the flow analysis data 2622 and the processed SOP data 2626, wherein the deviation data 2628 indicates a deviation from the SOP data. The SOP deviation circuit 2624 may compare the flow analysis data 2622 to the processed SOP data 2626. The apparatus 2600 may include a flow analysis provisioning circuit 2634 to transmit flow analysis data 2622.

The apparatus 2600 may further include a deviation provisioning circuit 2630 structured to transmit the deviation data 2632. The deviation data 2632 may include an indication of a location in the supply chain 110 such as a source, a farm 112, a distribution center 116, a store 118, a location in a store, a holding area for delivery to a customer (either in-store or curb-side 128), a transport vehicle 114 between locations such as source (e.g., farm 112) to distribution center 116, distribution center 116 to store 118, store 118 to customer 128, 130, and locations therebetween.

Figure 28:
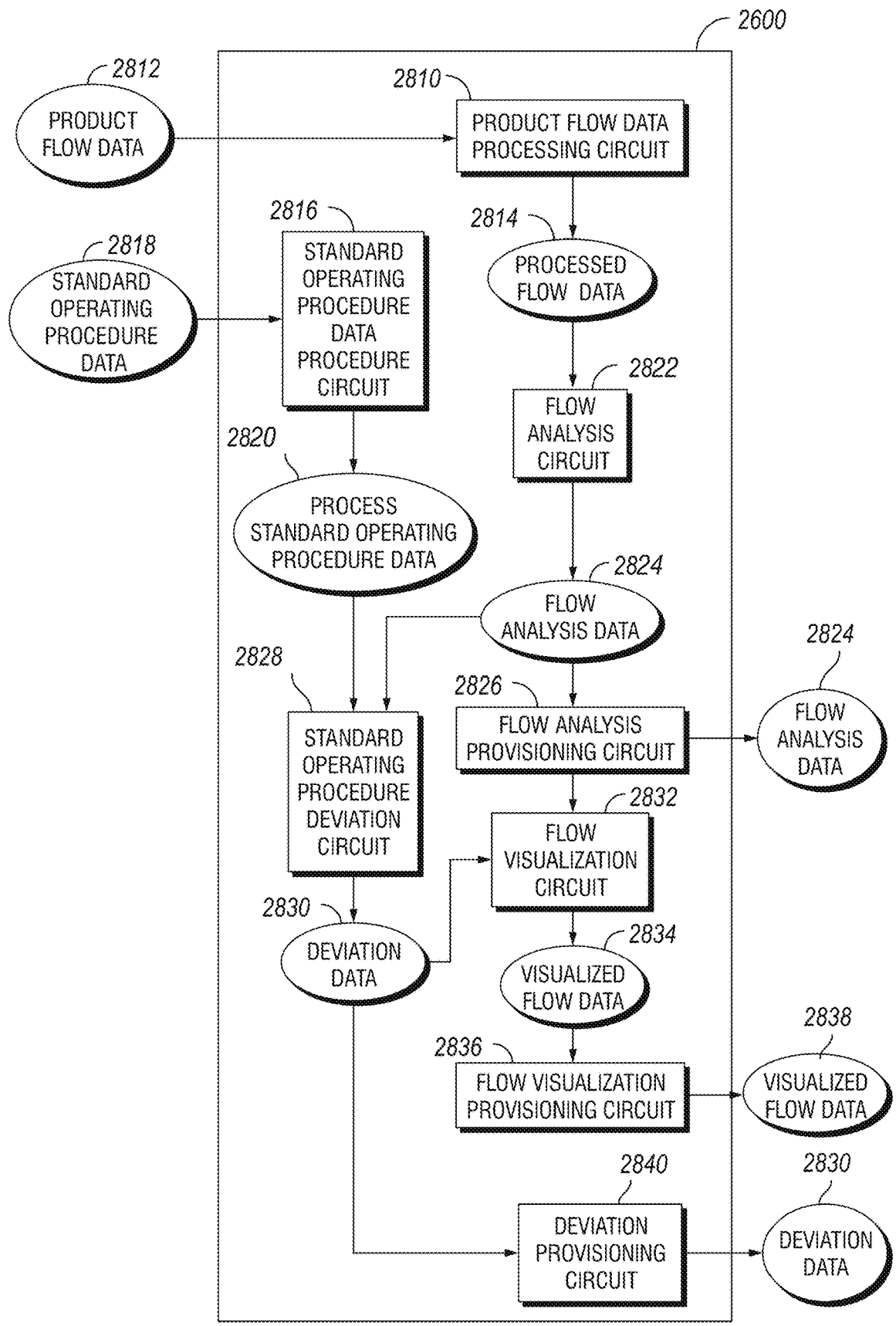
FIG. 28 depicts an apparatus in accordance with an embodiment of the system for product management.

As shown in FIG. 28, the apparatus 2600 may further include a flow visualization circuit structured 2832 to generate visualized flow data 2834 for depicting a contiguous view of the flow analysis data for at least one of the plurality of items of sale along the supply chain 110, where the supply chain includes two or more of a source such as a farm, a distribution center, a transport vehicle, a store, a location within a store, a transport vehicle to a customer location, locations therebetween, and the like. The items of sale may be a SKU, a produce product, a meat product, a dairy product, a fish product, a frozen product, or the like.

The deviation data 2830 (2628 in FIG. 26) may be based, at least in part on: a time of transit of at least one of the plurality of items of sale along the supply chain; a time period of at least one of: unloading at least one item of sale of the plurality at a point along the supply chain, or a stocking event corresponding to at least one item of sale of the plurality; and/or the like. The deviation data may include an indication that at least one item of sale of the plurality has experienced a product-life shortening or a product-quality reducing event such as: an environmental temperature that is out of compliance with the SOP data; detection of moisture within a product packaging of the at least one item of sale; damage to a product packaging of the at least one item of sale; or the like.

Figure 29:
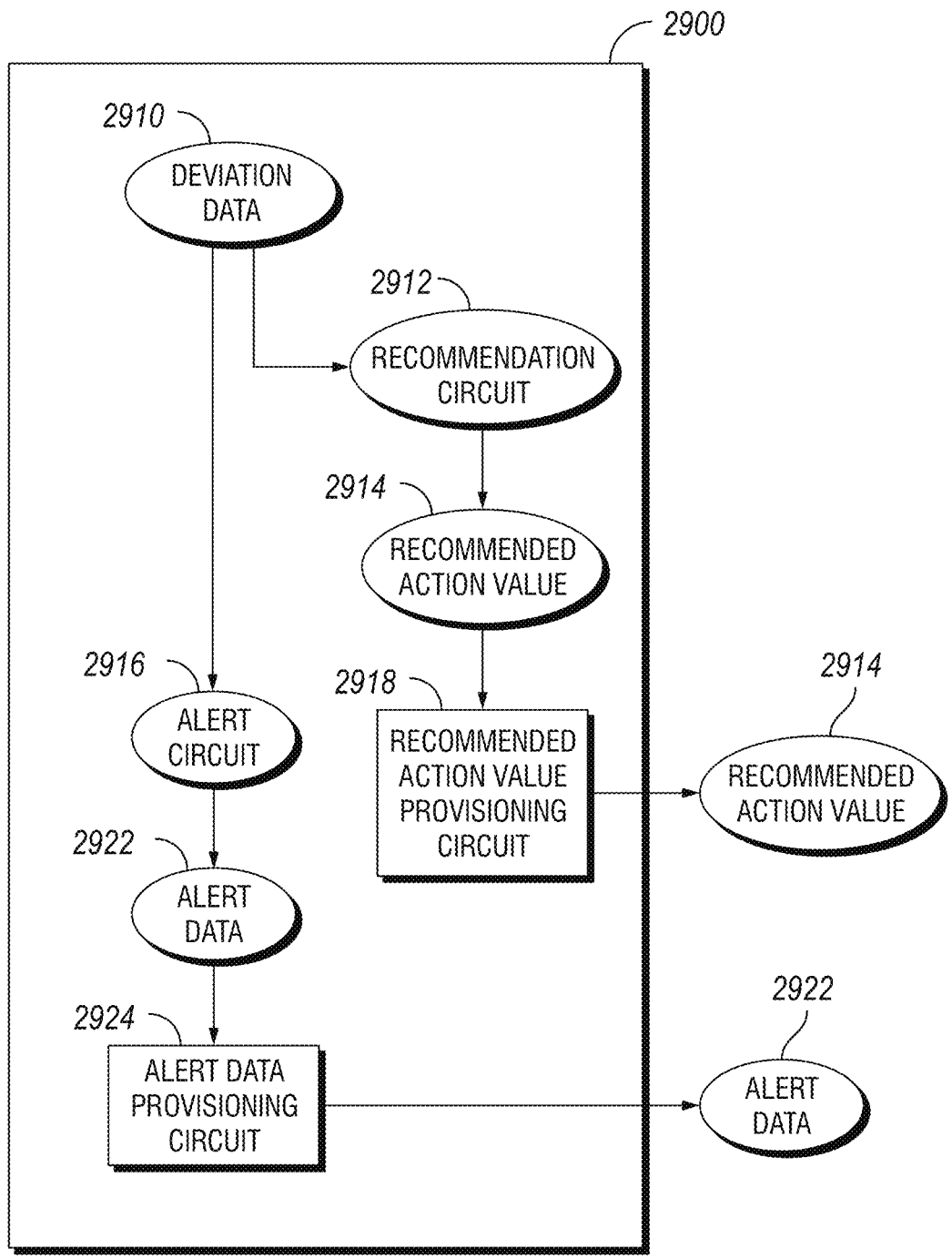
FIG. 29 depicts an apparatus in accordance with an embodiment of the system for product management.

Turning to FIG. 29, a further portion 2900 of the apparatus 2600 (FIG. 26) may further include a recommendation circuit 2912 to generate, in response to the deviation data 2910, a recommended action value 2914. The recommended action value 2914 may correspond to a sale-improvement action to be taken with respect to at least one of the plurality of items of sale. The sale-improvement action may include: moving the at least one item of sale to a location; placing the at least one item of sale directly on the floor; discounting the at least one item of sale; or the like. The recommended action value may correspond to an indication that at least one of the plurality of items of sale is to be disposed.

The apparatus 2900 may further include an alert circuit 2916 to generate, in response to the deviation data 2910, alert data 2922, which may include an indication of the deviation, and an alert provisioning circuit 2924 structured to transit the alert data. The alert data 2922 may correspond to a visual indication; an audio indication, a text-based indication, a haptic indication, and the like. In embodiments, the alert may include a micro-training event. A micro-training event may include a brief indication of how to avoid the conditions which led to the alert. The indication may be a simple reminder to close the cooler door or a statement of a particular SOP showing a deviation in practice. The brief indication may be audible, a short video, or a written indication.

Figure 27:
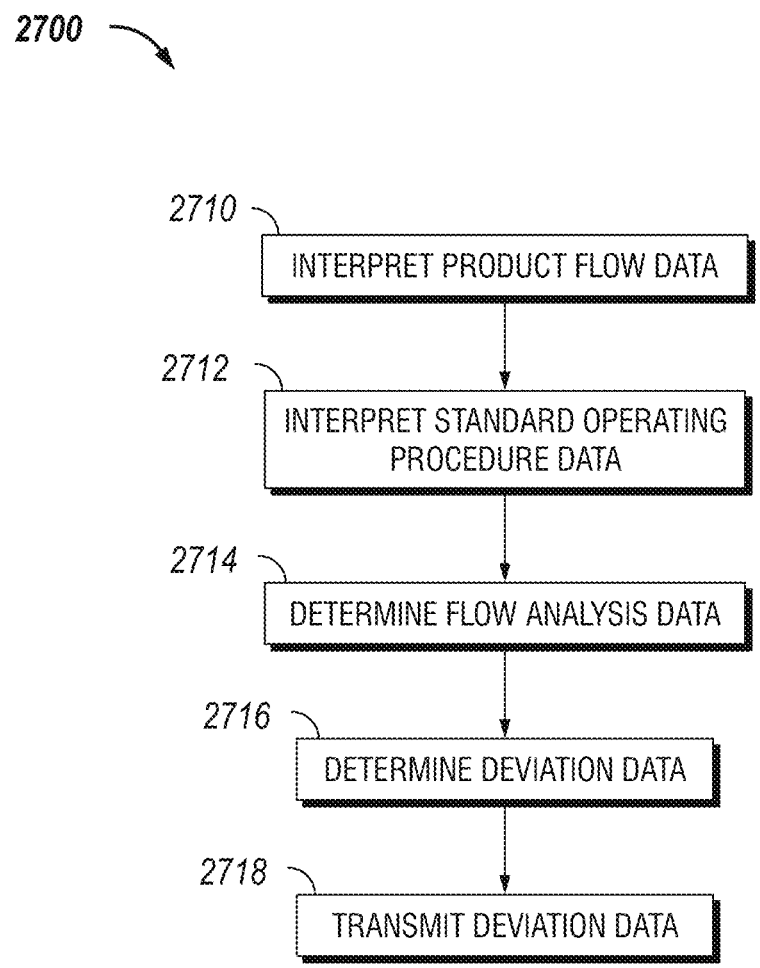
FIG. 27 depicts a method in accordance with an embodiment of the system for product management.

Referring to FIG. 27, a method 2700 for determining and transmitting deviation data is depicted. The method 2700 may include interpreting product flow data 2710 and interpreting standard operating procedure data 2712. The method 2700 may further include determining flow analysis data 2714. The method 2700 may further include determining deviation data 2716 and transmitting deviation data 2718.

Referring to FIG. 28, a portion of the apparatus 2600 may include a product flow data processing circuit 2810 to condition product flow data 2812, resulting in processed flow data 2814. Conditioning may include associating portions of the product flow data related to a common sensor. The apparatus 2600 may further include a standard operating procedure data processing circuit 2816 to transform standard operating procedure data 2818 into processed standard operating procedure data 2820. The apparatus 2600 may further include a flow analysis circuit 2822 to derive flow analysis data 2824 from processed flow data 2814. A flow analysis provisioning circuit 2826 may transmit the flow analysis data 2824. The apparatus 2600 may further include a standard operating procedure deviation circuit 2828 which may determine deviation data 2830 from flow analysis data 2824 and processed standard operating procedure data 2820. A deviation provisioning circuit 2840 may transmit deviation data 2830 to a mobile device, a display, a user interface, or the like. A flow visualization circuit 2832 may determine visualized flow data 2834 from deviation data 2830, flow analysis data 2824, and processed standard operating procedure data 2820. A flow visualization provisioning circuit 2836 may transmit visualized flow data 2838 to a mobile device, an electronic device, a display, a user interface, or the like, to interpret and display the visualized flow data 2838.

Continuing to FIG. 29, a portion 2900 of the apparatus 2600 (FIG. 26) may include a recommendation circuit 2912 to generate, in response to the deviation data 2910, a recommended action value 2914. A recommended action value provisioning circuit 2918 may transmit the recommended action value 2914 to an electronic device, mobile device, or the like to interpret and display the recommended action value 2914. The recommendation action value 2914 may correspond to a sale-improvement action to be taken with respect to at least one of the plurality of items of sale. The sale-improvement action may include moving the at least one item of sale to a location or discounting the at least one item of sale. The recommendation action value 2914 may indicate that at least one of the plurality of items of sale is to be disposed.

The portion 2900 of the apparatus 2600 may include an alert circuit 2916 to generate, in response to the deviation data 2910, alert data 2922 comprising an indication of the deviation. An alert provisioning circuit 2924 may transmit the alert data 2922. The alert data 2922 may include a visual indication, an audio indication, a text-based indication, a haptic indication, or the like.

Figure 30:
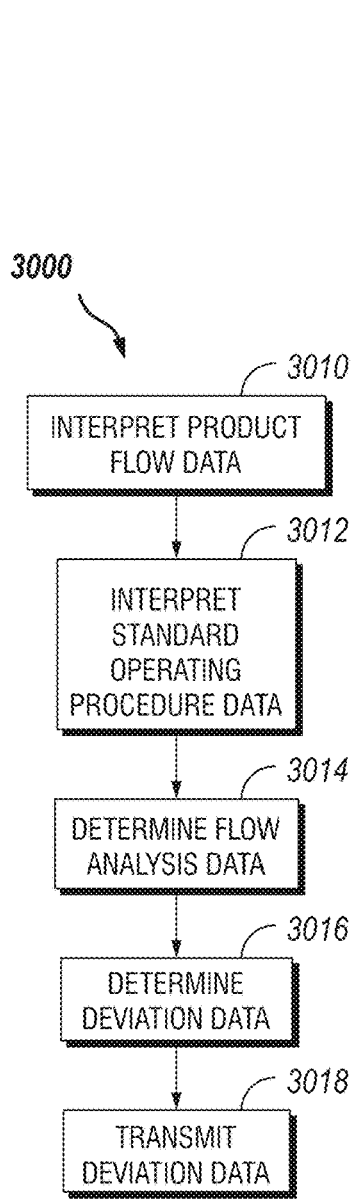
FIG. 30 depicts a method in accordance with an embodiment of the system for product management.

Referring to FIG. 30, a method 3000 for determining deviation data is depicted. The method 3000 may include interpreting product flow data 3010 and interpreting standard operating procedure data 3012. The method 3000 may further include determining flow analysis data 3014 from the interpreted product flow data and determining deviation data 3016 from the flow analysis data and the interpreted standard operating procedure data. The method 3000 may further include transmitting deviation data 3018.

Figure 31:
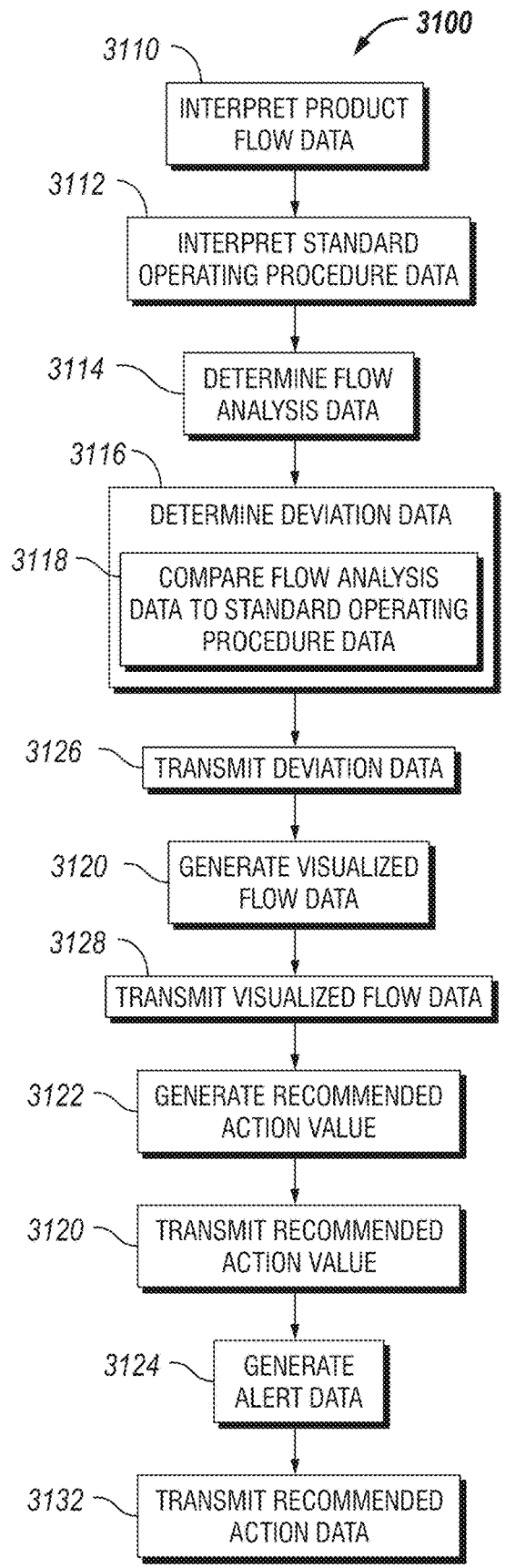
FIG. 31 depicts a method in accordance with an embodiment of the system for product management.

Referring to FIG. 31, a method 3100 for recommending an action based on flow data and deviation data is depicted. The method 3100 may include interpreting product flow data 3110 and interpreting standard operating procedure data 3112. The method 3100 may include determining flow analysis data 3114 and determining deviation data 3116 by comparing flow analysis data to standard operating procedure data 3118. The method 3100 may further include: generating visualized flow data 3120; generating recommended action value 3122; and generating alert data 3124. The method 3100 may further include: transmitting deviation data 3126; transmitting visualized flow data 3128; transmitting recommended action value 3130; and transmitting recommended action data 3132.

Figure 32:
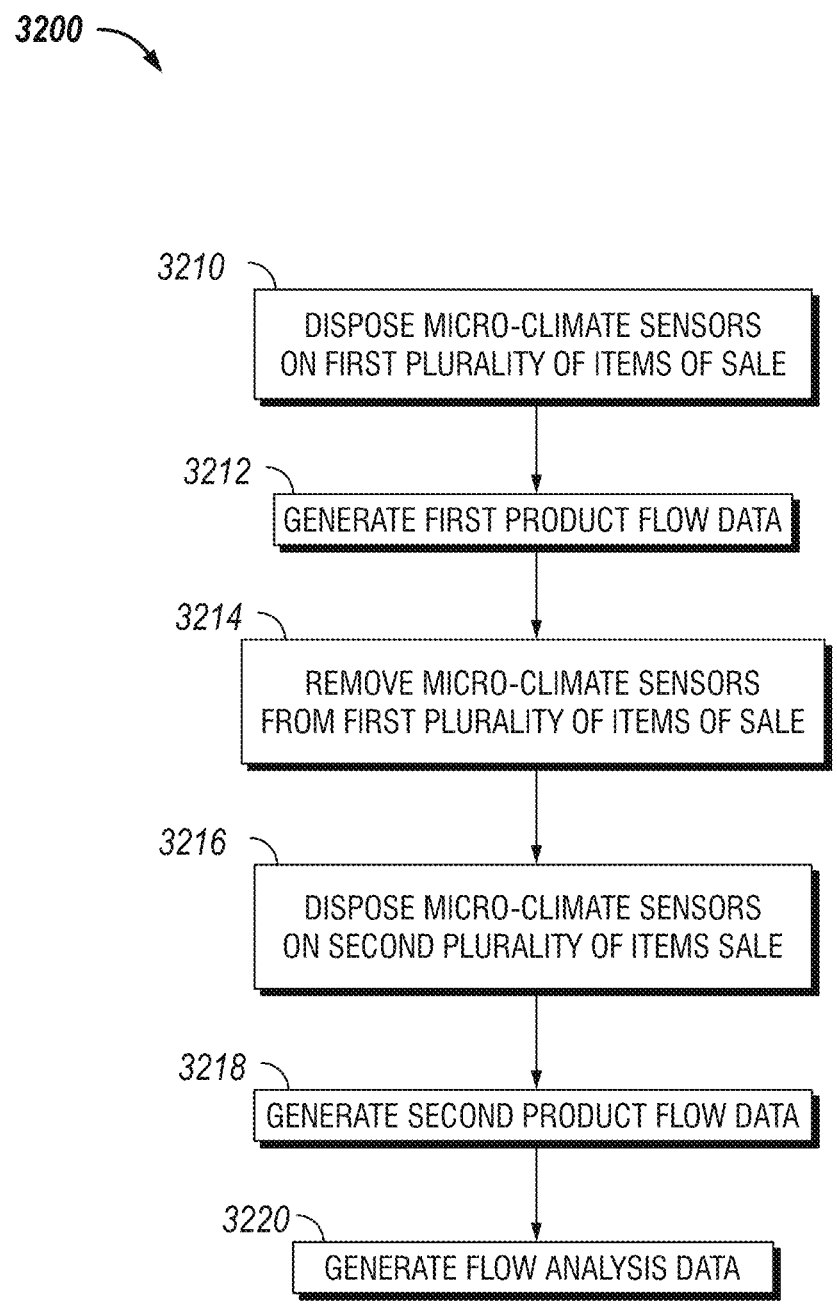
FIG. 32 depicts a method in accordance with an embodiment of the system for product management.

Referring to FIG. 32, a method 3200 for determining product flow analysis data based on a first and second product flow data is depicted. The method 3200 may include associating at least one micro-climate sensor with a corresponding item of sale 3210 of a first plurality of items of sale, and generating first product flow data 3212. The method 3200 further includes removing the at least one micro-climate sensor from the corresponding item of sale of the first plurality 3214; associating the at least one micro-climate sensor with a corresponding item of sale of a second plurality of items of sale 3216; and generating, via the at least one micro-climate sensor, second product flow data 3218 for each of the second plurality of items of sale while flowing through the supply chain. The method 3200 may then include determining product flow analysis data 3220 based on the first and the second product flow data.

Figure 33:
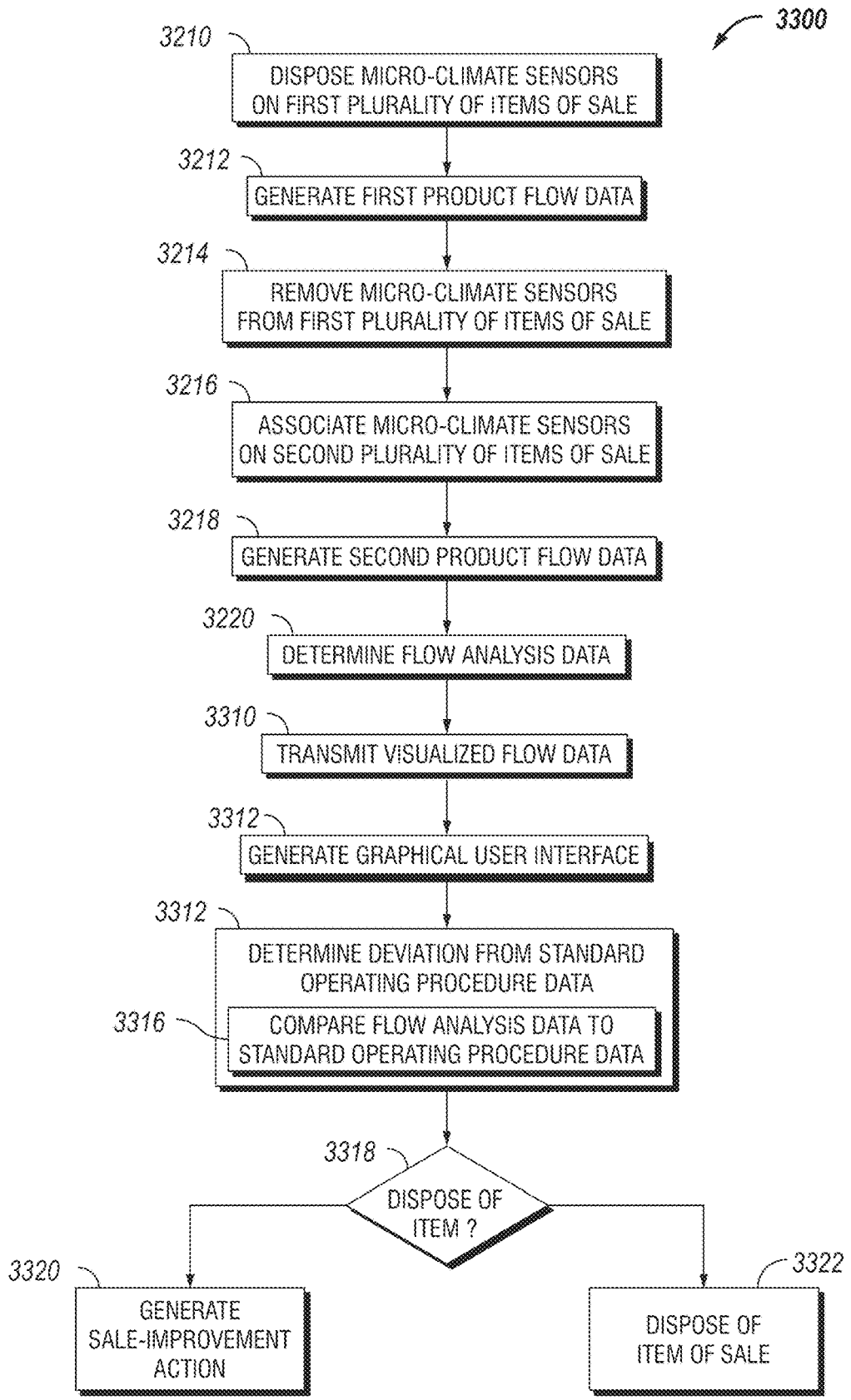
FIG. 33 depicts a method in accordance with an embodiment of the system for product management.

Referring to FIG. 33, a method 3300 for determining product flow data, deviations from SOP, and determining whether to dispose of an item based on deviation data is depicted. The method 3300 may include associating at least one micro-climate sensor with a corresponding item of sale 3210 of a first plurality of items of sale, and generating first product flow data 3212. The method 3300 further includes removing the at least one micro-climate sensor from the corresponding item of sale of the first plurality 3214; associating the at least one micro-climate sensor with a corresponding item of sale of a second plurality of items of sale 3216; and generating, via the at least one micro-climate sensor, second product flow data 3218 for each of the second plurality of items of sale while flowing through the supply chain. The method 3300 may then include determining product flow analysis data 3220 based on the first and the second product flow data. The method 3300 may further include transmitting visualized flow data 3310; and generating graphical user interface 3312. The method 3300 may include determining a deviation from the standard operating procedure data 3314 by comparing flow analysis data to standard operating procedure data 3316. The method 3300 may include determining whether to dispose of an item of sale 3318 and, if the determination is to retain the item, the method 3300 may include generating a sale-improvement action 3320 or, if the determination is to dispose of the item, disposing of the item of sale 3322.

Figure 34:
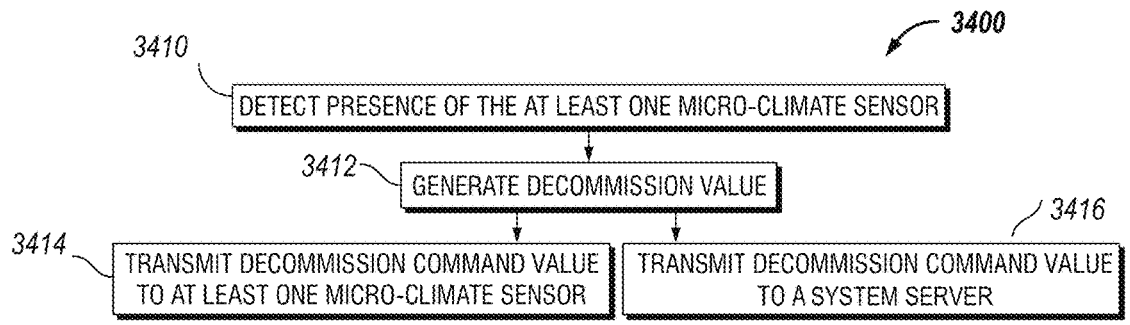
FIG. 34 depicts a method in accordance with an embodiment of the system for product management.

Referring to FIG. 34, a method 3400 for decommissioning a micro-climate sensor is depicted. The method 3400 may include: detecting the presence of at least one micro-climate sensor 3410; and generating a decommissioning command value 3412. In embodiments, a decommission command value may be transmitted 3414 to the at least one micro-climate sensor 3414. In embodiments, a decommission command value may be transmitted 3416 to a system server.

Figure 35:
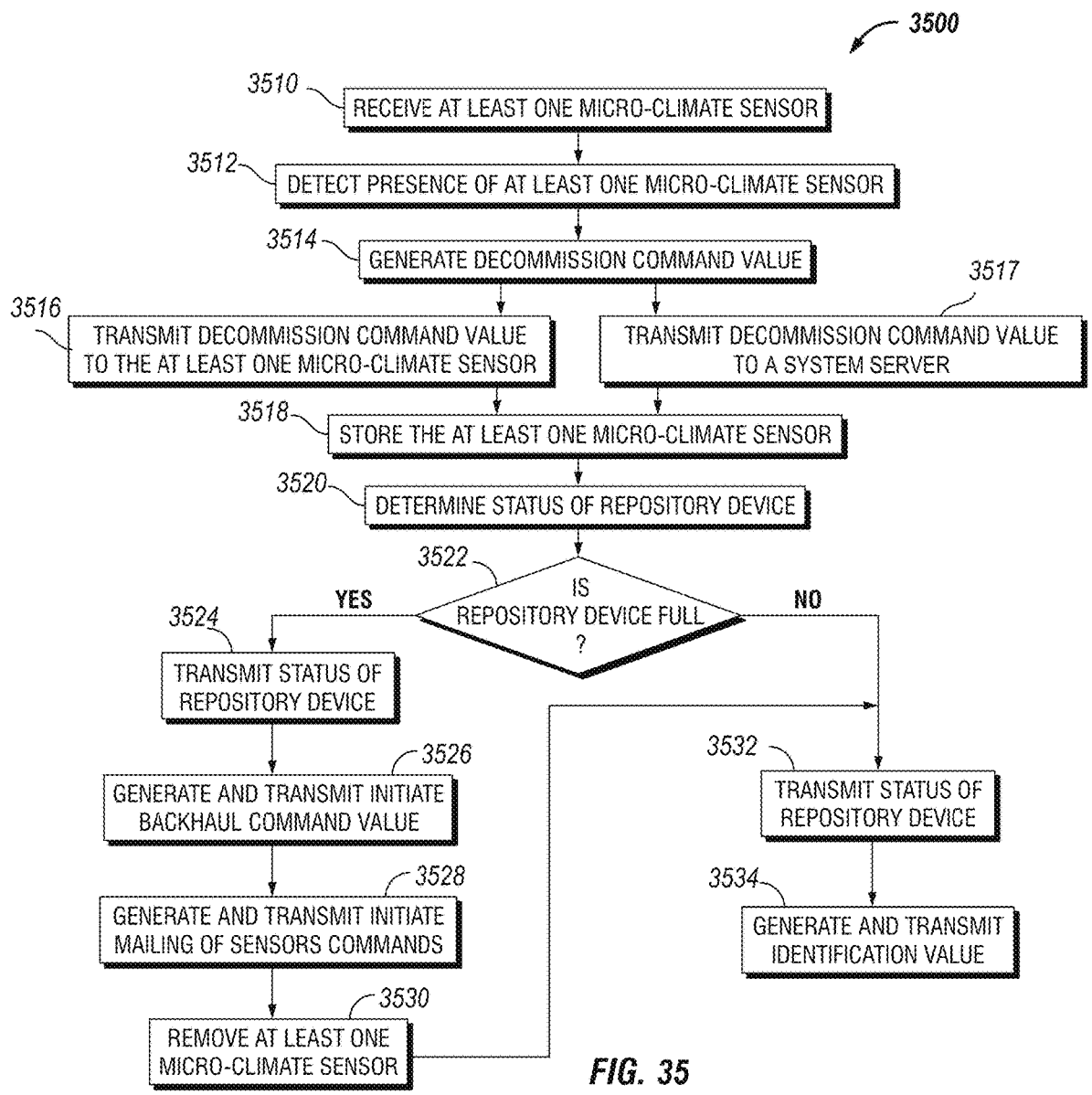
FIG. 35 depicts a method in accordance with an embodiment of the system for product management.

Referring to FIG. 35, a method 3500 for decommissioning a micro-climate sensor is depicted. The method 3500 may include receiving at least one micro-climate sensor 3510; detecting the presence of the at least one micro-climate sensor 3512 and generating a decommission command value 3514. In embodiments, a decommission command value may be transmitted 3516 to the at least one micro-climate sensor 3414. In embodiments, a decommission command value may be transmitted 3517 to a system server. Upon receipt of the decommission command value, the server, or an associated decommissioning circuit, may note the time the decommission command was generated and ignore any data received after that time from the micro-climate sensor. Upon receipt of the decommission command value, the server, or an associated decommissioning circuit, may mark the data received from the micro-climate server where any data after that point would be considered invalid. The method 3500 may further include storing the at least one micro-climate sensor 3518, and determining the status of the repository device 3520; including determining whether the repository device is full 3522. If the repository device is full, the method 3500 may include transmitting a status of the repository device 3524; generating and transmitting an initiate a backhaul command value 3526 or generating and transmitting an initiate mailing of sensor command value 3528 and removing at least one micro-climate sensor 3530. If the repository device is not full, the method 3500 may further include transmitting a status of the repository device 3532 and generating and transmitting an identification value 3534.

Figure 36:
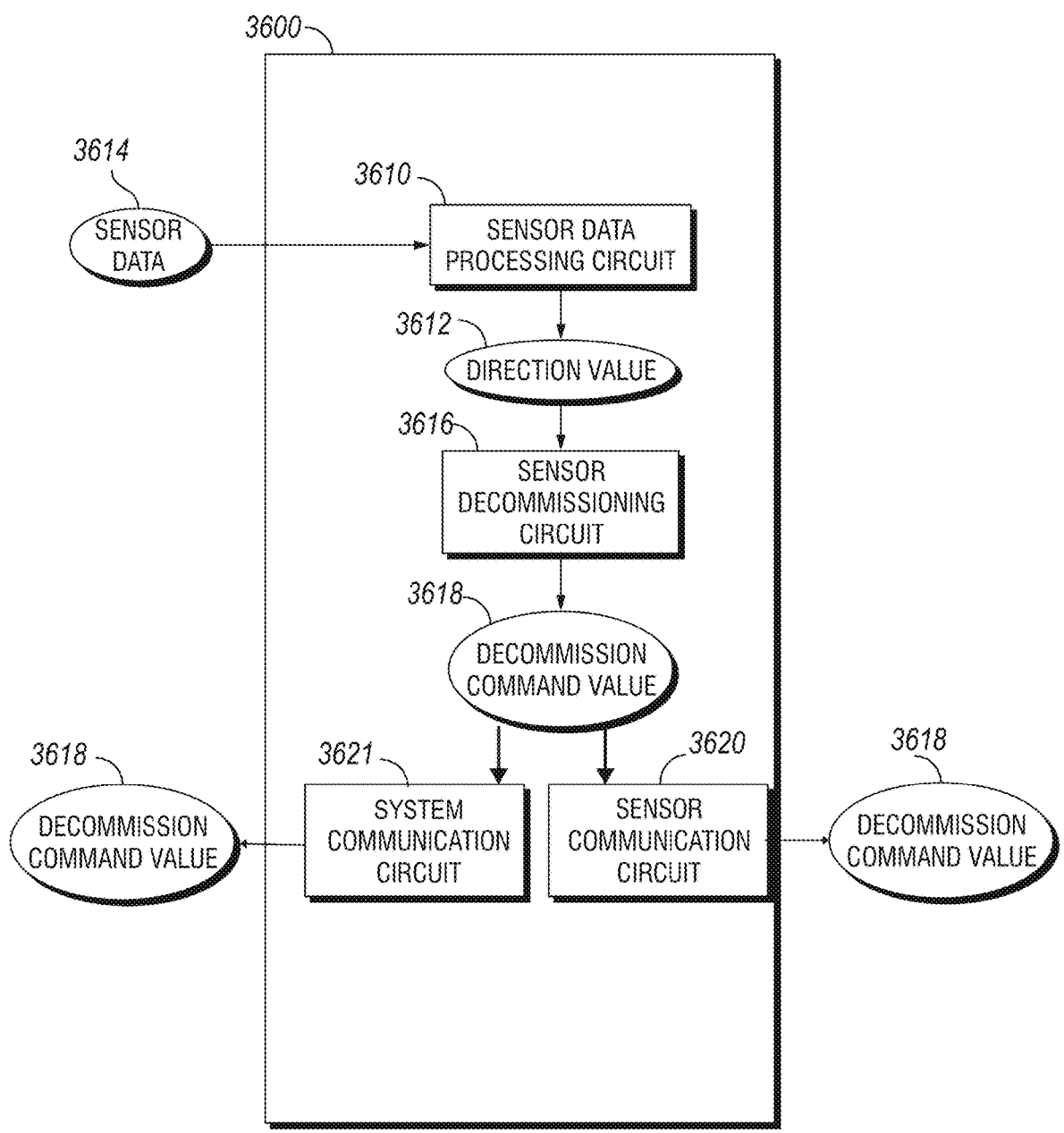
FIG. 36 depicts an apparatus in accordance with an embodiment of the system for product management.

Referring to FIG. 36, an apparatus 3600 for decommissioning a micro-climate sensor is depicted. The apparatus 3600 may include a sensor data processing circuit 3610 to determine a detection value 3612 based on sensor data 3614. The apparatus 3600 may further include a sensor decommissioning circuit 3616 to generate a decommissioning command value 3618 based on the detection value 3612. A sensor communication circuit 3620 communicates the decommission command value 3618 to the micro-climate sensor 212 to turn it off, put it into a low power mode, and the like. A system communication circuit 3621 may transmit the decommission command value 3618 to a system server to indicate a point time after which the data from that sensor is no longer valid.

Figure 37:
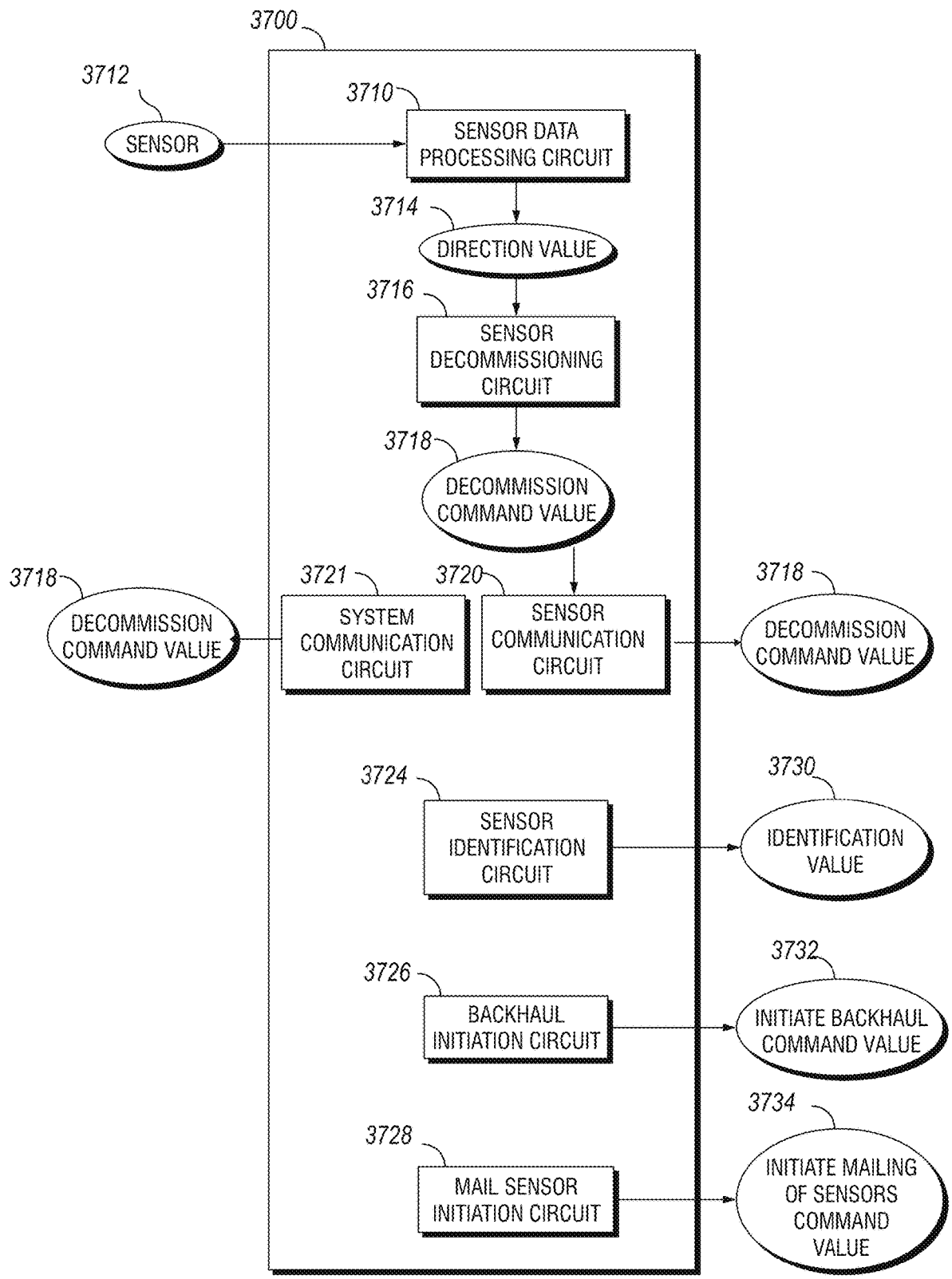
FIG. 37 depicts an apparatus in accordance with an embodiment of the system for product management.

Referring to FIG. 37, a system 3700 for recycling sensors is depicted. The system 3700 may include a sensor data processing circuit 3710 which determines a detection value 3714 based on sensor data 3712. A sensor decommissioning circuit 3716 may generate a decommission command value 3718 based on the detection value 3714. A sensor communication circuit 3720 may transmit the decommission command value 3718 to the micro-climate sensor 212 to turn it off, put it into a low power mode, and the like. A system communication circuit 3721 may transmit the decommission command value 3718 to a system server to indicate a point time after which the data from that sensor is no longer valid. A sensor identification circuit 3720 may transmit a sensor identification value 3730. Based on the decommission command value 3718, a backhaul initiation circuit 3726 may transmit an initiate a backhaul command value 3732. Based on the decommission command value 3718, a mail sensors initiation circuit 3728 may transmit an initiate mailing of sensors command value 3734.

Figures 38, 39:
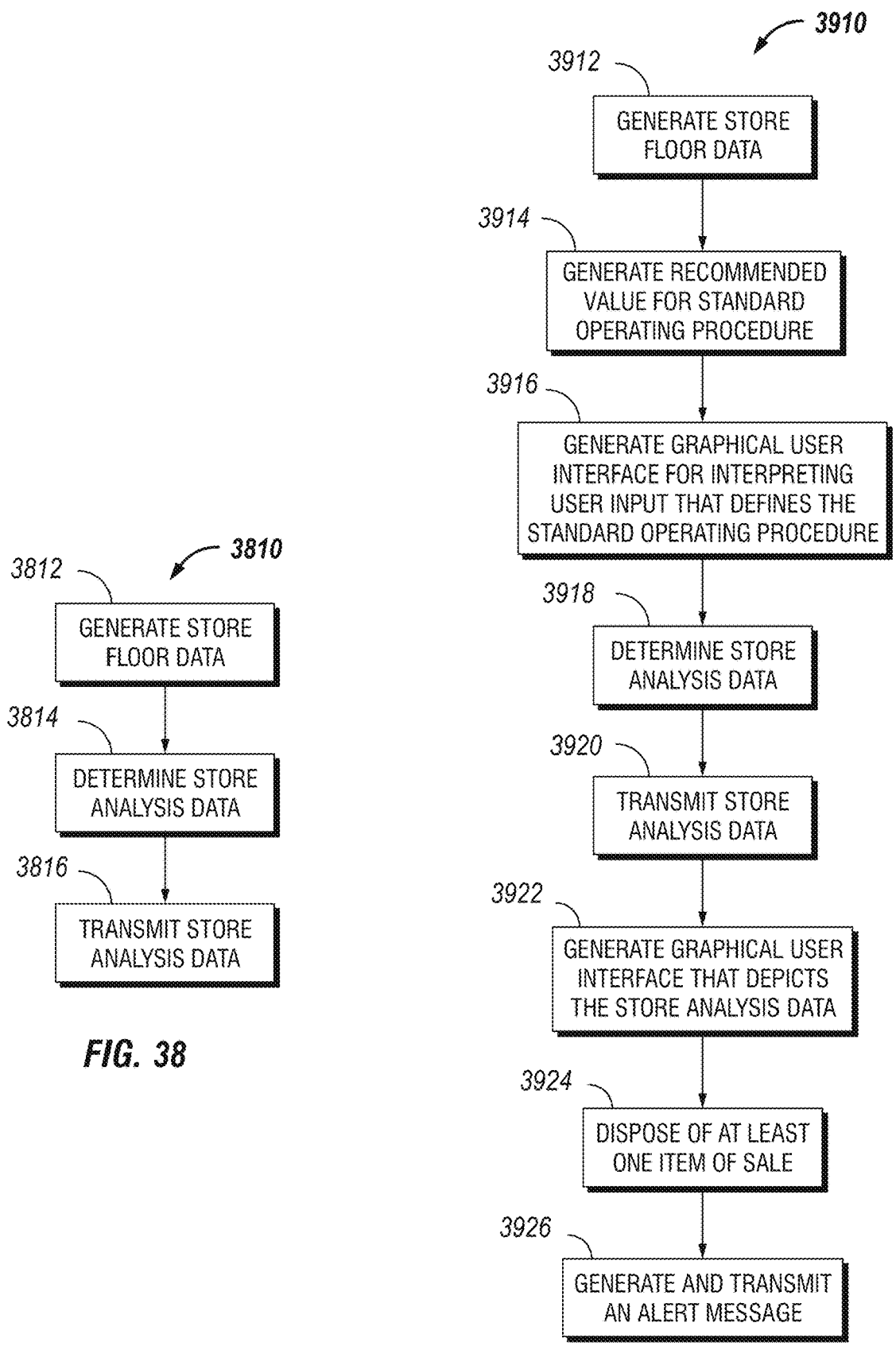
FIG. 38 depicts a method in accordance with an embodiment of the system for product management.
FIG. 39 depicts a method in accordance with an embodiment of the system for product management.

Referring now to FIG. 38, a method 3810 of determining a store's compliance with standard operating procedures is depicted. The standard operating procedure may be that of the store, a chain of stores of which the store is a part, a piece of equipment in the store (e.g. a freezer) or the like. An example method may include generating 3812, via a plurality of micro-climate sensors 212 disposed on a floor of a store, store floor data corresponding to a plurality of items of sale disposed on the floor. Store floor data may include temperature, humidity, location, light levels, light color temperature, operating cycles of equipment, status of doors (open or closed), vibration, movement, gas detection, and the like. In an illustrative example, a change in vibration or motion together with a change in temperature may indicate a change in location, arrival at a location or the like. Levels of ethylene may indicate a level of ripeness for associated bananas, avocados, and the like. The example method may further include determining 3814, based at least in part on standard operating procedure (SOP) data corresponding to an SOP of the store, store analysis data from the store floor data. The store analysis data may include an indicator of a measure of the store's compliance with the standard operating procedures (SOPs). Standard operating procedures may include temperature and humidity ranges for a particular item of sale, lighting conditions for particular items of sale (e.g. potatoes which will turn green with excess light), misting conditions or cycling in a display case, amount of time in display case between time spent in cold store, temperatures for freezers, display cases and the like, time spent on loading dock, time spent in cold store, location in cold store (based on vent location, door location, product velocity, and the like), length of time doors to various freezers and cold stores may remain open or shut, and the like. Standard operating procedures may include movement of an item of sale through a store such as whether and/or how long it remains on a receiving dock, whether it traveled out to the display floor and back instead of moving only what was needed for stocking the floor, path the item of sale through the store (e.g., length of time between locations, environment profile through which the item of sale travels (e.g., don't take frozen items through warmest part of store)), and the like. Standard operating procedures may include temperature ranges for a freezer, misting cycles for a produce bin, cutting off the ends of lettuce heads when browning occurs. Standard operating procedures may apply to producers and distribution centers such as a time from harvest to distribution center, a time from harvest to store, time item of sale spends in distribution center, acceptable temperature and humidity ranges for various items of sale during transport (e.g., from source to distribution center or distribution center to store). The example method may further include transmitting 3816 the store analysis data.

Referring now to FIG. 39, a method 3910 is depicted for using store floor data and standard operating procedures to identify next actions. An example method may include generating 3812, 3912 via a plurality of micro-climate sensors disposed on a floor of a store, store floor data corresponding to a plurality of items of sale disposed on the floor. In embodiments, the method may further comply generating 3914, via at least one processor, a recommended value for the SOP data and generating a graphical user interface 3916 structured to interpret user input data that defines the SOP data. The example method may also include determining 3918, based at least in part on standard operating procedure (SOP) data corresponding to a SOP of the store, store analysis data from the store floor data; and transmitting 3920 the store analysis data. In embodiments, the example method may further include generating 3922 a graphical user interface that depicts the store analysis data.

The store analysis data may include a measure value. The measure value may be based, at least in part, on a numerical scale between one (1) and one-hundred (100), wherein one (1) represents low compliance with the SOP and one-hundred (100) represent high compliance with the SOP. The measure value may be based at least in part on a color scale, wherein red represents low compliance with the SOP and green represents high compliance with the SOP.

The store analysis data may include an indication of a deviation from the SOP. The deviation may be based, at least in part on: a period of time that at least one item of sale has spent on the floor; a temperature experienced by at least one item of sale while on the floor; a humidity experienced by at least one item of sale while on the floor; a light profile experienced by at least one item of sale while on the floor; a temperature profile experienced by at least one item of sale while in the produce cooler; a location of at least one item of sale in the produce cooler or in a display case; a time spent by at least one item of sale while on the dock; and the like.

The store analysis data may include an indication that at least one item of sale has experienced a product-life shortening event or a product-quality reducing event. The product-life shortening or product-quality reducing event may include an environmental temperature that is out of compliance with an SOP; detection of moisture within a product packaging of the at least one item of sale; damage to a product packaging of the at least one item of sale; detection that a product is over ripe for sale; and the like.

In response to the deviation, a sale-improvement action may be generated such as moving the at least one item of sale to a location that may be different than the current location such as a sale shelf, end cap and the like. The self-improvement action may be discounting the at least one item of sale such as by placing a coupon on the packaging. In embodiments, the response to the deviation may be to dispose 3924 of the at least one item of sale.

In embodiments, an alert message may be generated and transmitted 3926 in response to determining the deviation from the SOP, wherein the alert message comprises an indication of the deviation. The alert message may include a visual indication, an audio indication, a text-based indication, a haptic indication, or the like.

Figure 40:
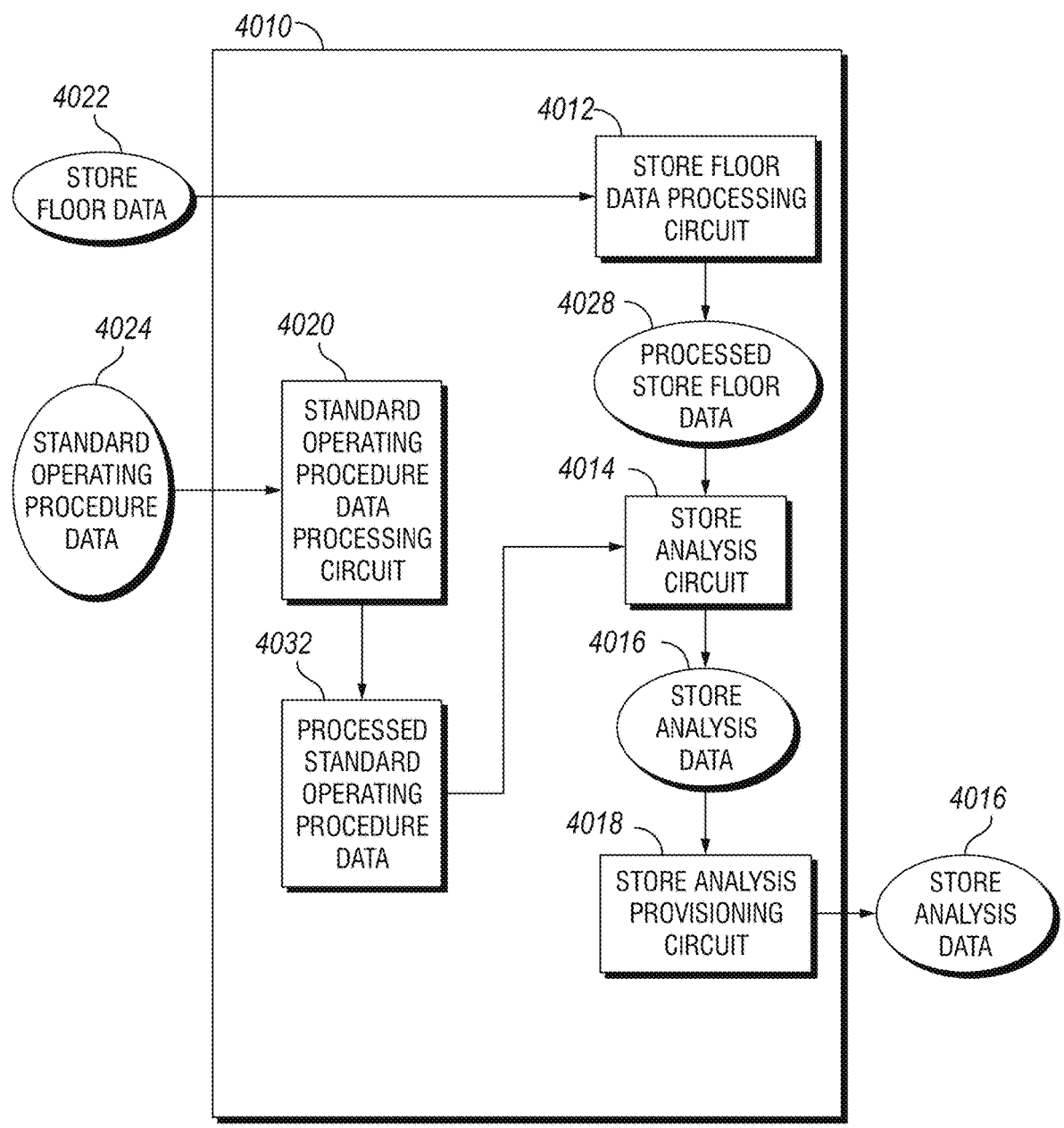
FIG. 40 depicts an apparatus in accordance with an embodiment of the system for product management.

Referring to FIG. 40, an apparatus 4010 for measuring a store's compliance with an SOP is depicted. The apparatus 4010 may include a store floor data processing circuit 4012 to interpret store floor data 4022 corresponding to a plurality of items of sale disposed on a floor of a store. The apparatus may include a standard operating procedure data processing circuit 4030 to take standard operating procedure data 4024 and determine processed standard operating procedure data 4032. The apparatus 4010 may further include a store analysis circuit 4014 to determine, based at least in part on processed standard operating procedure (SOP) data 4032 corresponding to a SOP of the store, store analysis data 4016 from the processed store floor data 4028. A store analysis provisioning circuit 4018 may transmit the store analysis data 4016, wherein the store analysis data 4016 indicates a measure of the store's compliance with the SOP.

Figure 41:
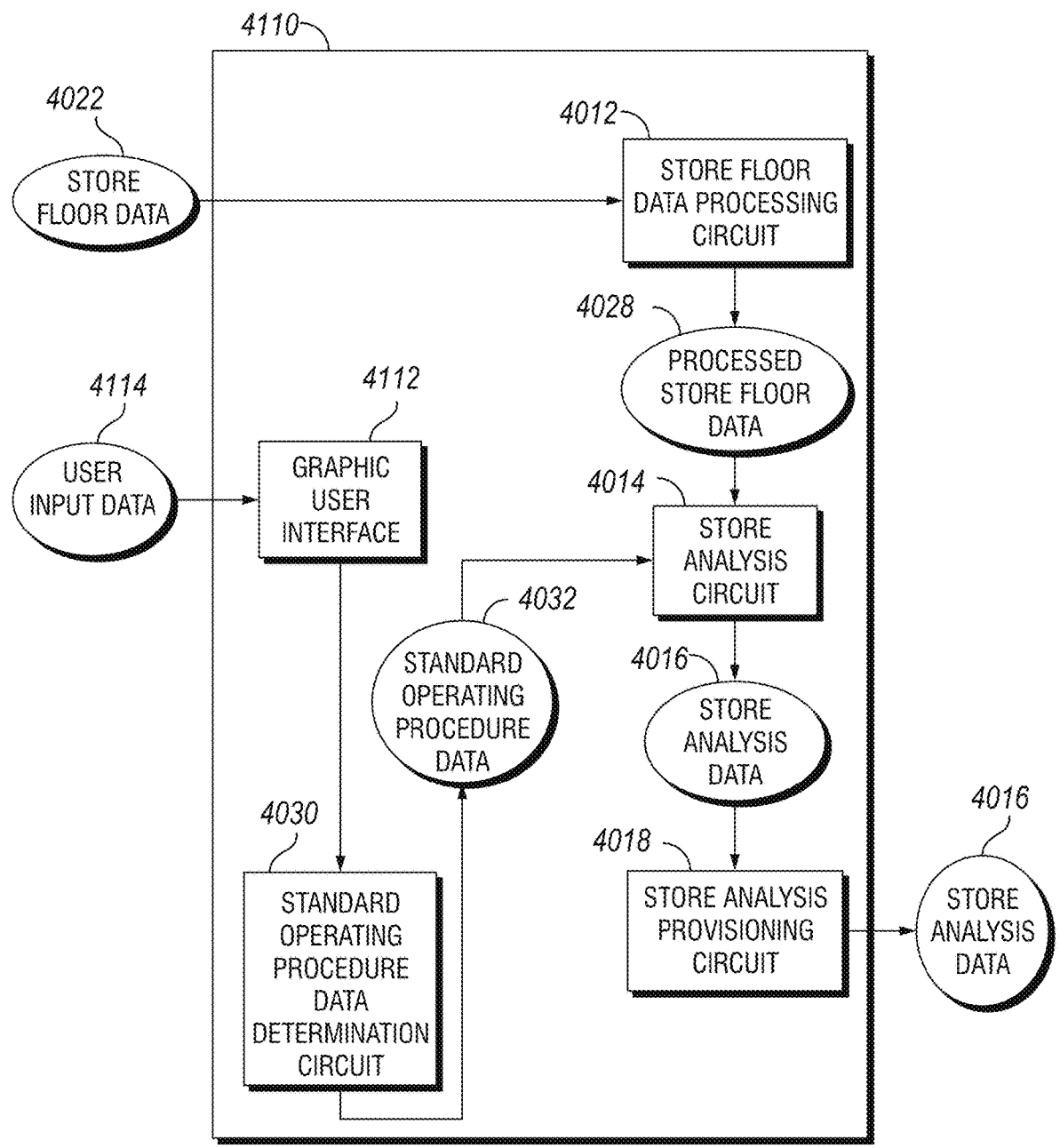
FIG. 41 depicts an apparatus in accordance with an embodiment of the system for product management.

Referring to FIG. 41, an apparatus 4110 for measuring a store's compliance with an SOP is depicted. The apparatus 4110 may include a store floor data processing circuit 4012 to interpret store floor data 4022 corresponding to a plurality of items of sale disposed on a floor of a store. The apparatus 4110 may also include a graphical user interface 4112 to generate graphical user interface data to generate a graphical user interface for receiving user input data 4114. A user input processing circuit interprets the user input data 4114 which is provided to a SOP determination circuit 4030 structured to determine the processed SOP data 4032 based at least in part on the user input data 4114. The apparatus 4110 may further include a store analysis circuit 4014 to determine, based at least in part on processed value for the SOP data 4032 corresponding to a SOP of the store, store analysis data 4016 from the processed store floor data 4028. A store analysis provisioning circuit 4018 may transmit the store analysis data 4016, wherein the store analysis data 4016 indicates a measure of the store's compliance with the SOP.

Figure 42:
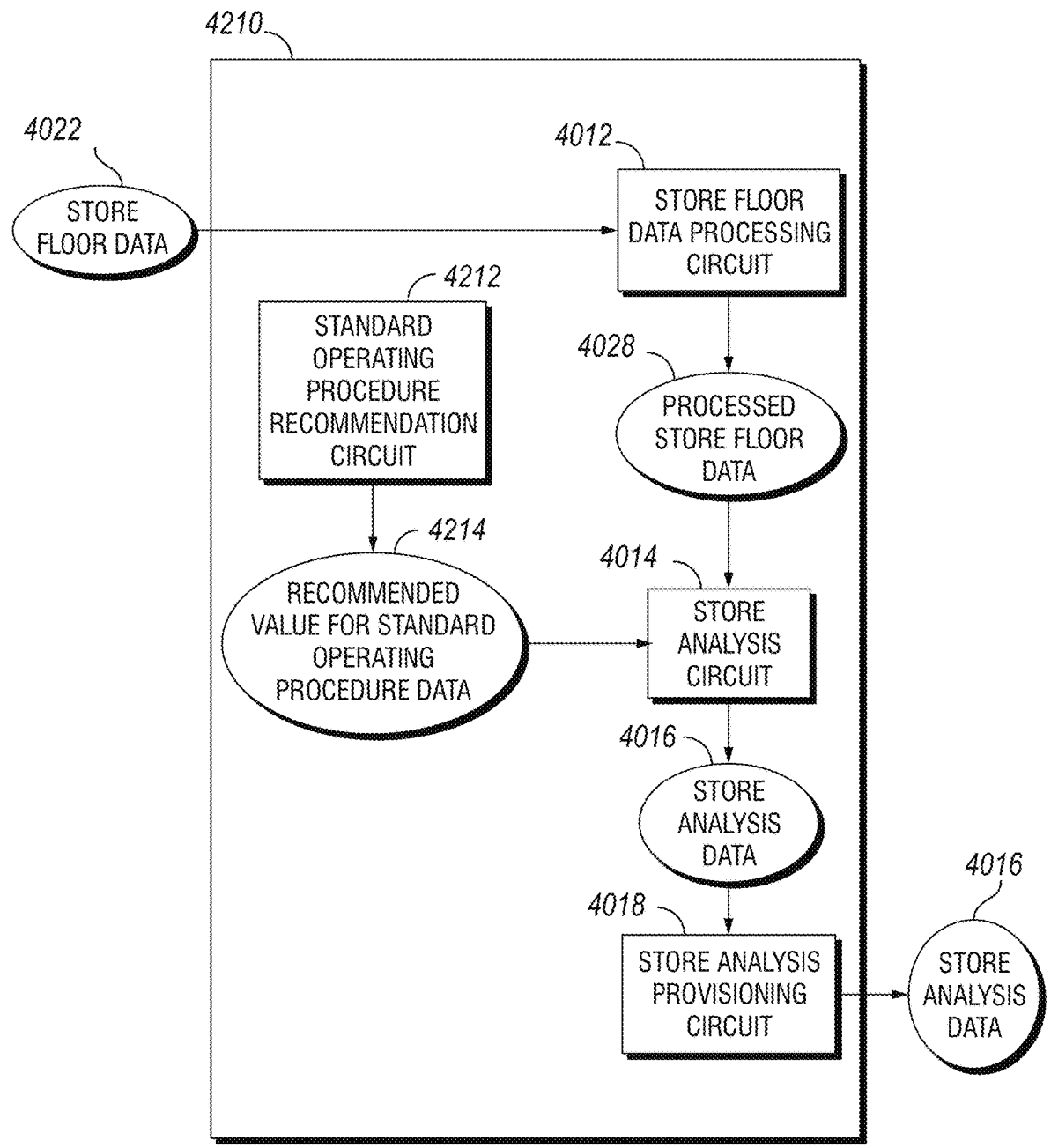
FIG. 42 depicts an apparatus in accordance with an embodiment of the system for product management.

Referring to FIG. 42, the apparatus 4210 for measuring a store's compliance with an SOP is depicted. The apparatus 4210 may include a store floor data processing circuit 4012 to interpret store floor data 4022 corresponding to a plurality of items of sale disposed on a floor of a store. An apparatus 4210 may also include a SOP recommendation circuit 4212 to generate a recommended value for the SOP data 4214. The apparatus 4210 may further include a store analysis circuit 4014 to determine, based at least in part on recommend value for the SOP data 4214 corresponding to a SOP of the store, store analysis data 4016 from the processed store floor data 4028. A store analysis provisioning circuit 4018 may transmit the store analysis data 4016, wherein the store analysis data 4016 indicates a measure of the store's compliance with the SOP.

Figure 43:
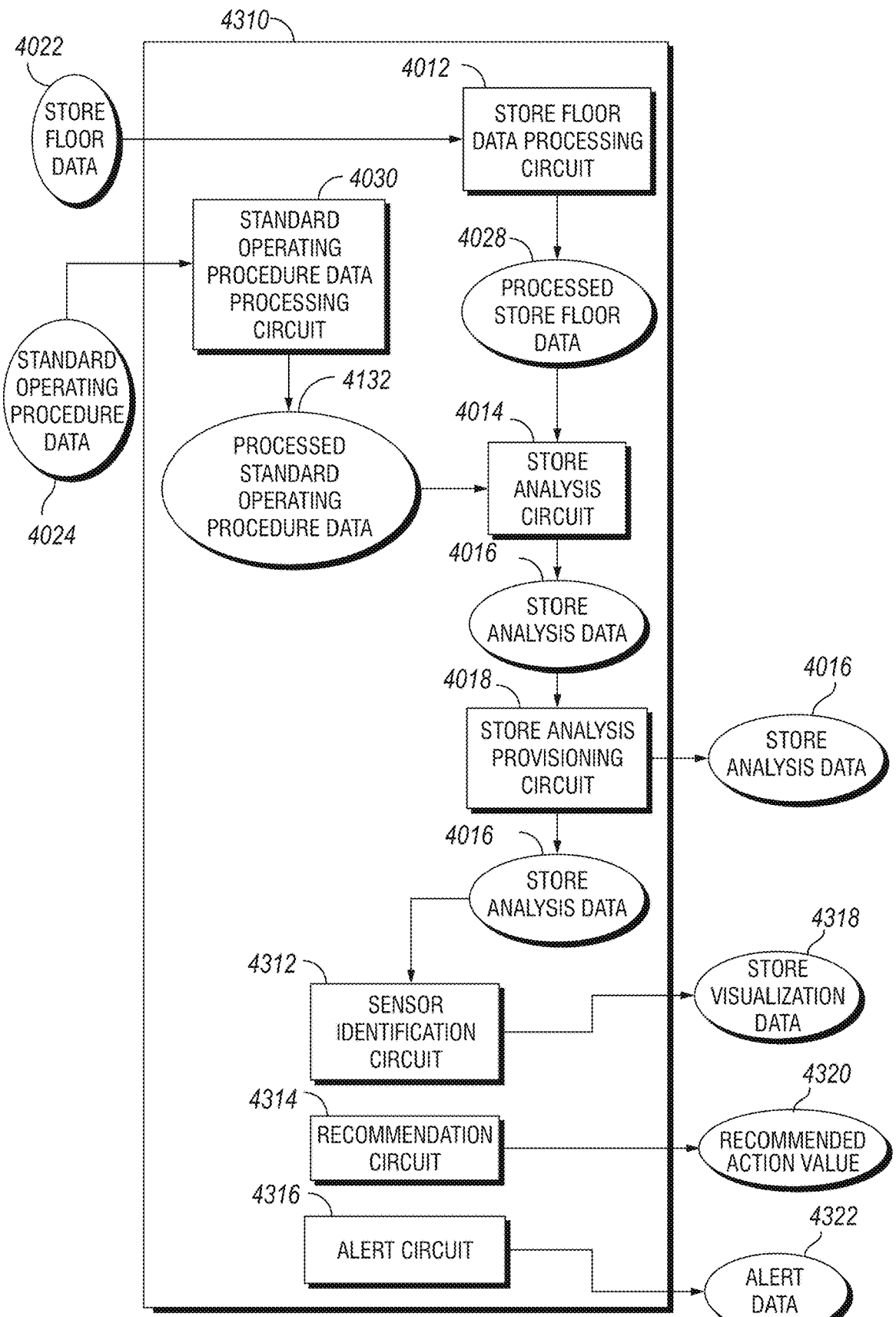
FIG. 43 depicts an apparatus in accordance with an embodiment of the system for product management.
Figure 46:
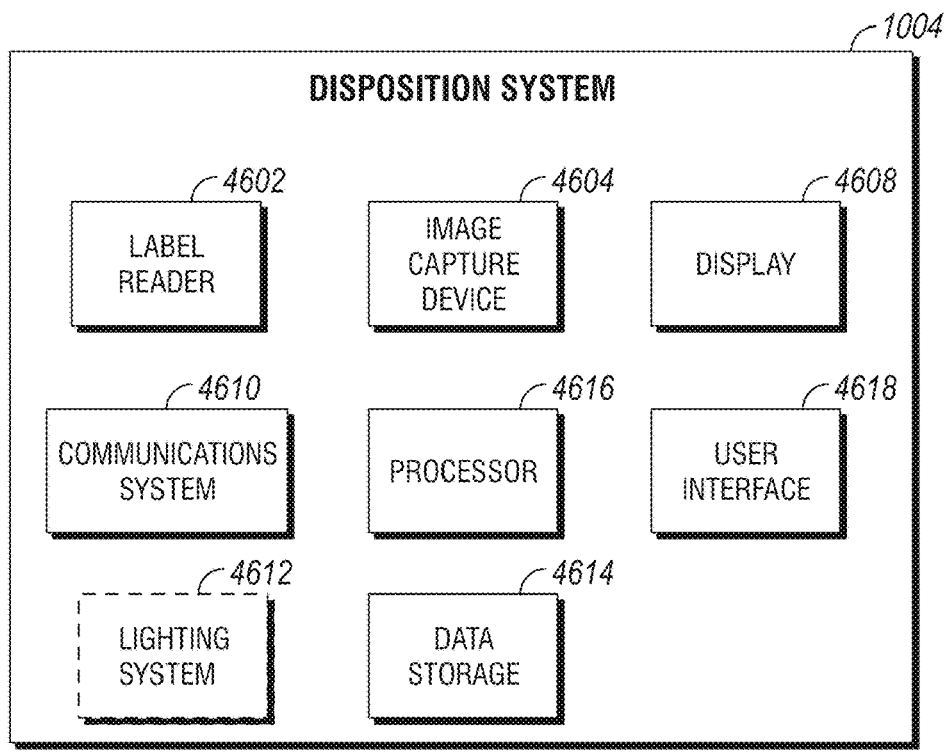
FIG. 46 depicts components of an embodiment of a disposition system.

Referring to FIG. 43, an apparatus 4310 for measuring a store's compliance with an SOP is depicted. The apparatus 4310 may include a store floor data processing circuit 4012 to interpret store floor data 4022 corresponding to a plurality of items of sale disposed on a floor of a store. The apparatus may include a standard operating procedure data processing circuit 4030 to take standard operating procedure data 4024 and determine processed standard operating procedure data 4032. The apparatus 4010 may further include a store analysis circuit 4014 to determine, based at least in part on processed standard operating procedure (SOP) data 4032 corresponding to a SOP of the store, store analysis data 4016 from the processed store floor data 4028. A store analysis provisioning circuit 4018 may transmit the store analysis data 4016, wherein the store analysis data 4016 indicates a measure of the store's compliance with the SOP. The apparatus 4010 may also include a recommendation circuit 4314 to generate, in response to the indication of the deviation, a recommended action value 4320 corresponding to a sale-improvement action to be taken with respect to at least one of the plurality of items of sale. A sale improvement action may include: moving the at least one item of sale to a location; discounting the at least one item of sale; and the like. The recommendation circuit 4314 may further generate, in response to the indication of the deviation, a recommended action value 4320 corresponding to disposal of at least one of the plurality of items of sale. The apparatus 4310 may also include an alert circuit 4316 structured to generate alert data 4322 including an indication of the deviation and an alert provisioning circuit to transmit the alert data 4322. The alert data 4322 may include a visual indication; an audio indication; a text-based indication, a haptic indication or the like. The alert data 4322 may include a location of the item of sale with respect to the floor.

Referring to FIG. 44, a method 4410 for measuring a store's compliance with an SOP is depicted. The method 4410 may include interpreting store floor data 4412 corresponding to a plurality of items of sale disposed on a floor of a store, determining store analysis data 4414, based at least in part on standard operating procedure (SOP) data corresponding to a SOP of the store and the store floor data 4412. The method 4410 may further include transmitting the store analysis data 4416, where the store analysis data indicates a measure of the store's compliance with the SOP.

Referring to FIG. 45, a method 4510 for measuring a store's compliance with an SOP is depicted. The method 4510 may include generating graphical user interface data 4514 to generate a graphical user interface for receiving user input data and interpreting the user input data 4516. The method 4510 may include generating a recommended value for SOP data 4512 and determining the SOP data 4518 based at least in part on the user input data. The method 4510 may include interpreting store floor data 4412 corresponding to a plurality of items of sale disposed on a floor of a store, determining store analysis data 4414, based at least in part on standard operating procedure (SOP) data corresponding to a SOP of the store and the store floor data 4412. The method 4510 may further include transmitting the store analysis data 4416, where the store analysis data indicates a measure of the store's compliance with the SOP. The method 4510 may include generating store visualization data 4520 for depicting the store analysis data and transmitting the store visualization data 4522. The store analysis data may include a measure value. The measure value may be based at least in part on a numerical scale between one (1) and one-hundred (100), wherein one (1) represents low compliance with the SOP and one-hundred (100) represents high compliance with the SOP. The measure value may be based at least in part on a color scale, wherein red represents low compliance with the SOP and green represents high compliance with the SOP. The store analysis data may include an indication of a deviation from the SOP where the deviation is based at least in part on: a period of time that at least one item of sale of the plurality has spent on the floor; an environmental temperature experienced by at least one item of sale of the plurality while on the floor; an indication that at least one item of sale of the plurality has experienced a product-life shortening event or a product-quality reducing event. A product-life shortening or product quality reducing event may include: an environmental temperature that is out of compliance with the SOP; detection of moisture within a product packaging of the at least one item of sale; damage to a product packaging of the at least one item of sale, and the like.

The method 4510 may include generating alert data 4528 and transmitting the alert data 4530. The alert data may include a visual indication, an audio indication, a text-based indication, a haptic indication, or the like. The alert data may include a location of the item of sale with respect to the floor.

Figure 47:
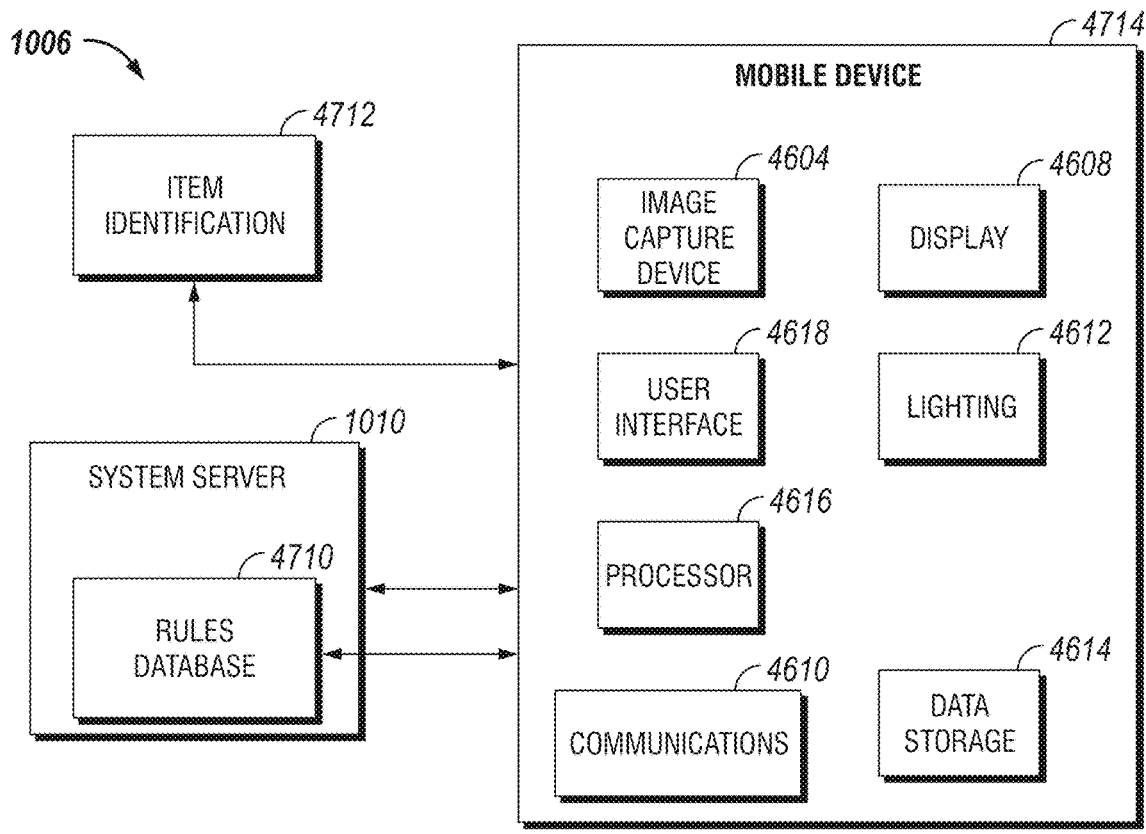
FIG. 47 depicts an example of an embodiment of a disposition system.
Figure 48:
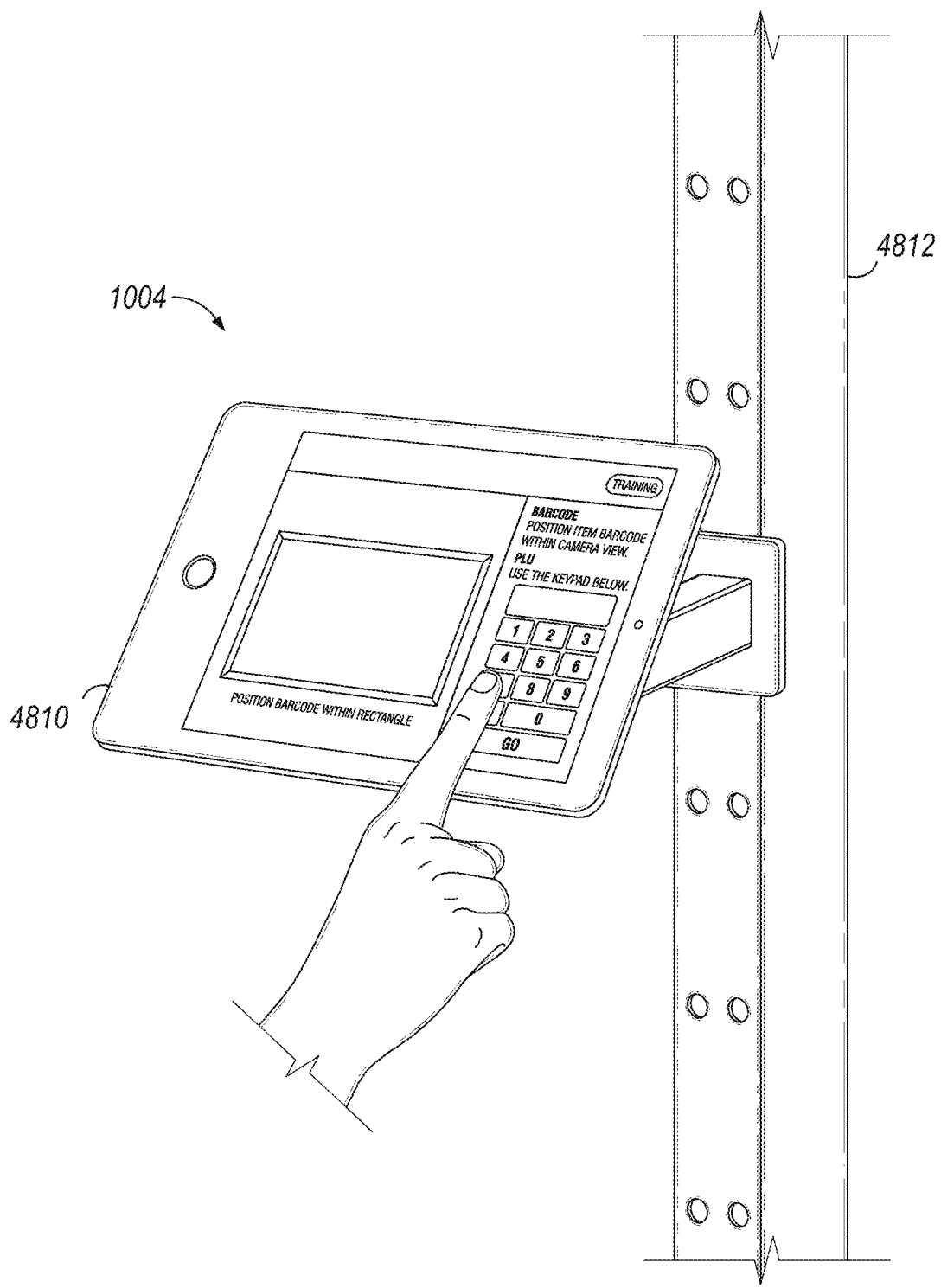
FIG. 48 shows an image of an example embodiment of a disposition system.
Figure 49:
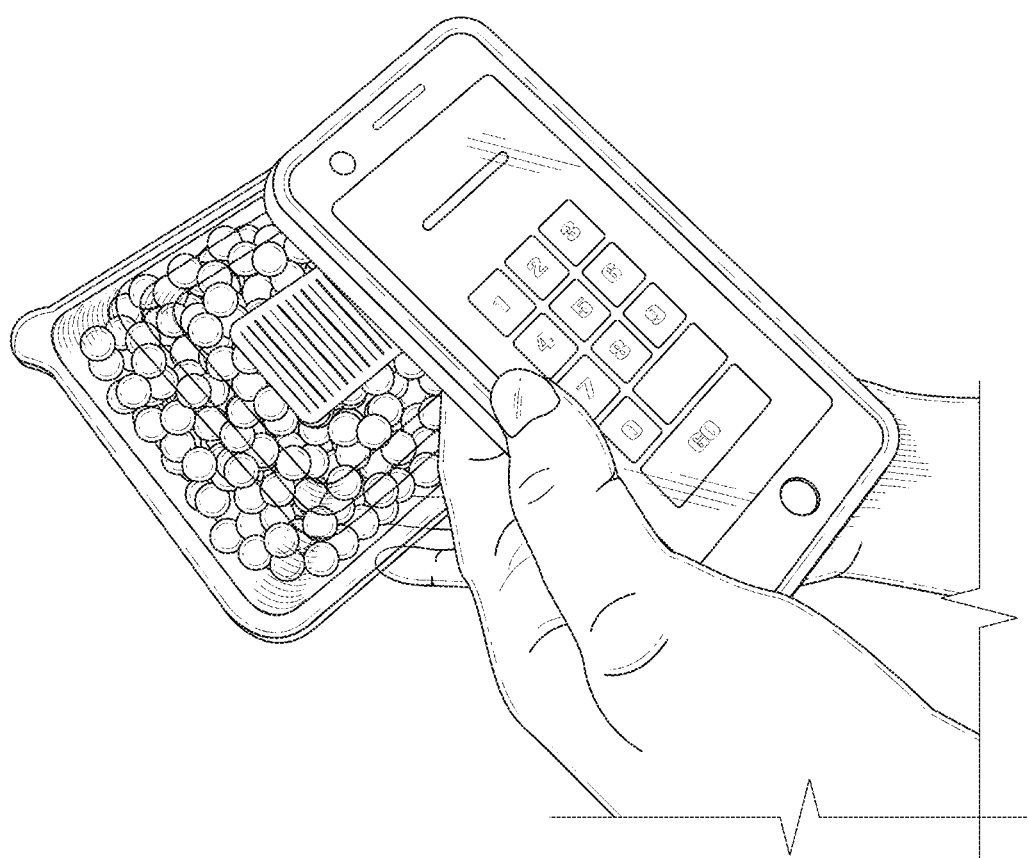
FIG. 49 shows an example of an embodiment of a disposition system.

Referring to FIGS. 46-49, a disposition system 1004 is depicted which may include a label reader 4602, an image capture device 4604, a display 4608, a communication system 4610, a processor 4616, a user interface 4618, and an optional lighting system 4612. The label reader 4602 may include a bar code reader, a QR code reader, an RFID reader, an OCR system for analysis of a picture of the item, or the like. In embodiments, some or all of the components of the disposition system 1004 may be incorporated into a single device. In an illustrative and non-limiting example, as shown in FIGS. 47-49, a mobile device 4714 (FIG. 47) such as a tablet, smart phone, MP3 player, MP4 player, or wearable may include two or more of the image capture device 4604, the display 4608, the communication system 4610, the label reader 4602, the processor 4616, the user interface 4618, and the optional lighting system 4612. FIG. 48 shows an illustrative example of a disposition system 1004 including a tablet 4810 mounted to a stand 4812 in a fixed location (e.g., a back room) incorporating the majority of the components in a single device. FIG. 49 shows a mobile device such as a smart phone incorporating the majority of the components in a single device which may carried onto a display floor and used at various locations within a store. In some embodiments, the label reader 4602 may be the image capture device 4604 and the processor 4616 interpreting a bar code captured in the image acquired by the image capture device 4604. In embodiments, the label reader 4602 may be a standalone device in communication with other components of the disposition system 1004.

The user interface 4618 may be visual, audible, haptic, or a combination thereof. In an illustrative and non-limiting example, the user interface 4618 may provide audible information to the user and receive verbal commands. In embodiments, the user interface 4618 may provide visual information to the user using the display device 4608 and receive input from the user in the form of buttons, a touch screen, and the like. In embodiments, there may be multiple user interfaces able to view data related to the disposition system including the user interface 4618 in the disposition system 1004 (FIG. 10) and a second user interface 1040 accessible to store management for overview purposes. The second user interface 1040, may be accessible from a variety of devices.

In embodiments, a disposition system 1004 (FIG. 10) may be positioned in a store's non-retail area, specifically, in an area where the disposition of items occurs. In embodiments, there may a portable disposition system which may be used within the retail area. For example, an image may be taken of a tray of apples on a shelf and the apples evaluated for ripeness, bruising, cuts and other indicators that might make them unsalable. The user interface 4618 may indicate apples should be pulled from the display and discarded because they were no longer in saleable condition. In embodiments, there may be a disposition system 1004 at a location, where the disposition system may or may not be mobile. In embodiments, there may be more than one disposition system at a location, with one potentially dedicated to a discard (or disposition) area and a mobile system for reviewing produce and the like in the retail side of the store.

Figure 50:
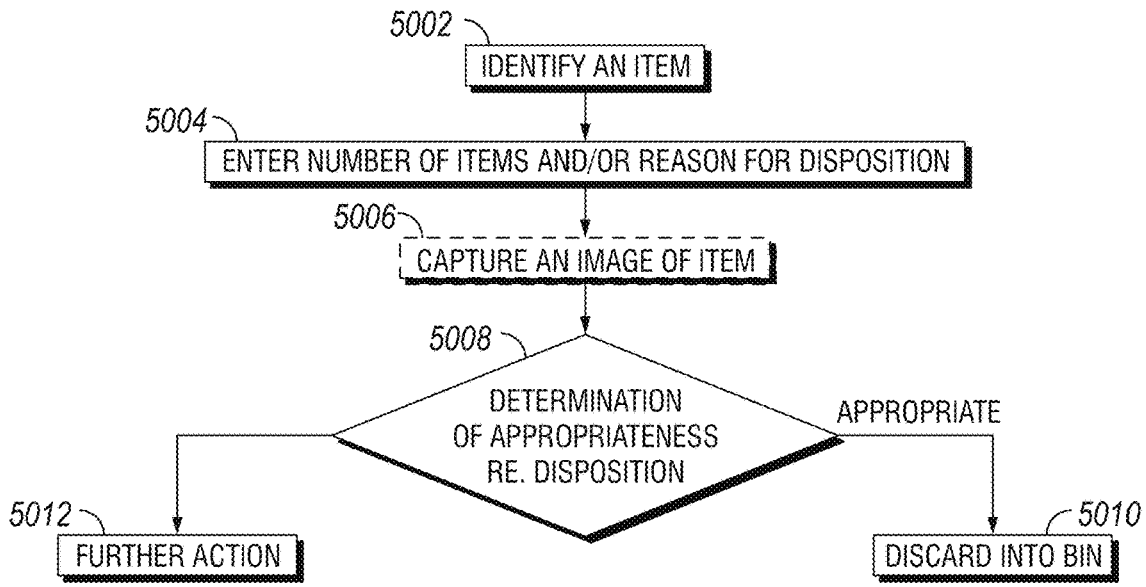
FIG. 50 depicts an activity flow chart of product disposition in an embodiment of the system described herein.
Figure 51:
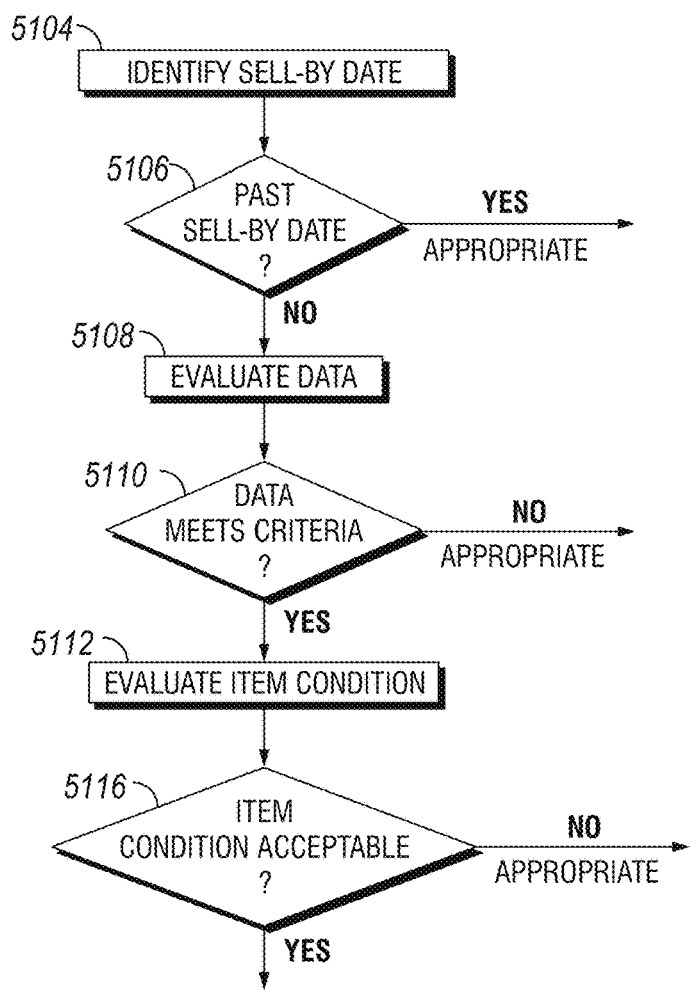
FIG. 51 depicts an activity flow chart for the determination of appropriateness of product disposition.

Referring to FIGS. 50-51, a disposition workflow 5000 is depicted. A user (which may be any form of store personnel, including an employee may identify an item (step 5002) using the label reader 1702 (e.g., scanning a barcode, reading an RFID tag, or the like) as an item is being placed in a bin for disposal. Depending on the type of item, the employee may be asked to identify the number of items being disposed of and/or a reason for disposition (step 5004) using the user interface 4618. The user interface 4618 may allow the employee to select one or more reasons from a list, or to enter an alternate reason. In embodiments, the reasons provided for disposal may vary based on type of item. For example, perishables such as fruit and vegetables may include options such as bruising, wilting, over ripe, spoilage, and the like. Shelf stable items may include options such as expired, damaged packaging, and the like.

Figure 52:
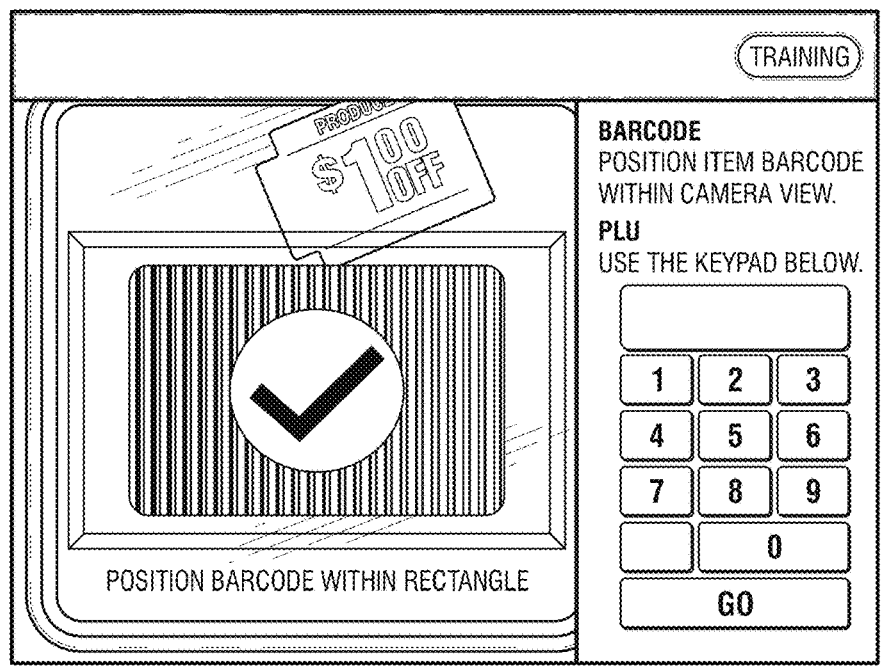
FIG. 52 shows an example screenshot identifying a bar code label in an embodiment of the system described herein.
Figure 53:
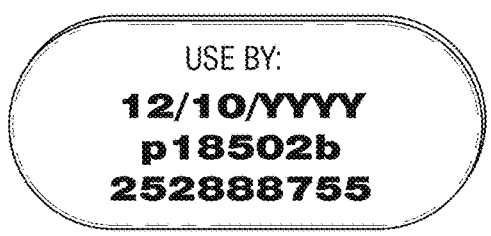
FIG. 53 shows an example of a data code.
Figure 54:
FIG. 54 shows an example of a markdown sticker.
Figure 55:
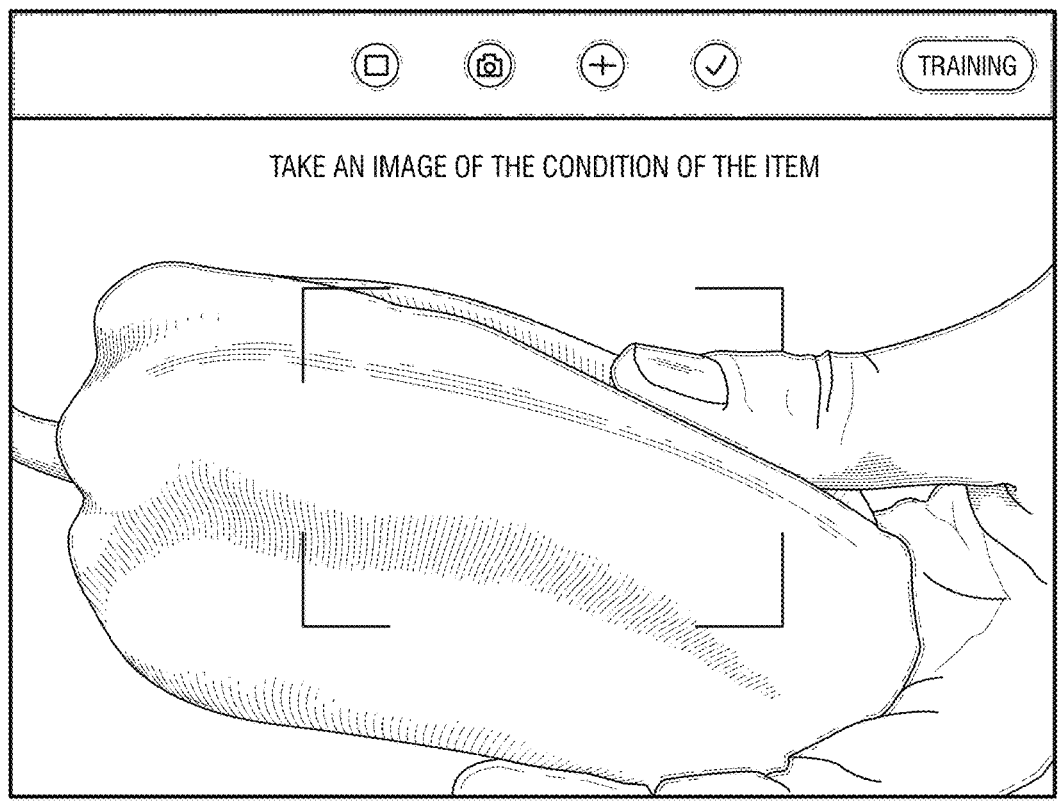
FIG. 55 shows an example screenshot capturing an item defect in an embodiment of the system described herein

Based on the reason for disposition, the employee may optionally be requested to capture one or more additional images of the item. The request may include instructions regarding details to be captured in the image, an outline of the image to capture, and the like. Details to be captured may include the bar code (FIG. 52) a sell by date, a use by date (FIG. 53), a code, a mark-down sticker (FIG. 54), damage to packaging, damage to item (e.g., bruising on the produce) (FIG. 55), and the like. The request may specify a type of lighting or angle of view to be used for the image capture. In some embodiments, the disposition system 1004 may include one or more light sources. Different types of lighting, such as infrared, may provide enhanced ability to detect variations in ripeness or bruising in fruit and vegetables. Type of lighting and angle of view may allow for the capture of an image with improved feature detection such as shininess, indentations in a package, and the like.

Determination may be made regarding appropriateness of disposition (step 5008). The determination may be made locally on the disposition system 1004 based on disposition rules in the data storage 1014, remotely on the system server based on disposition rules on or accessed by the system server 1010, or similarly in the cloud, or some combination thereof. The employee's entries, the item ID, any corresponding captured images, data from micro-climate sensors 212 associated with items of sale, located in-store, located on transport vehicles, and the like may be used in the determination regarding appropriateness of disposition made as described elsewhere herein. If the determination is that the disposition is appropriate given the item's condition, store rules, and the like, the item is discarded into the bin (step 5010) with no further action being taken.

If there is a question regarding the appropriateness of the disposition, or the decision to dispose of the item is determined to be incorrect, further, real time corrective action may be taken (step 5012). Referring to FIG. 51, further actions (step 5012) may include identifying a sell by date (step 5104), determining if it is past the sell by date (step 5106). If it is still within the sell by date, a further evaluation may be undertaken (step 5108) and a new determination about the appropriateness of the disposition is made (step 5110). If the determination is that the disposition is appropriate given the item's condition, store rules, and the like, the item is discarded into the bin (step 5010) with no further action being taken. Otherwise, the item may be further evaluated (step 5112) and a determination made regarding whether the item condition is acceptable (step 5114) based on the item's condition, store rules, and the like. If it is determined to be acceptable, further actions may include as recommending that the item be donated (food donation), recommending re-shelving, requesting an override, and the like.

In an illustrative example, if a banana appears to be fresh with no bruising or damage, the system may recommend that the banana be replaced in the store display. In other embodiments, the data regarding an inappropriate disposition may be stored and used in the future. In an example, the data regarding the inappropriate disposition may be used in training store employees, either for the majority of back room employees or, if data indicates that inappropriate disposition is associated with a single shift or employee, the training may be targeted to that employee or shift. In an illustrative example, the data regarding the inappropriate disposition may be used as the basis for revising standard operating procedures, changing staffing levels, store or employee evaluation, and the like. In another illustrative example, the data regarding the inappropriate disposition may be used as input to an ordering system, or provided to a district manager to identify individual and chainwide opportunities for improvement in training, SOPs, and the like.

Figure 56:
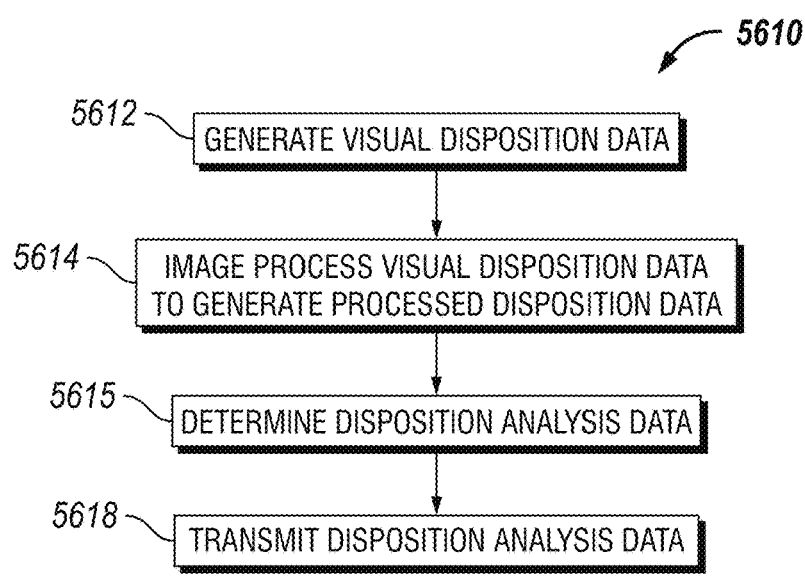
FIG. 56 depicts a method in accordance with an embodiment of the system for product management.

Referring now to FIG. 56, a method 5610 for determining a causal event for a disposal for at least one of the plurality of items of sale is depicted. The method 5610 may include generating visual disposition data 5612 from a plurality of items of sale in a store and then image processing 5614 the visual disposition data to generate processed disposition data. Image processing as described herein may incorporate one or more of the artificial intelligence and/or machine learning algorithms described herein. The method 5610 may further include determining disposition analysis data 5616 from the processed disposition data and transmitting the disposition analysis data 5618. The disposition analysis data may include an indication of a causal event for a disposal for at least one of the plurality of items of sale.

Figure 57:
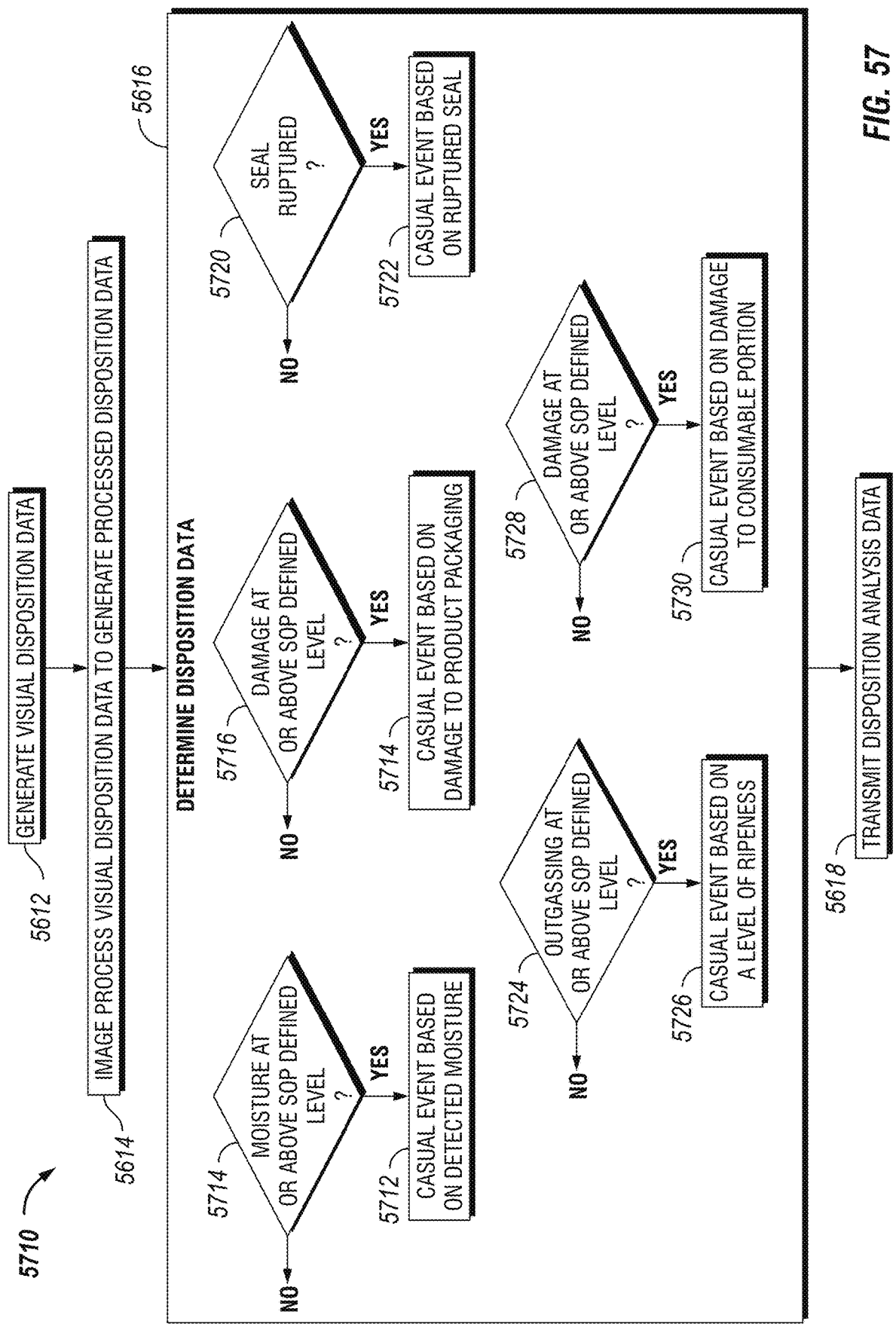
FIG. 57 depicts a method in accordance with an embodiment of the system for product management.

Referring to FIG. 57, a method 5710 for determining a causal event for a disposal for at least one of the plurality of items of sale is depicted. The method 5710 may include generating visual disposition data 5612 from a plurality of items of sale in a store. At least one of the items of sale may be a produce product, a meat product, a dairy product, a fish product, or the like. At least one of the items of sale may be a frozen product. Generating visual disposition data 5612 may be performed via a handheld mobile electronic device, or via a robot 330 (FIG. 3). The method 5710 may further include image processing 5614 the visual disposition data to generate processed disposition data. The method 5710 may further include determining 5616 disposition analysis data from the processed disposition data and transmitting 5618 the disposition analysis data. The disposition analysis data may include an indication of a causal event for a disposal for at least one of the plurality of items of sale.

The image processing 5614 may detect a presence of moisture within a product packaging of the at least one item of sale and, upon determining that a level of the detected moisture meets or exceeds a moisture level defined by a standard operating procedure 5714 for disposing of the at least one item of sale, determining that the causal event is based at least in part on the presence of the detected moisture 5712.

The image processing 5614 may detect damage to a product packaging of the at least one item of sale and, upon determining that a level of the damage to the product packaging meets or exceeds a product packaging damage level defined by a standard operating procedure 5716 for disposing of the at least one item of sale, determining that the causal event is based at least in part on the damage to the product packaging 5718.

The image processing 5614 may determine that a seal of the product packaging has been ruptured 5720 and, upon determining that the seal of the product packaging has been ruptured, determining that the causal event is based at least in part on the ruptured seal 5722.

The image processing 5614 may detect damage to a consumable portion of the at least one item of sale, and, upon determining that a level of the damage to the consumable portion meets or exceeds a consumable portion damage level defined by a standard operating procedure for disposing of the at least one item of sale 5728, determining that the causal event is based at least in part on the damage to the consumable portion 5730.

The image processing 5614 may detect outgassing from the at least one item of sale and, upon determining that the outgassing exceeds an outgassing level defined by a standard operating procedure 5724, determining that the causal event is based at least in part on level of ripeness 5726.

Figure 58:
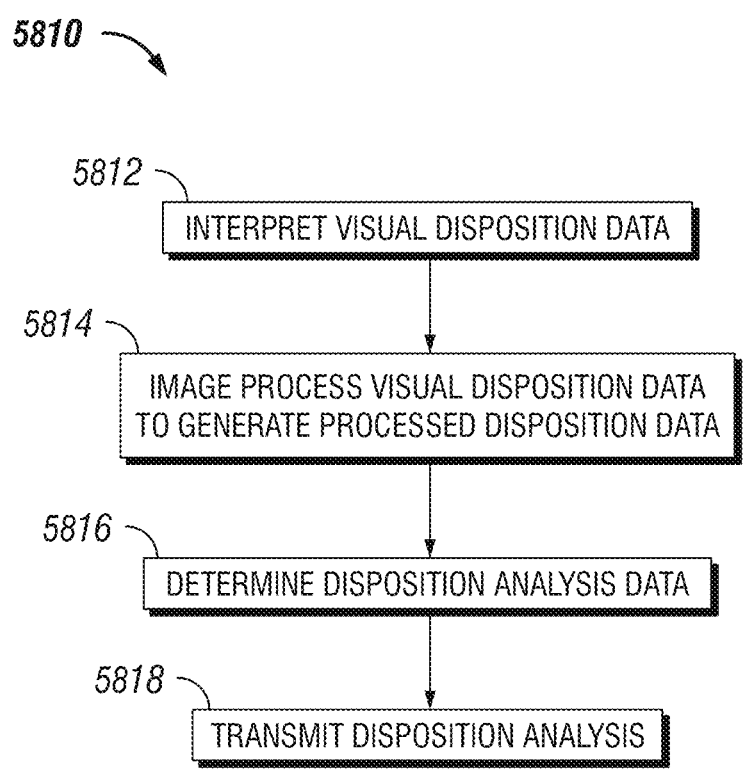
FIG. 58 depicts a method in accordance with an embodiment of the system for product management.

Referring to FIG. 58, a method 5810 for determining and transmitting disposition analysis data is depicted. The method 5810 may include interpreting visual disposition data 5812 generated from a plurality of items of sale in a store and image processing 5814 the visual disposition data to generate processed disposition data. The method 5810 may further include determining disposition analysis data 5816 from the processed disposition data and transmitting the disposition analysis data 5818. The disposition analysis data may include an indication of a causal event for a disposal for at least one of the plurality of items of sale.

Figure 59:
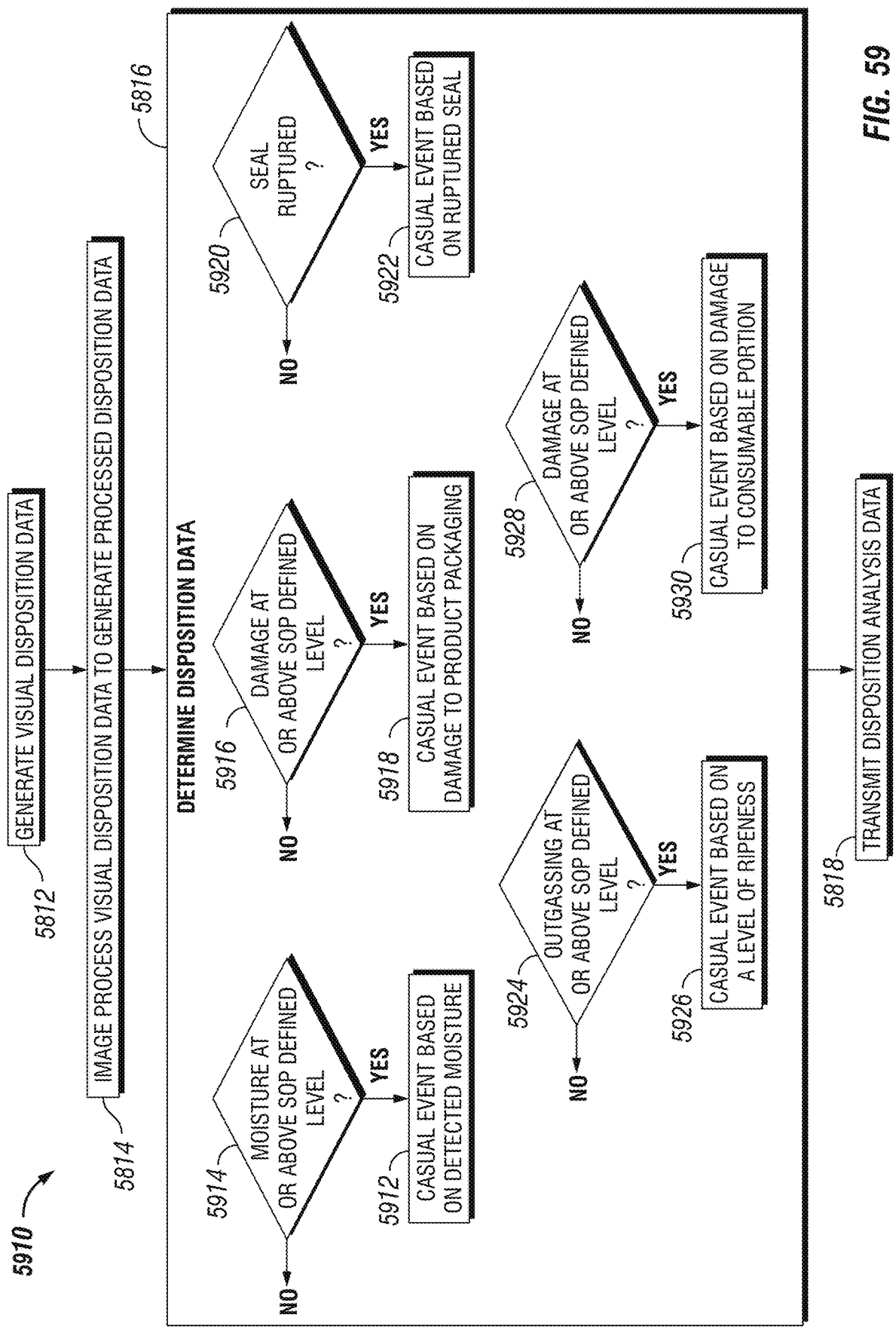
FIG. 59 depicts a method in accordance with an embodiment of the system for product management.

Referring to FIG. 59, a method 5910 for determining and transmitting disposition analysis data is depicted. The method 5910 may include interpreting visual disposition data generated 5812 from a plurality of items of sale in a store and image processing 5814 the visual disposition data to generate processed disposition data. The method 5910 may further include determining 5816 disposition analysis data from the processed disposition data and transmitting 5818 the disposition analysis data. The disposition analysis data may include an indication of a causal event for a disposal for at least one of the plurality of items of sale.

The image processing 5814 may detect a presence of moisture within a product packaging of the at least one item of sale and, upon determining that a level of the detected moisture meets or exceeds a moisture level defined by a standard operating procedure 5914 for disposing of the at least one item of sale, determining that the causal event is based at least in part on the presence of the detected moisture 5912.

The image processing 5814 may detect damage to a product packaging of the at least one item of sale and, upon determining that a level of the damage to the product packaging meets or exceeds a product packaging damage level defined by a standard operating procedure 5916 for disposing of the at least one item of sale, determining that the causal event is based at least in part on the damage to the product packaging 5918.

The image processing 5814 may determine that a seal of the product packaging has been ruptured 5920 and, upon determining that the seal of the product packaging has been ruptured, determining that the causal event is based at least in part on the ruptured seal 5922.

The image processing 5814 may detect damage to a consumable portion of the at least one item of sale, and, upon determining that a level of the damage to the consumable portion meets or exceeds a consumable portion damage level defined by a standard operating procedure for disposing of the at least one item of sale 5928, determining that the causal event is based at least in part on the damage to the consumable portion 5930.

The image processing 5814 may detect outgassing from the at least one item of sale and, upon determining that the outgassing exceeds an outgassing level defined by a standard operating procedure 5924, determining that the causal event is based at least in part on level of ripeness 5926.

Figure 60:
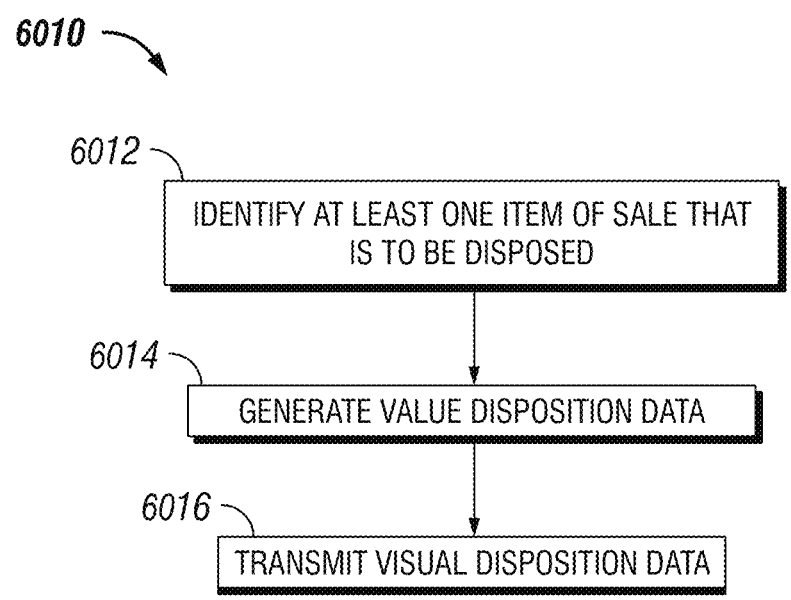
FIG. 60 depicts a method in accordance with an embodiment of the system for product management.

Referring to FIG. 60, a method 6010 for generating and transmitting visual disposition data is depicted. The method 6010 may include identifying 6012, in a store, at least one item of sale that is to be disposed and generating visual disposition data 6014 from the at least one item via a mobile electronic device. The method 6010 may further include transmitting the visual disposition data 6016 via the electronic device.

Figure 61:
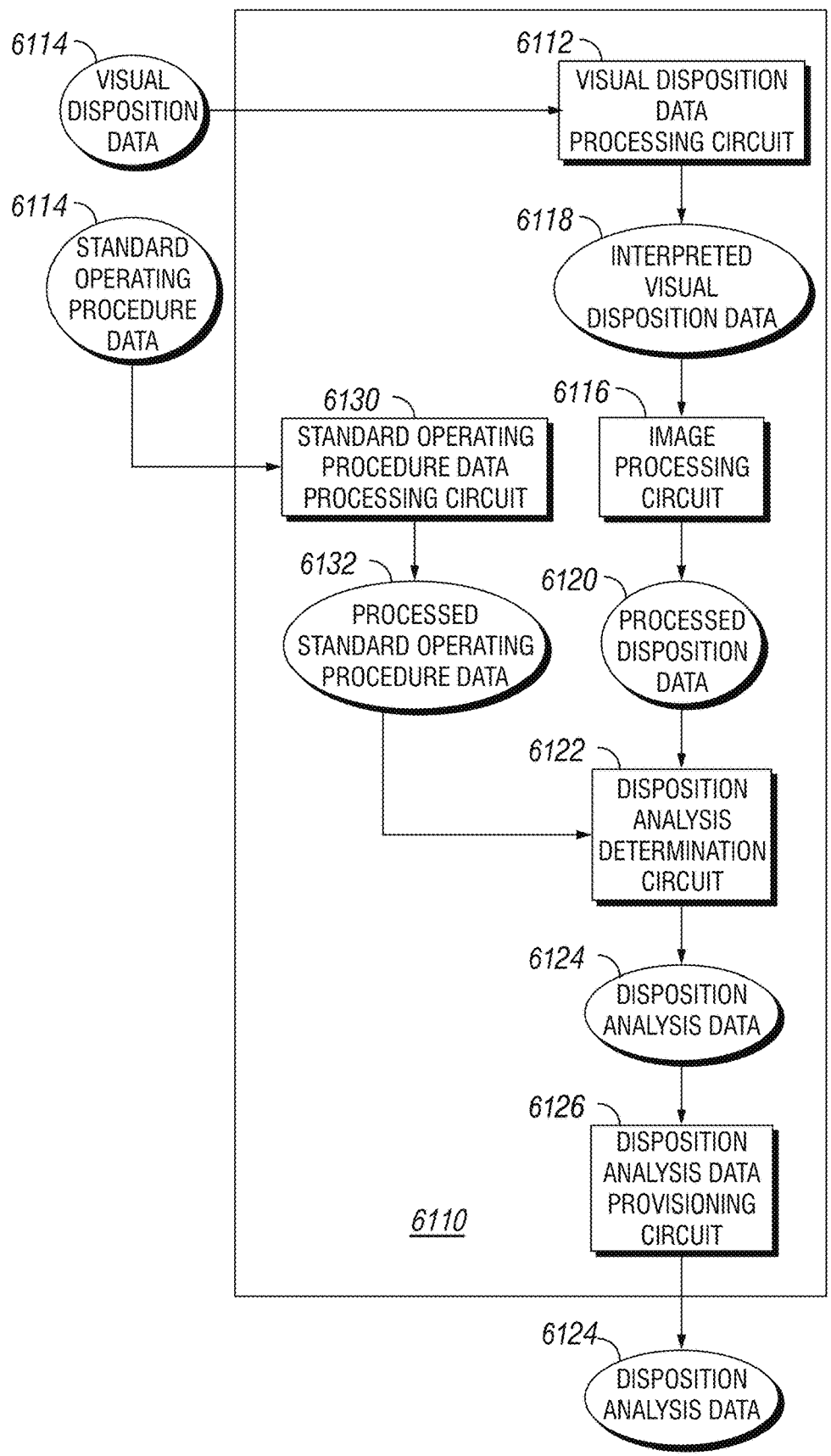
FIG. 61 depicts an apparatus in accordance with an embodiment of the system for product management.

Referring to FIG. 61, an apparatus 6110 for determining an indication of a causal event for a disposal for the at least one item of sale is depicted. The apparatus 6110 may include a visual disposition data processing circuit 6112 to interpret visual disposition data 6114 from at least one item of sale in a store. The apparatus 6110 may include an image processing circuit 6116 to generated processed disposition data 6120 from interpreted visual disposition data 6118. The apparatus 6110 may include a disposition analysis determination circuit 6122 to generate disposition analysis data 6124 from the processed disposition data 6120. A disposition analysis provisioning circuit 6126 may transmit the disposition analysis data 6124. The disposition analysis data 6124 may include an indication of a causal event for a disposal for the at least one item of sale. The apparatus 6110 may further include a standard operating procedure data processing circuit 6130 to generate a processed standard operating procedure data 6132 from standard operating procedure data 6134. The processed standard operating procedure data 6132 may be used by the disposition analysis determination circuit 6122.

The image processing circuit 6116 may detect a presence of moisture within a product packaging of the at least one item of sale and, upon determining that a level of the detected moisture meets or exceeds a moisture level defined by a standard operating procedure for disposing of the at least one item of sale, determining that the causal event is based at least in part on the presence of the detected moisture.

The image processing circuit 6116 may detect damage to a product packaging of the at least one item of sale and, upon determining that a level of the damage to the product packaging meets or exceeds a product packaging damage level defined by a standard operating procedure for disposing of the at least one item of sale, determining that the causal event is based at least in part on the damage to the product packaging.

The image processing circuit 6116 may determine that a seal of the product packaging has been ruptured and, upon determining that the seal of the product packaging has been ruptured, determining that the causal event is based at least in part on the ruptured seal.

The image processing circuit 6116 may detect damage to a consumable portion of the at least one item of sale, and, upon determining that a level of the damage to the consumable portion meets or exceeds a consumable portion damage level defined by a standard operating procedure for disposing of the at least one item of sale, determining that the causal event is based at least in part on the damage to the consumable portion.

The image processing circuit 6116 may detect outgassing from the at least one item of sale and, upon determining that the outgassing exceeds an outgassing level defined by a standard operating procedure, determining that the causal event is based at least in part on level of ripeness.

Figure 62:
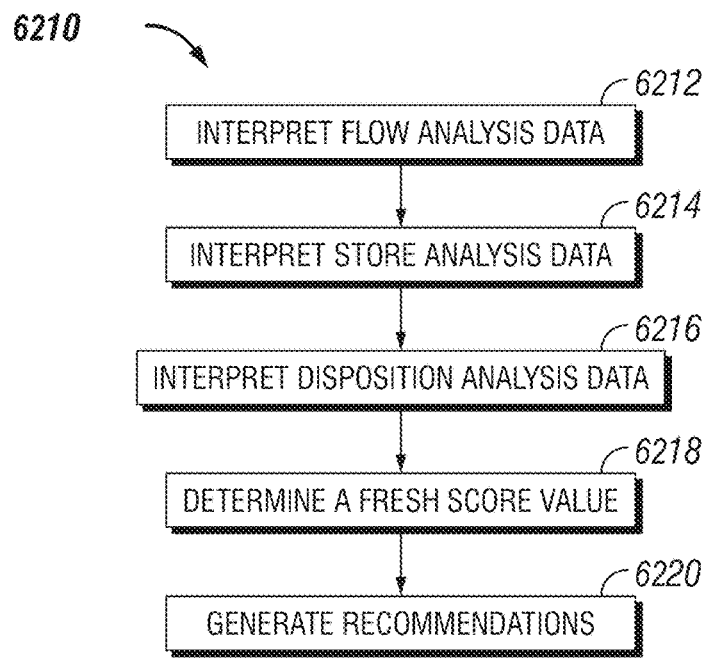
FIG. 62 depicts a method in accordance with an embodiment of the system for product management.

Referring now to FIG. 62, a method 6210 for determining a score is disclosed. The method 6210 may include interpreting flow analysis data 6212 corresponding to a plurality of items of sale flowing through a supply chain for an entity (e.g., a store or a chain of stores), interpreting store analysis data 6214 corresponding to the plurality of items of sale while disposed on a floor of a store, and interpreting disposition analysis data 6216 corresponding to disposal of some of the plurality of items of sale. The method 6210 may further include determining a score value 6218 based at least in part on the flow analysis data, the store analysis data, and the disposition analysis data. The method 6210 may further include generating recommendations including actions 6220 that may be taken to improve a score value. The score value may represent a freshness score (referred to as a fresh score value elsewhere herein), a level of compliance with a single standard operating procedure, a level of compliance with a set or subset of standard operating procedures, the score value may represent an individual store, a chain of stores, a brand of stores, a subset of stores in a chain, and the like.

Figure 63:
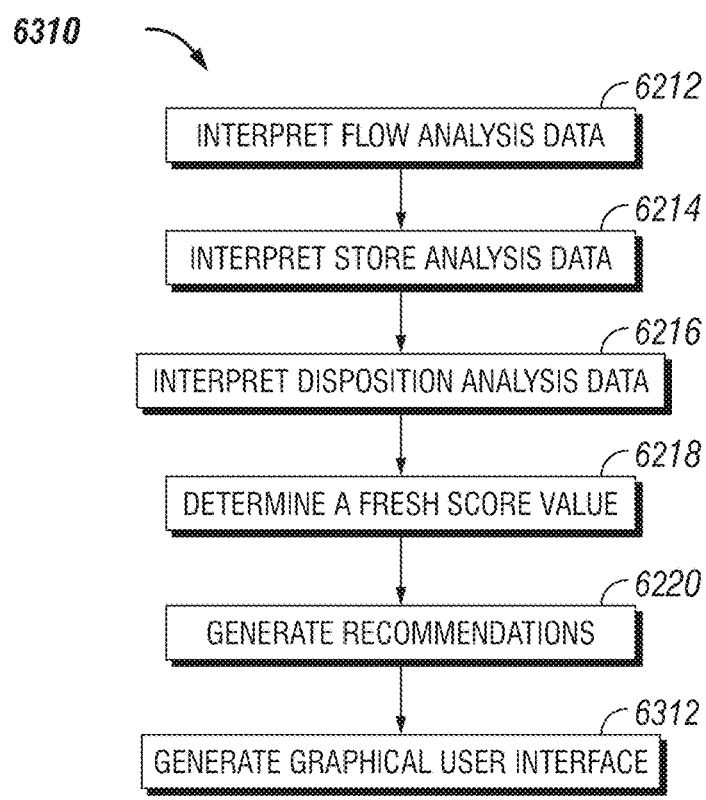
FIG. 63 depicts a method in accordance with an embodiment of the system for product management.

Referring now to FIG. 63, a method 6310 for determining and displaying a score is disclosed. The method 6310 may include interpreting flow analysis data 6212 corresponding to a plurality of items of sale flowing through a supply chain for an entity, interpreting store analysis data 6214 corresponding to the plurality of items of sale while disposed on a floor of the store, and interpreting disposition analysis data 6216 corresponding to disposal of some of the plurality of items of sale. The method 6310 may further include determining a score value 6218 based at least in part on the flow analysis data, the store analysis data, and the disposition analysis data. The method 6310 may further include generating recommendations including actions 6220 that may be taken to improve a score value. The score value may represent a freshness score (referred to as a fresh score value elsewhere herein), a level of compliance with a single standard operating procedure, a level of compliance with a set or subset of standard operating procedures, the score value may represent an individual store, a chain of stores, a brand of stores, a subset of stores in a chain, and the like. The method 6310 may also include generating a graphical user interface 6312 that depicts at least a portion of: the flow analysis data; the store analysis data; the disposition analysis data; the score value, underlying data, recommendations of actions, or the like.

The flow analysis data may include an indication of compliance of the plurality of items of sale with respect to a first standard operating procedure (SOP). The store analysis data may include an indication of compliance of the plurality of items of sale with respect to a second SOP. The first SOP and the second SOP may be the same or the first SOP and the second SOP may form part of a third SOP. In an illustrative and non-limiting example, the first SOP may include a limit on how long an item of sale may remain on the dock. The second SOP may include a limit on the maximum temperature of the item of sale. The first and the second SOP may be part of a third SOP describing the overall handling of the item of the sale once it is received by the store.

The score value may be a fresh score value and correspond to a measure of a freshness of the items of sale where the measure of freshness is with respect to a time period. The time period may be selected or specified. The time period is the time over which the fresh score value is determined. The fresh score value may include a numerical value, where the numerical value is based at least in part on a scale between one (1) and one-hundred (100), wherein one (1) represents low freshness and one-hundred (100) represents high freshness. The fresh score value may be based at least in part on a color scale, wherein red represents low freshness and green represents high freshness.

Figure 64:
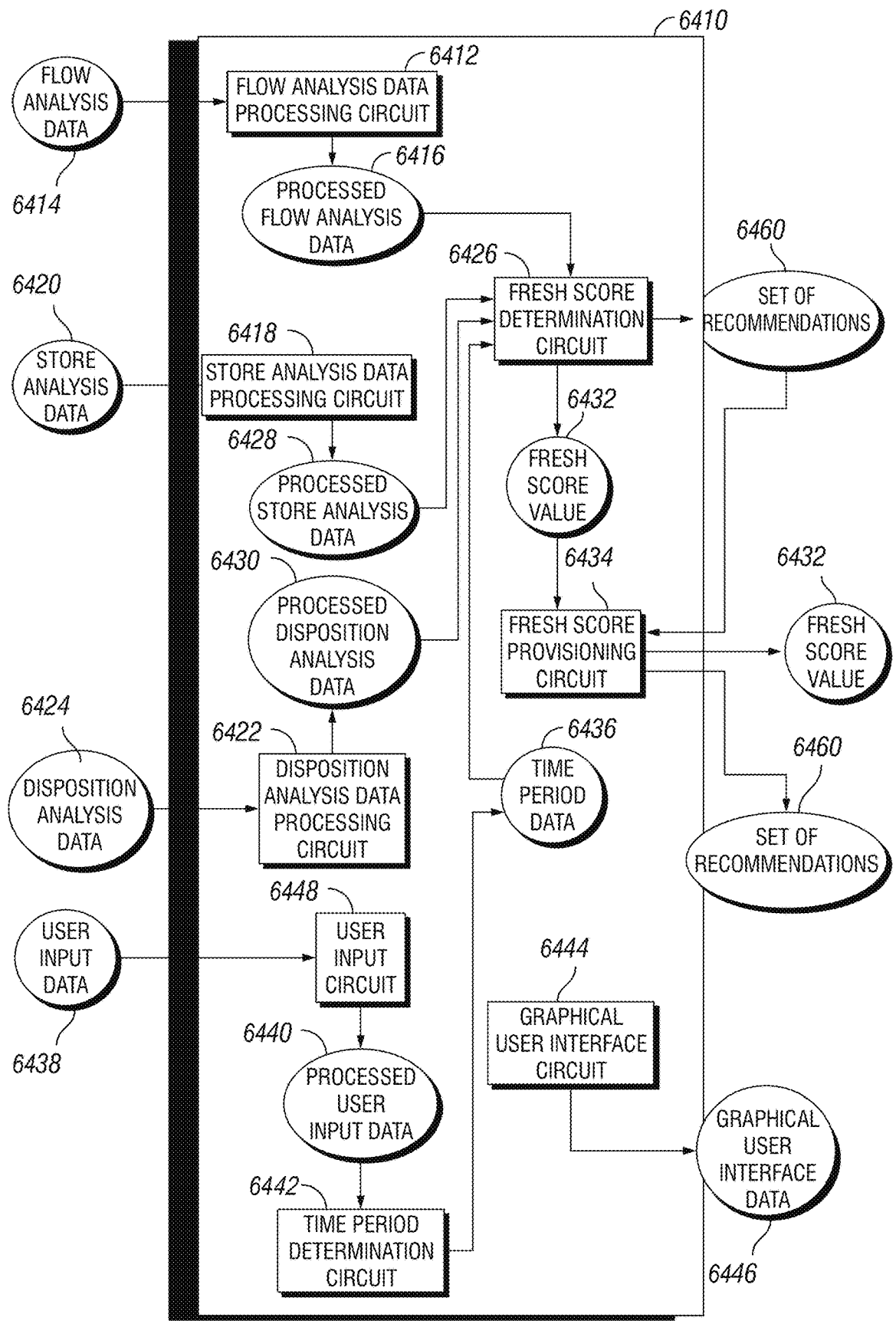
FIG. 64 depicts an apparatus in accordance with an embodiment of the system for product management.

Referring to FIG. 64, an apparatus 6410 for determining and transmitting a score value is depicted. The apparatus 6410 may include a flow analysis data processing circuit 6412 to interpret flow analysis data 6414 generated from a plurality of items of sale flowing through a portion of a supply chain. The apparatus 6410 may further include a store analysis data processing circuit 6418 structured to interpret store analysis data 6420 generated from the plurality of items of sale while disposed on a floor of a store. The apparatus 6410 may further include a disposition analysis data processing circuit 6422 structured to interpret disposition analysis data 6424 comprising one or more indications of one or more causal events for the disposal of at least some of the plurality of items of sale. The apparatus 6410 may further include a score determination circuit 6426 to determine a score value 6432 based at least in part on the processed flow analysis data 6416, the processed store analysis data 6428, and the processed disposition analysis data 6430. A score provisioning circuit 6434 may transmit the score value 6432. The score value may be a fresh score value and correspond to a measure of a freshness of the items of sale where the measure of freshness is with respect to a time period.

The apparatus 6410 may further include a graphical user interface circuit 6444 to generate graphical interface data 6446 to generate a graphical user interface that depicts at least a portion of the flow analysis data 6414; the store analysis data 6420; the disposition analysis data 6424; the score value 6432, underlying data, and the like.

The flow analysis data 6414 may include an indication of compliance of the plurality of items of sale with respect to a first standard operating procedure (SOP), and an indication of compliance of the plurality of items of sale with respect to a second SOP. In embodiments, the first SOP and the second SOP may be the same, different or form part of a third SOP.

The score value 6432 may be a fresh score value corresponding to a measure of a freshness of the items of sale where the measure of freshness is with respect to a time period. The apparatus 6410 may further include a user input circuit 6448 structured to interpret a user input data 6438 and a time period determination circuit 6442 structured to determine the time period data 6436 based at least in part on the processed user input 6440. The time period data 6436 is the time period over which the fresh score value 6432 is determined.

The fresh score value 6432 may include a numerical value, where the numerical value is based at least in part on a scale between one (1) and one-hundred (100), wherein one (1) represents low freshness and one-hundred (100) represents high freshness. The fresh score value 6432 may be based at least in part on a color scale, wherein red represents low freshness and green represents high freshness.

Figure 65:
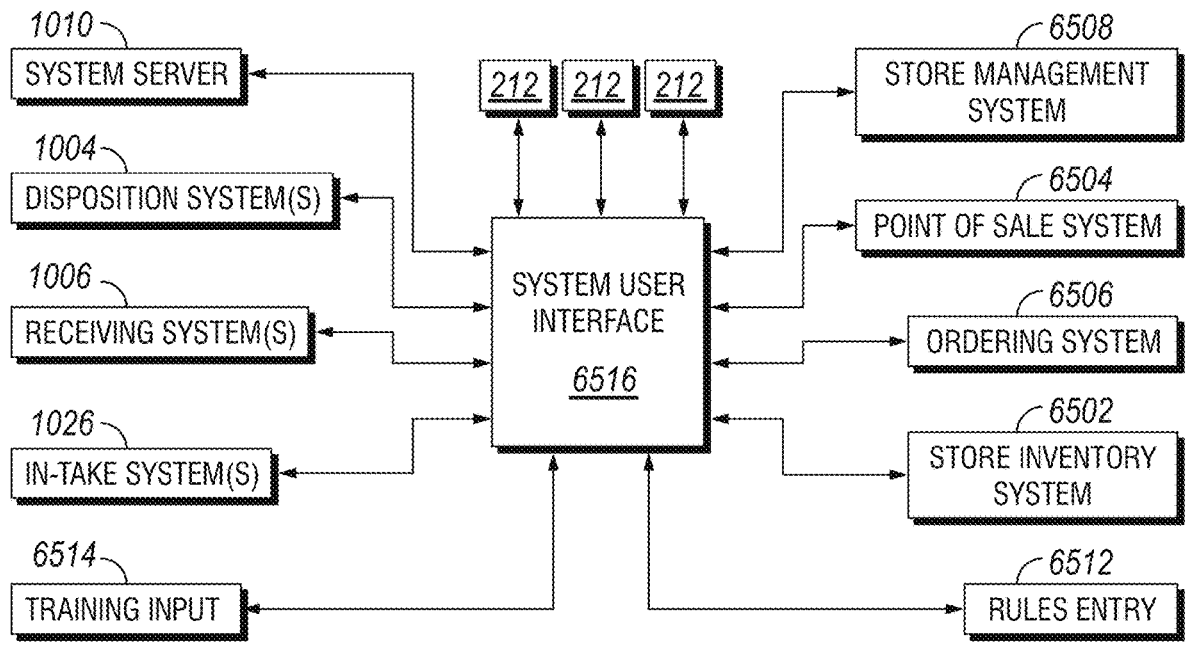
FIG. 65 depicts an example user interface connectivity in an embodiment of the system described herein.

Referring to FIG. 65, a system user interface 6516 is depicted. The system user interface 6516 may allow a user to view dashboards, images, reports, underlying data related to various components of the system, and the like. The system user interface may be able to access data from disposition systems 1004, receiving systems 1006, in-take systems 1026, sensor 212, data, store inventory systems 6502, point of sale systems 6504, ordering systems 6506, store management systems 6508 and metadata, and the like. In embodiments, the system user interface 6516 may include access control enabling users of different levels of access to data depending on their identity or role. For example, a produce manager might be limited to data related to the produce department, sensors providing produce related data, produce sales and ordering and the like. A store manager might be allowed to view all data related to the store and sensors providing data related to goods arriving at the store. Views may include live views for all the live sensors in produce or all live sensors in the store. View may include historic views from a sensor or set of sensors. Chain managers might be allowed to view individual data for multiple stores as well as data across stores (e.g. number of cases of strawberries disposed of compared across stores). The system user interface 6516, may allow for receipt and review of reports, alarms, alerts, recommendations, and the like.

In embodiments, the system user interface 6516 may include a rules entry interface 6512 for the entry of rules such store specific metadata to be included with item data, rules for acceptability and disposition, trigger conditions, identify appropriate alert/alarm/recommendation recipients, and the like. In an illustrative example, fixed alarms such as temperature thresholds or temperature trends may be defined and recipient (e.g. store manager team, produce manager) information and contact method may be entered. In another example, there may be alarms specific to a product or product type related to velocity, light levels and the like. In an illustrative example, product sitting in a cooler exceeding a time threshold, or potatoes exceeding a light level may result in an alert to relevant personnel. Alarm conditions may be set by a user using the rules entry interface 6512 on the system user interface 6516 or based on data from the system server 1010 which may be reviewed by a user of the system user interface 6516. The system user interface 6516, may allow a user to provide training input to a machine learning circuit as described elsewhere herein.

Figure 66:
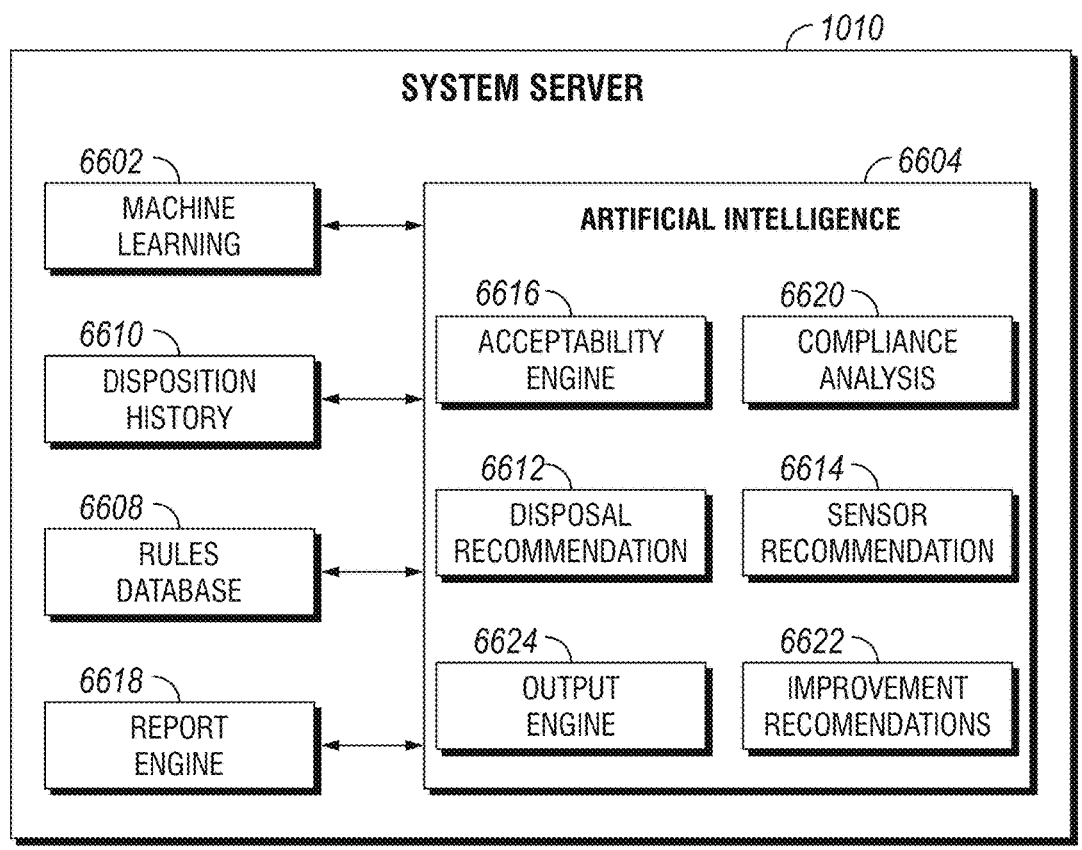
FIG. 66 depicts components of a system server in an embodiment of the system described herein.

Referring to FIG. 66, the system server 1010 may include a machine learning circuit 6602, an artificial intelligence circuit 6604, a rules database 6608, a disposition history 6610 for different types of materials, and a report engine 6618. The artificial intelligence circuit 6604 may include a disposal recommendation engine 6612, a sensor recommendation engine 6614, an acceptability analysis engine 6622, and a compliance analysis engine 6620.

In embodiments, the machine learning engine 6602 may be local to the system server 1010, distributed between product system components, located in the cloud, and the like.

The machine learning engine 6602 may be provided with a wide variety of learning sets from which to derive rules, algorithms, correlations, and the like. In embodiments, the machine learning engine 6602 may be provided with training sets of images focused specifically on a known problem, such as identifying moisture inside of plastic packaging (a clear plastic bag or a clear plastic clamshell) or a specific type of quality degradation such as browning on lettuce or the presence of mold on strawberries. In embodiments, the machine learning engine 6602 may be provided with a training set of images focused on identifying levels of ripeness of a product. For example, the degree of ripeness of a strawberry may be indicated by the deepness of the red color or the degree of ripeness of a banana may be identified by both color (shade of green, yellow, or brown) and the presence of brown spots on a yellow banana.

In an embodiment, the machine learning engine 6602 may be provided with a set of images of a specific item type at varying degrees of freshness, quality, salability and the like together with feedback regarding the acceptability of an item having that appearance or the associated metadata. Pictures of produce and product containers may be evaluated together with input from a product manager regarding the product freshness, condition (e.g. wilted, moisture in the packaging), physical integrity of the product (e.g. is an apple bruised, corn ear is partially peeled, or a package is damaged), and the like.

In embodiments, the machine learning engine 6602 may look at a variety or combinations of image classification categories. Categories may include color (bruises, ripeness), shape (to identify type of produce), color and shape (e.g.

distinguish limes and lemon) shininess (e.g. is the apple fresh), package integrity, and the like. Package integrity may include evaluation of man-made containers to determine whether it has been improperly opened, the packaging is damaged, product is missing (e.g. 2 onions in a bag of 5 onions), there is moisture or mold present in the packaging. Package integrity may include evaluation of natural produce packaging (e.g. is a corn ear partially peeled, is a cantaloupe cracked, and the like. In an illustrative example, of an image of a product may indicate degree of ripeness (green bananas are unripe and yellow bananas with brown spots are overripe), bruising (discoloration in a portion of the item), partial peeling, browned leaves on a head of lettuce, dimples in oranges, moisture in external packaging, presence of mold in packaging or on produce, the like. Text recognition may be used to identify "Sell by Dates", "Best by Dates", receive codes, date produce left the farm, and the like.

In embodiments, the machine learning engine 6602 may utilize neural networks, deep learning techniques, convolution networks, and the like to develop algorithms, rules, rankings and the like for utilization by the artificial intelligence circuit 6604. In embodiments, training may be tailored for individual customers who identify specific levels of acceptability. In embodiments, training may be general to simply identify different levels of quality (e.g. a quality value) and the customer may then identify the minimum level of quality/quality value. Such a ranking scale may help remove subjectivity between employees or store locations when deciding when to discard an item.

In embodiments, the machine learning engine 6602 may leverage disposition history, images, and metadata to identify additional criteria for acceptance or rejection of an item. Metadata may include an item specific profile (e.g. different items have unique properties in terms of sensitivity and shelf life), profile for store associated with image (e.g. different stores may be laid out differently with different), profile for produce managers associated with images, transport history, sales and ordering systems, historic disposition data, historic sales data, back-end knowledge regarding the distribution center and/or store, external data such as weather, road conditions, holidays, and the like, that may cause to deviations from normal acceptability and expected discard levels. For example, a severe storm or traffic accident may result in transport being on the road for longer periods than anticipated, potentially resulting in temperature extremes or more temperature swings. A heat wave may result in produce seeing higher than desired temperatures if the temperature exceeds the ability of the transport and store infrastructure to maintain a desired temperature. Accelerated ripening as the result of the temperature swings, may result in higher levels of discard prior to a sell by date due to produce spoiling too quickly. Metadata may include order discrepancies such as receiving a short order (less product than ordered) or distribution center pushing products and delivering more product than ordered. In an illustrative example, receipt of excess product may result in higher levels of discard for that product if the volume of excess product exceeds the sales capacity of the store for that product.

Figure 67:
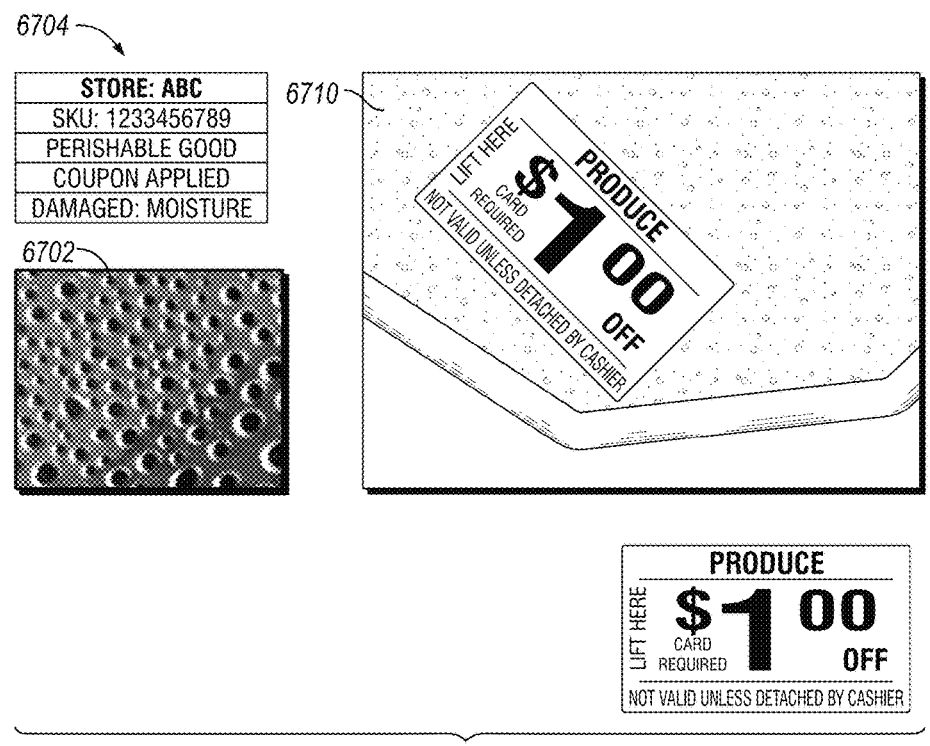
FIG. 67 depicts a partial summary of metadata associated with a dispositioned item.
Figure 68:
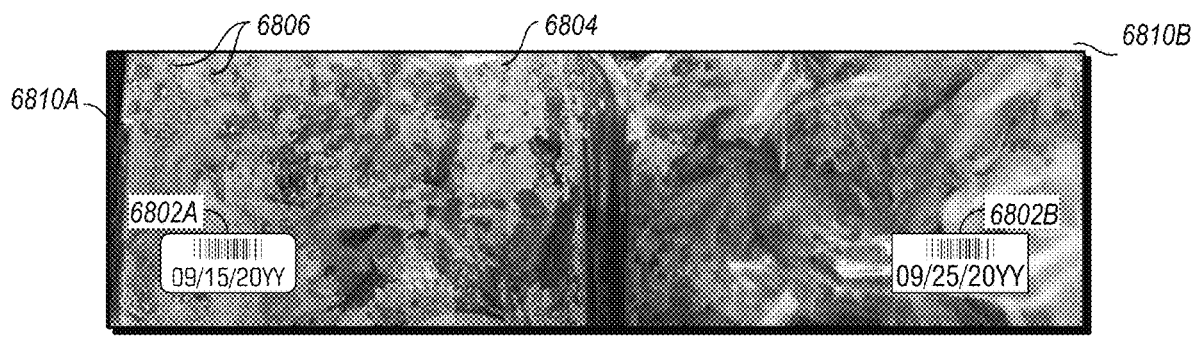
FIG. 68 shows example packages of greens in different conditions.

The identified image characteristics may be consolidated with other metadata to develop insights into conditions at a particular store, transport, supplier or the like. In an illustrative example, if a package of lettuce has browning on the leaves, but no evidence of moisture and it is within the date code, it may be indicative of elevated temperatures at some point in supply chain or a problem with the supplier. In an illustrative example, as shown in FIG. 67, a partial summary of the metadata 6704 associated with a dispositioned item may be derived from image processing and may include information such as store where item was dispositioned, item SKU, item description, whether or not a coupon was applied or other indicator that store protocols were being followed as well as an indication of why the item was being dispositioned, in this case due to moisture in the package. The metadata 6704 may have associated image of damage 6702 (e.g., moisture, bruising, discoloration, and the like), coupons 6710, and the like. Data from corresponding micro-climate sensors 212 associated with items of sale, located in-store, and located on transport vehicles, and the like which experienced similar conditions may provide insight as to the source of the problem. In an illustrative example, as shown in FIG. 68, both packages of greens 6810A, 6810B are documented as being within their date code 6902A, 6902B. However, one of the packages of greens 6810A shows evidence of condensation 6874 and water droplets 6802 in the packaging, indicating that it has been mishandled.

In embodiments, the sensor recommendation engine 6614 (FIG. 66) may provide recommendations to employees in the distribution center 116, via a user interface 1028, regarding deployment of micro-climate sensors 212. Recommendations may include how many micro-climate sensors to deploy in a specific shipment to a particular store 118, how many micro-climate sensors to deploy with a particular item type, which types of sensors 1502 to deploy (thermometer, humidity, movement), where to deploy the micro-climate sensors 212 (e.g. with frozen pizzas, strawberries, or canned goods), and the like.

A report engine 6618 may provide a user with summary information regarding recent data, key findings and recommendations. The report engine 6618 may show data for a single store, a plurality of peer stores, data for a chain of stores, and the like. The report engine may provide graphs and summaries showing differences in the data and any correlations with background data. The report engine may generate recommendation regarding a prioritized set of specific actions that should enable the store to improve their fresh score value based on the data. The prioritized set of specific actions would evolve as the data changes, for example in response to approved adherence to a SOP.

Figure 69:
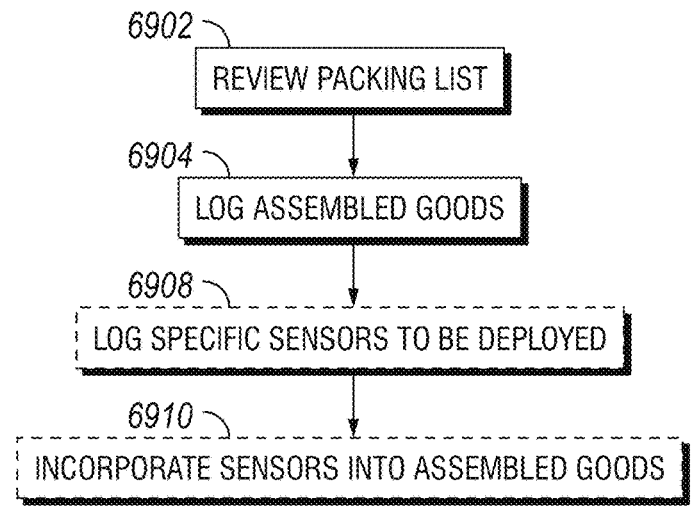
FIG. 69 depicts an example flowchart for introducing sensors to a product shipment for a specific store in an embodiment of the system disclosed herein.

Referring to FIG. 69, a distribution workflow is depicted. As an employee at a distribution center 116 begins to assemble an outbound shipment 1024, they may consult, via a user interface 1028, a packing list (step 6902) indicating which goods 1025 to be included in the outbound shipment 1024, what micro-climate sensors 212 should be deployed, how the micro-sensors should be deployed, and the like. As the employee gathers the goods 1025 for a particular outbound shipment, they may log the goods assembled 1025 (step 6904) and log specific micro-climate sensors 212 to be deployed with that shipment (step 6908). The act of logging the goods 1025 and micro sensors 212 may include associating specific items of sale and specific micro-climate sensors 212 with shipment specific information such as receiving location, transport to be used, specific transport vehicle, and the like. In embodiments, the act of logging the specific micro-climate sensors 212 may include resetting the sensors. The micro-climate sensors 212 may then be incorporated into the shipment as indicated (step 6910), e.g., placed in a carton of a specific type of good, placed at a specific location on the pallet, and the like. Data measured by the logged micro-climate sensors 212 may then be read by the receiving system 1006 at the receiving location.

The artificial intelligence circuit 6604 may utilize the learnings from the machine learning circuit 6602 (e.g.

algorithms, rules) to evaluate product quality based on the images. The artificial intelligence circuit 6604 may include a disposal recommendation engine 6612, an acceptability determination engine 6616, a sensor recommendation engine 6614, an improvement recommendations engine 6622, and a compliance analysis engine 6620. The artificial intelligence circuit 6604 may utilized rules from the rules database 6608, data from micro-climate sensors 212 associated with items of sale, located in-store, and located on transport vehicles, images from disposition systems 1004, in-take systems 1026, and receiving systems 1006, sales and ordering systems providing data relevant to the store, historic disposition data, historic sales data, back-end knowledge regarding the distribution center and/or store, external data such as weather, road conditions, holidays, and the like.

Back-end knowledge may include data specific to the location such as velocity of an item type through that store based on that store's average sales of the item, labor levels, personnel, ambient store temperature, receiving schedules (number of delivery days, days of week, time of day, and the like), whether a produce employee is on shift during delivery, identification of employee(s) on shift when item is received, employee(s) on shift when item is discarded, average delay between product arrival at store and storage in cooler, store layout, location of the store, logistic network, demographics of store customers such as age distribution, ethnicity, economic demographics, type of materials, in-store equipment (size of freezers, cases, and the like), back room size (do they have a large back room and are thus are more likely to fill a large cooler and hang onto inventory compared to a small back room necessitating perpetual inventory coming into the store), and the like. Using machine learning 6602 to analyze back end knowledge together with sensor data and disposition data correlations may be identified. Recommendations may be based on identifying difference between stores with similar backends but lower disposition rates.

In some embodiments, the back end knowledge, sensor data and disposition data may comprise a training set for the machine learning 6602 which may be supplemented by human input using the system user interface 6504, to provide data regarding solutions that had worked in similar situations in the past, recommendations and the like. This information may be provided to an improvement recommendations engine 6622 that may provide recommendations to a store, produce manager, distribution center personnel, and the like. In an illustrative example, if arriving items spending a longer time on the receiving dock before being placed in the cooler is correlated with a lack of a produce manager at receiving, a recommendation may be made to a store to have a produce manager on hand at receiving. In an illustrative example, stores with cases showing high variability may be correlated with case locations near the store doors and higher disposition rates for the items placed in those cases. For these stores, a recommendation may be made to reposition the case, move produce back to the cooler more frequently and the like.

In embodiments, the sensor recommendation engine 6614 may incorporate back-end knowledge about a given store when making recommendations regarding the deployment of micro-climate sensors 212. In an illustrative example, additional sensors may be added to shipments headed for a location where this is a distance between the loading dock and cold storage above a given threshold. In another illustrative example, additional sensors may be added to produce being shipped to a location with a large cooler to allow ongoing monitoring while the produce is in storage. This information may enable the identification of goods that are in storage long term and whether they are retaining their freshness, seeing temperature cycles, and the like.

The disposal recommendation engine 6612 may include sliding compliance metrics based on data from external sources such as weather conditions (both local and at source location for item), seasonality, local social variants such as holidays, strikes, and the like, external events such as local traffic jams, local construction, war, and the like. In an illustrative example, the level of quality at which at which discarding an orange is appropriate may be lower when oranges are out of season, or when there have been freezing temperatures in the locations from which the oranges are sourced. When the weather is good and the oranges are in season, the level of quality at which discarding an orange is appropriate may be higher as customers would expect top quality in those conditions. In an illustrative and non-limiting example, local social variants such as a strike or local construction/traffic jams may reduce accessibility to, and sales at, a given location, potentially resulting in higher levels of disposition of produce at affected sites. In an illustrative and non-limiting example, a store may stock up on certain items related to a local event (e.g. a state fair) or a holiday associated with a store's customer demographics (Portuguese Festival). Depending on sales, there may be higher than normal discards related to the higher levels of inventory.

In embodiments, the rank at which an item need be pulled from the shelf may vary with the time of year, e.g., in-season produce may a higher level of quality compared to an out-of-season produce. The artificial intelligence circuit 6604 may utilize the learnings from the machine learning circuit 6602 to evaluate images as they are received to identify a quality ranking which is used. This quality ranking may be used by the disposal recommendation engine 6612 together with disposition rules from the rules database 6608, and data from micro-climate sensors 212 associated with items of sale along the supply chain or located in-store, disposition histories for the item type, store type and the like, to determine a recommendation for the disposition of an item. Recommendations for the disposition of an item may include donation of food to a shelter or food bank, restocking of the item as it is still in saleable condition, confirmation of the decision to discard the item, and the like.

The machine learning circuit 6602 may be provided with a set of test data including transport data, in-store data, images, order history, sales data, order data, micro-climate sensor 212, and data about the back room. In embodiments, the machine learning circuit 6602 may use unsupervised learning such as clustering as well as supervised learning including classification and regression. Techniques may include k-means and k-medoids, hierarchical clustering, Gaussian mixture models, hidden Markov models, self-organizing maps, fuzzy c-means clustering, subtractive clustering, support vector machine (SVM), boosted and bagged decision trees, k-nearest neighbor, Naïve Bayes, discriminant analysis, logistic regression, and neural networks, linear models, non-linear models, regularization, stepwise regression, adaptive neuro-fuzzy learning, genetic algorithms, Bayesian networks, deep learning techniques, decision trees, and the like. In embodiments, the machine learning circuit 6602 may also allow for the input from a human regarding interpretation of the data, recommendations about specific actions, additional information regarding local events, that is influencing the data, and the like. The machine learning circuit 6602 may be trained iteratively as new variants are identified, as new products are introduced, as recommended actions are implemented, the results may be fed back into the machine learning circuit 6602. In an illustrative example, the machine learning circuit 6602 may be trained to identify moisture droplets and condensation by training on pictures combined with information regarding acceptability for disposition. Identification of acceptability may be input by a store manager by ranking images or by selecting a defined quality based on a scale developed by the machine learning system. In embodiments, the machine learning circuit 6602 may be trained to identify open packaging (either natural or manmade (e.g., a cob of corn or a banana)) using a series of images. In embodiments, the machine learning may be trained to identify between examples of customer mishandling, transport mishandling, and employee mishandling based on a training set including data and human input regarding the cause (e.g. item left out by customer, item overripe on arrival, packaging cut during unpacking of the case, and the like).

In embodiments, the sensor recommendation engine 6614 may incorporate back-end knowledge about a given store when making recommendations regarding the deployment of micro-climate sensors 212. The sensor recommendation engine 6614 may utilize the quality ranking, disposition history 6610, data from in-store and micro-climate sensors 212, and the rules database 6608, together with information regarding the outgoing shipment, to recommend the placement of micro-climate sensors 212 in a specific outgoing shipment to a given store. In embodiments, a portion of the micro-climate sensors 212 may have default locations based on either valuable items (e.g., high volume or high gross margin), items that are intrinsically sensitive to environment (e.g., as leafy greens, berries, bananas, avocados, meat, seafood, and the like) based on time of year and seasonality (e.g., strawberries in warm weather months), and the like. In embodiments, recommendations for positioning of a portion of the micro-climate sensors 212 may be partially based on upcoming sales at the receiving store and the potential for over-orders and FIFO issues. In embodiments, recommendations for positioning of a portion of the micro-climate sensors 212 may be based on disposition history at the recipient location. For example, if a store is throwing away an unexpectedly large number of over ripe avocados, the system may recommend placing a micro-climate sensor 212 in with the avocados to assist in identifying possible factors contributing to the large number of unsold, over-ripe avocados. For example, a micro-climate sensor 212 located with the avocados may identify temperature-cycling during transit, a long wait at an ambient temperature receiving dock before movement to a store's produce cooler, unexpectedly high temperatures while the avocados are on the shelves, or the like.

In embodiments, recommendations for positioning of a portion of the micro-climate sensors 212 may be based on aspects of the receiving location such as volume and velocity of an item at that location, backroom size at store, cooler capacity, frequency of deliveries of goods to that location, culling or disposition strategies or SOP at the receiving location, store mark down and discount strategy, market positioning (premium vs. discount), and the like. Recommendations for positioning of a portion of the micro-climate sensors 212 may be based on the transportation being used, transport vehicle carrying capacity and infrastructure (e.g. cooling capacity), transport route and number of stops, store's location along the route, and the like. In embodiments, recommendations for positioning of a portion of the micro-climate sensors 212 may be based on customer buying patterns at a particular location or for a specific chain, local food offered, weather at that location, holidays, local competitors, and the like. A store might want to track these items more closely to better understand timing of sales, product quality and the like as input to improve future ordering.

In embodiments, recommendations for positioning of a portion of the micro-climate sensors 212 may be based on transport characteristics such as length of transport, number of prior deliveries during trip, location in the transport (e.g., right next to the door), and the like. References to position of a portion of the micro-climate sensors 212 may also include a recommendation regarding the number of micro-climate sensors 212 to include in a particular shipment. The number of sensors may be based on the size of the shipment, the types of items being shipped, transport characteristics (more sensors if it will be that last load to be delivered), and the like.

In embodiments, the artificial intelligence 6604 may identify unexpected dispositions and, if possible, identify probable underlying cause(s). Unexpected dispositions may include the disposal of a shelf stable item before its expiration date, a large number of the same types of items being disposed of for ripeness issues, and the like.

The rules database 6608 may include a plurality of rules and algorithms to determine a probable cause for unexpected or non-compliant disposal. Rules and algorithms may incorporate data such as: input from point of sale information; input from inventory and ordering systems; external events; historical data regarding disposition based on that location, or item type (either at that location or across multiple locations), number of items, and the like; regulations, policies, etc.; and the like. In an illustrative example, a single frozen pizza being discarded prior to sell-by date may be determined to be the probable result of customer mishandling (e.g. removing from freezer and leaving elsewhere in store). In another example, an entire case pallet of strawberries being thrown away may indicate issues in the product ordering, product handling, transport issues of the like, the most probable issue being identified based on the larger data set including micro-climate sensor data, product ordering data, delivery data, any discrepancies between ordered product and delivered product, cross store data on similar product from the same supplier, and the like.

In embodiments, the artificial intelligence 6604 may include data regarding natural events such as the season and the weather in the evaluation of a disposition determination. In an illustrative example, a store may have stocked up on watermelon for the beginning of summer but the weather was unexpectedly cold. The resulting drop in sales from the cold and the higher than average purchasing combined may provide the explanation for a higher than average liquefaction of watermelon. In another illustrative example, oranges may be saleable at lower levels of quality in the off-season whereas the highest levels of quality must be maintained when they are in season.

In embodiments, the quality rules applied by the artificial intelligence 6604 may vary by customer and location in the supply chain. Different locations may have different minimum quality requirements based on information such as local regulations, customer demographics, chain or store mandates, and the like. For example, different stores or chains having different minimum quality requirements. Acceptable quality levels may vary based on location in the supply chain. For example, a given level of ripeness may be acceptable at a store's receiving engine given velocity of that item in the store but not for at an in-take system at the distribution center given the additional intervening time and transport before availability for customer sale.

In embodiments, rules may include input regarding social events such as national holidays, supplier strikes, local events, weather, strikes, actions by other retailers, disruptive events such as wars, traffic jams, nearby construction, and the like. In an illustrative example, stock of cranberries may be increased in mid-November to meet the demand at Thanksgiving. However, once the holiday has passed, remaining inventory may result in higher than normal disposition levels in the future. In another illustrative example, if over-all sales fall due to near-by construction limiting access to the store, there may be an increase in the disposal of highly perishable goods until the impact of the construction on sales is used in decisions regarding ordering of new stock. If over-all produce sales fall due to the opening of a competitor nearby information regarding the quality of the store's produce at receipt and disposition may be used in input in developing a strategy to address the newly opened competitors impact on sales.

As a result of the evaluation, the system may provide feedback to the employee doing the dispositioning. For example, if an item appears to be in good condition but is not saleable for some reason, such as a sell-by date has just passed, depending on the type of item, a recommendation may be made to donate the item rather than disposing of it. In embodiments, if an item is approaching its sell-by date and is at marginal quality, a mark-down sticker might be recommended. In an embodiment, a store may have different criteria for disposal of different fruits and vegetables that may vary with season of the year, store location, and the like. These rules may include thresholds for time in store, presence of moisture in the packaging, a degree of ripeness and the like. If an item being disposed of does not meet these requirements, the system may provide a recommendation that the items not be disposed of, instructions to help the employee better understand the criteria for disposal may be provided, a request for an override, a request for additional information regarding the reason for disposal, and the like.

In embodiments, data from the disposition system 1004 may provide management with data regarding compliance with rules regarding product logistics, store merchandizing, storage and disposition. Compliance may include applying mark-down stickers close to the date code, produce being kept within an appropriate range, and the like.

Data from sensors associated transport and information regarding the receiving dock temperature and time between receipt and arrival at the produce cooler might provide insight into possible handling issues resulting in the loss of product. If a bag of lettuce is being thrown away because the lettuce has started to brown but it is still within the date code and there is indication of moisture within the package it indicates that the lettuce was held at an elevated temperature or there was a vendor issue with the product. Referencing associated sensor data can help resolve whether is an in-store issue such as higher than acceptable temperature in the cooler or on the shelf or whether it is a vendor issue because it is being seen at multiple stores.

In embodiments, the sensor recommendation engine 6614 may provide recommendations regarding the placement of micro-climate sensors 212 into goods to be shipped to a site. Recommendations may include specific types of sensors 1502 to be deployed, locations in which to deploy sensors, number of sensors to deploy, and the like. In embodiments, the data from the micro-climate sensors 212 may provide data on transport conditions in addition to any transport sensors 132. In embodiments, this may assist in identifying whether transportation conditions are contributing to increase waste for certain items. In an illustrative and non-limiting example, the presence of a micro-climate sensor 212 in a container of strawberry clam shells may reveal that the strawberries are experiencing high levels of heat and humidity during transport, thus shortening their store shelf life. Additional transport sensors 132 may identify that the door was left open too long, the strawberries were packed too closely to the door, or the like. Alternatively, the data provided by the micro-climate sensor 212 may confirm that the strawberries were kept in appropriate conditions during transport. This data may assist and identifying potential conditions at a supplier or the distribution center as influencing the shelf life of an item such as temperature cycling, high humidity, high temperature, and the like.

The system server 1010 may leverage historical data and/or data from a plurality of stores to evaluate product trends. For example, if multiple locations are seeing higher levels of disposal for a certain item type but the distribution, transport, and store environment data is within specification for that product, there may be an issue with a supplier that needs to be addressed. If there are higher levels of discards of a certain item type at one store relative to similar stores, differences in handling, store layout, personnel and the like to help identify contributory factors in the higher discard rate. Patterns of produce items deviating from natural saleable state may be identified such as high amounts of opened corn on the cob may indicate customers are evaluating the corn and finding it unsatisfactory, resulting in a recommendation to review incoming quality from that supplier. In an illustrative example, high levels of discards of strawberries having unexpectedly short shelf life might be detected across a number of stores. After correcting for variability amount stores, the system server might determine that there are potential problems with the incoming quality of the strawberries to the distribution center. In embodiments, the data from multiple stores, discard documentation, transport and storage conditions and the like may be used, for example in negotiations for a vendor credit from supplier of the strawberries, renegotiating vendor contracts, redefining acceptance criteria for product coming from that vendor and the like. In embodiments, the data from might trigger internal reviews of process and product at the distribution center directed to how the strawberries are being received, quality of strawberries on hand at the distribution center, and the like.

The system server 1010 may be used to identify theft based on discrepancies between arrival data and the combination of point of sale data and discard data. The system server 1010 may be used to identify customer behaviors causing shrinkage such as an item removed from the freezer and left on a bread shelf, a cereal box with both inner and outer packaging opened indicating customer snacking, and the like. Merchandizing effectiveness may be evaluated. Green on potatoes may indicate that the potatoes are not being properly rotated in the display. Bags of "pay by the pound" produce which are only partially filled may indicate that the packing size is incorrect and the customers are redistributing product between bags to obtain the desired amount.

Figure 70:
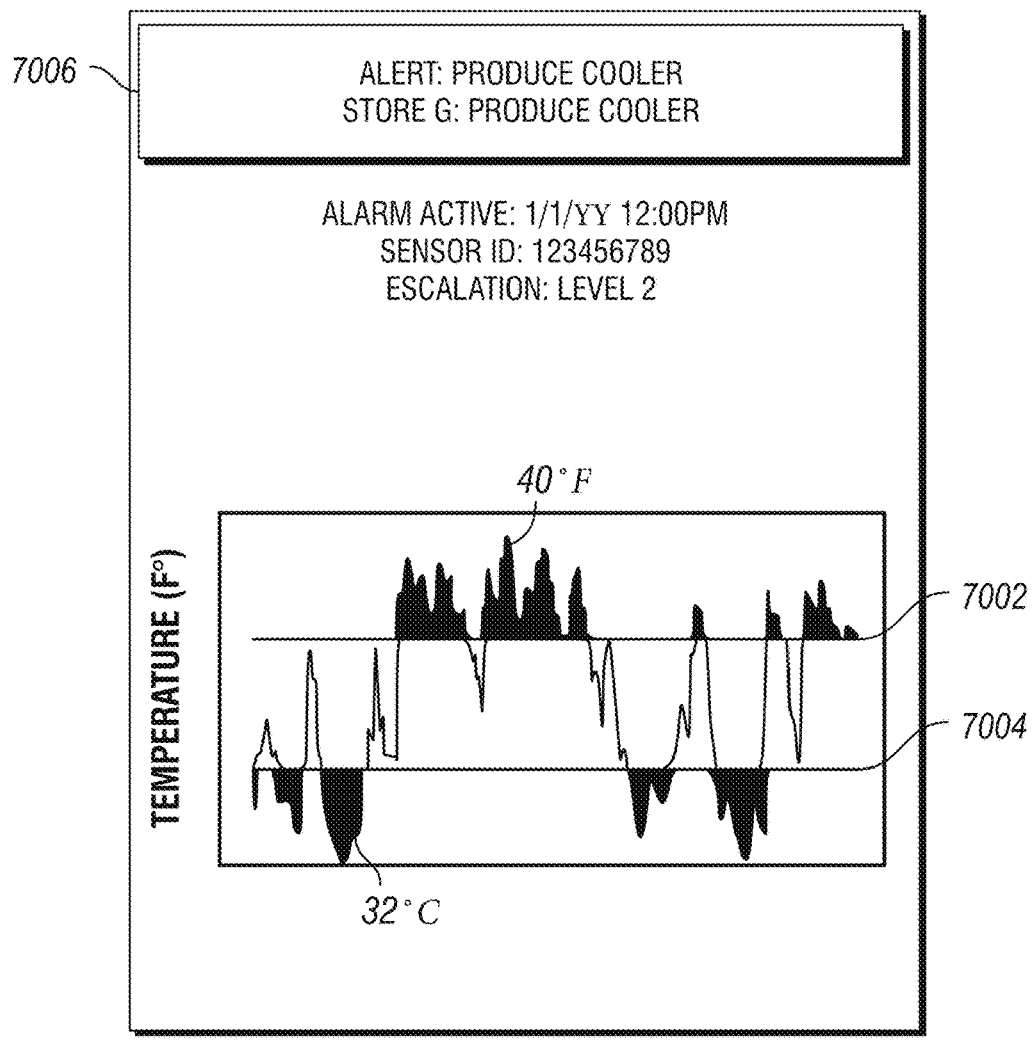
FIG. 70 shows an example of an alert generated by an instore sensor.
Figure 71:
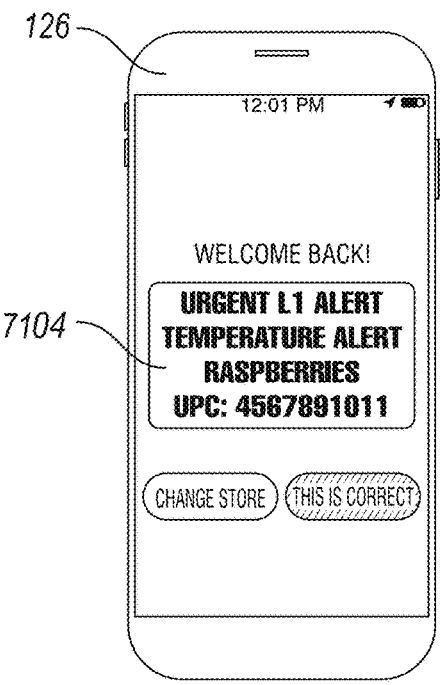
FIG. 71 shows an example of an alert generated by an instore sensor.
Figure 72:
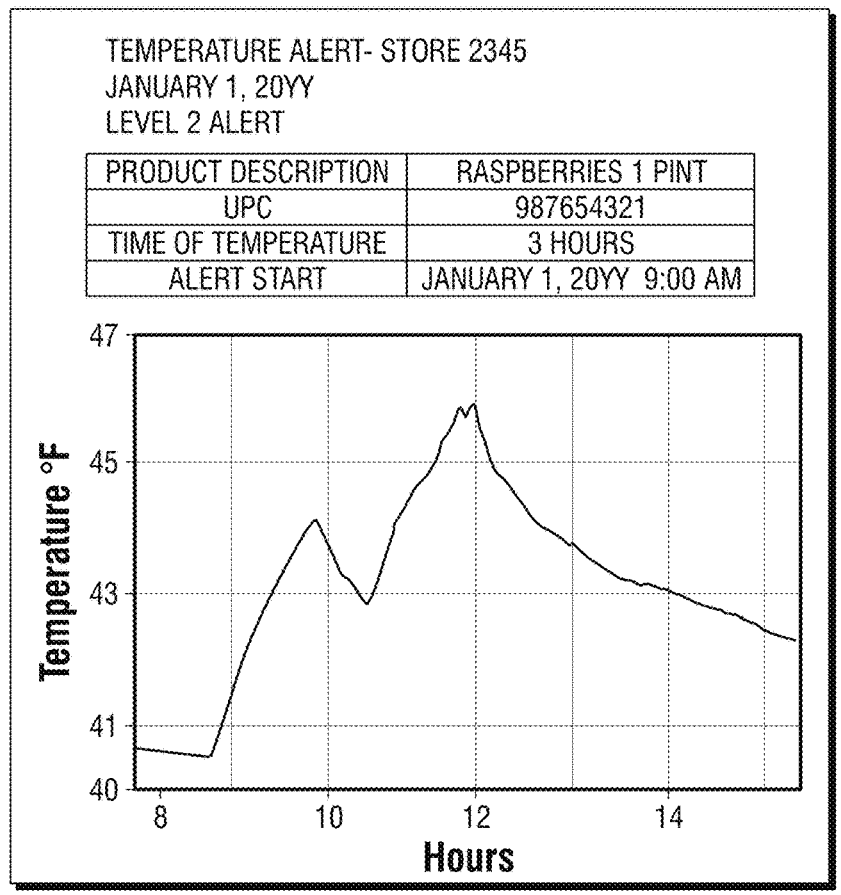
FIG. 72 shows an example of underlying data associated with an alert.
Figure 73:
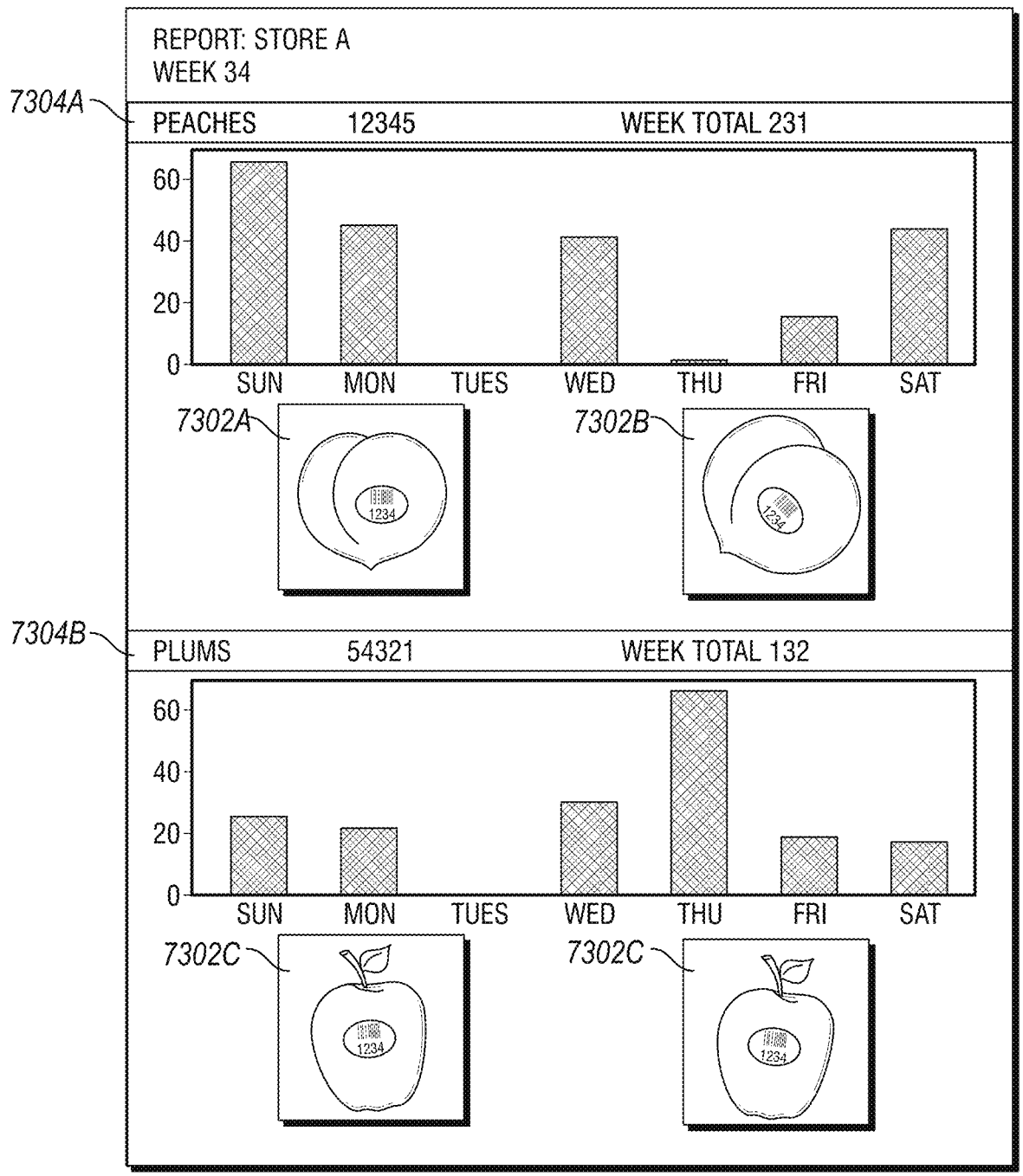
FIG. 73 shows an example of a store report.
Figure 74:
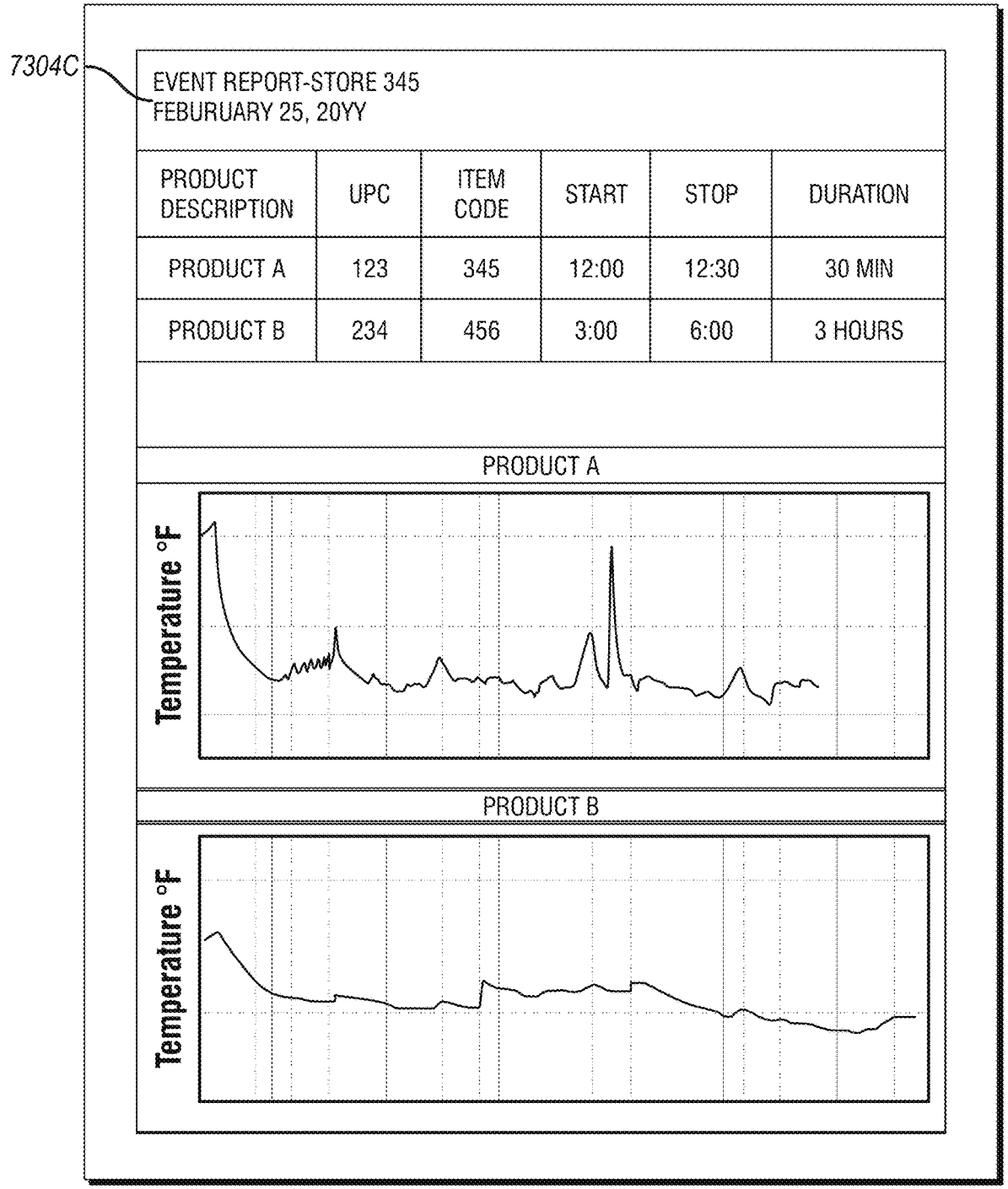
FIG. 74 shows an example of an event report.
Figure 75:
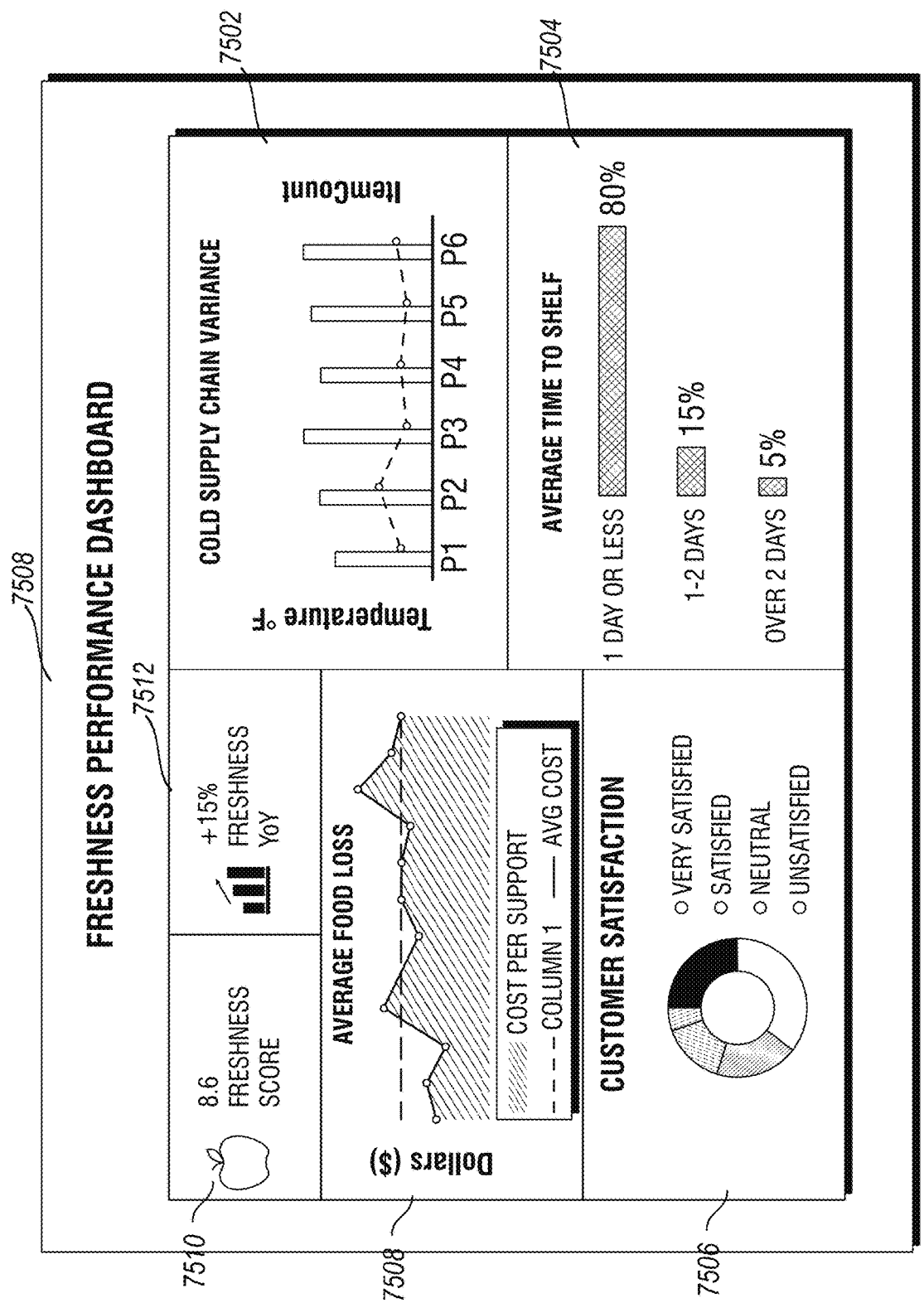
FIG. 75 shows an example of a dashboard.
Figure 83:
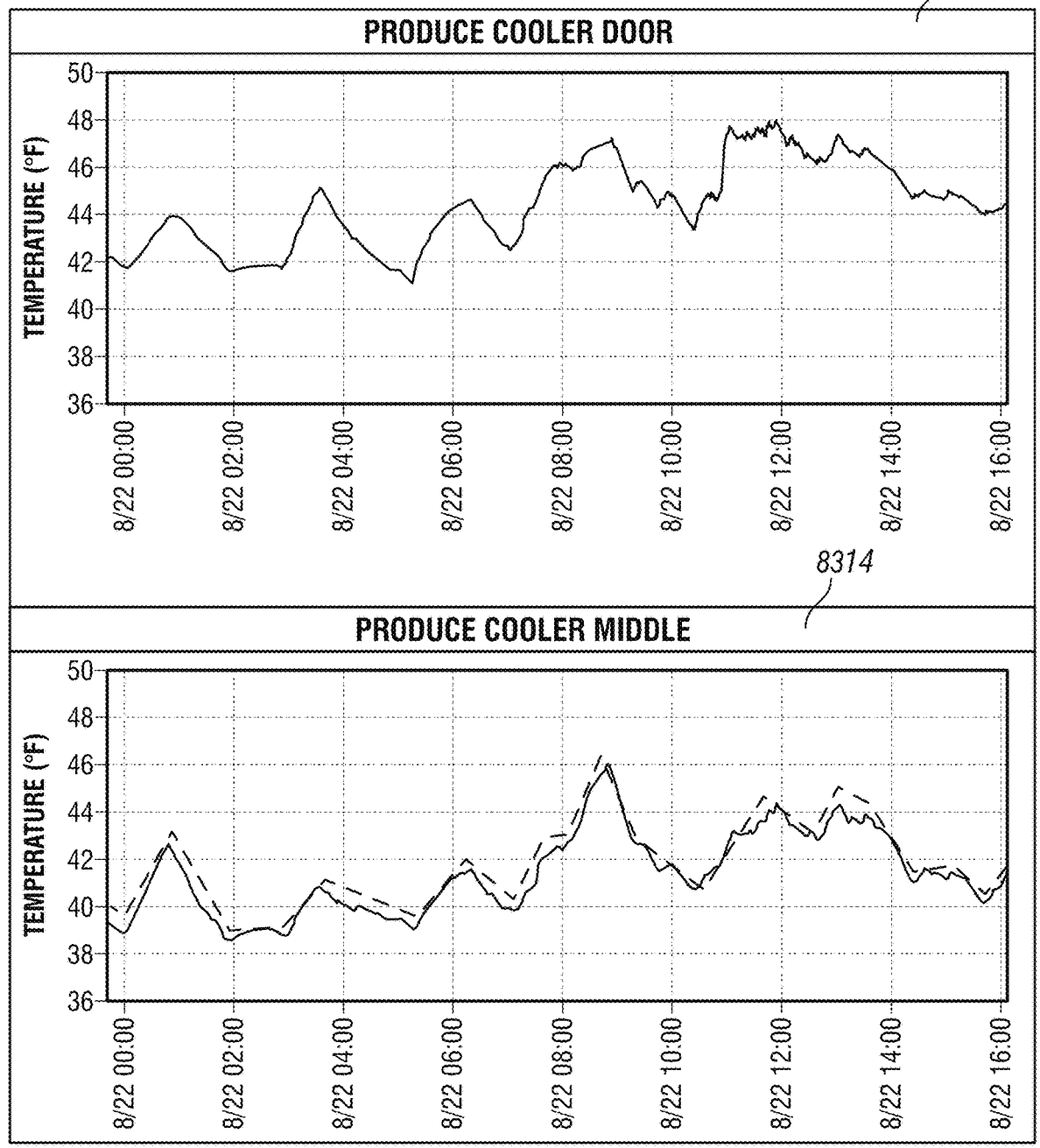
FIG. 83 depicts an example of a report that may be generated by the system described herein.

In an illustrative use case, at a distribution center 116, a plurality of micro-climate sensors 212 may be included with a case of product in a shipment bound for a given store. The micro-climate sensors 212 may track temperature, humidity, movement, and light. As the sensor moves with the case of product the data produced may enable key transition points and length of time at a given location. For example, if a high amount of movement is seen together with an elevated temperature, and then is followed by no movement at a lower temperature it may be inferred that the product has been moved to a produce cooler. If this is followed by a little more movement and a slight increase in temperature followed by a decrease in temperature it may be inferred that the produce was brought to the sales floor, but then the product was not placed on the shelf but returned to the cooler. After a time period, the product may see additional movement, an increase in temperature, and in addition, light is now present. It may be inferred that the product is now on a shelf in the store. This real-time status tracking may enable real-time corrective action. In an example, if the product is stationary on the shelf and the temperature begins to crest above a threshold (e.g., 45 degrees) the system may send a text alert to the store and a product manager for that product informing both that the product is going out of temperature and they should take corrective action (e.g. pull the strawberries off the display and place back in the produce cooler). In another illustrative example (FIG. 70) if the temperature in a produce cooler exceeds an upper threshold 7002, a lower threshold 7004, or both thresholds, an alert 7006 may be sent to one or more individuals in a situation where they might check on the cooler (e.g. is a door ajar, is the overall cooling profile of the produce cooler incorrect, and the like) and/or initiate maintenance, repairs, or a change in store policy. In another alert (FIG. 82) an alert 8210 may be sent if a product velocity is less than a threshold (i.e., if time on the shelf or deployed 8212 exceeds a threshold). The alert 1206 may include information about the environment (e.g., temperature 8214 in this example but not limited to temperature) seen during that time relative to a standard operating procedure limit 8216. An alert 1206, 8210, 7104 may be sent to mobile devices (FIG. 71) associated with one or more store associates. The ability to take real-time corrective action may allow product that might otherwise spoil or be left in storage until after the "sell-by" date to be "saved." Based on this information, changes may be made to the location, additional training provided to employees and the like. Referring to FIGS. 72 and 83, it may be possible to drill down into the details on the alert to see the underlying data (FIG. 72) on the product as well as underlying data on related infrastructure data such as temperature by a cooler door 8310 and temperature in the middle of a cooler 8312.

In embodiments, the system server may be used to analyze trends in store data over time and identify how trends change in response to changes in the product delivery network, changes in store personnel, changes in store infrastructure and the like. This information may assist in predicting how another store might respond to similar changes. In an illustrative example, a system server 1010 might evaluate data relating to product ordering, sales, and waste to identify changes corresponding to a change in delivery schedule such as whether there are increases in product waste with decreases in product delivery. The system may determine whether a change results in a net benefit (overall reduced costs) to the store, and whether a similar change at a different location would result in a similar benefit.

In embodiments, evaluation of data might assist in identifying unrecognized issues in infra-structure. In an illustrative example, fluctuations in temperature seen by products in a freezer in combination with freezer door data indicating that the doors have remained closed, may indicate problems with the freezer. Differences in temperature among multiple products in the freezer may indicate unacceptable temperature gradients within the freezer. In some embodiments, the system might initiate communications with a manufacturer or equipment service in addition to alerting a store manager, thus reducing e-mail overhead for the store manager. In embodiments, the system may recommend changes to the freezer settings based on the data.

Figure 80:
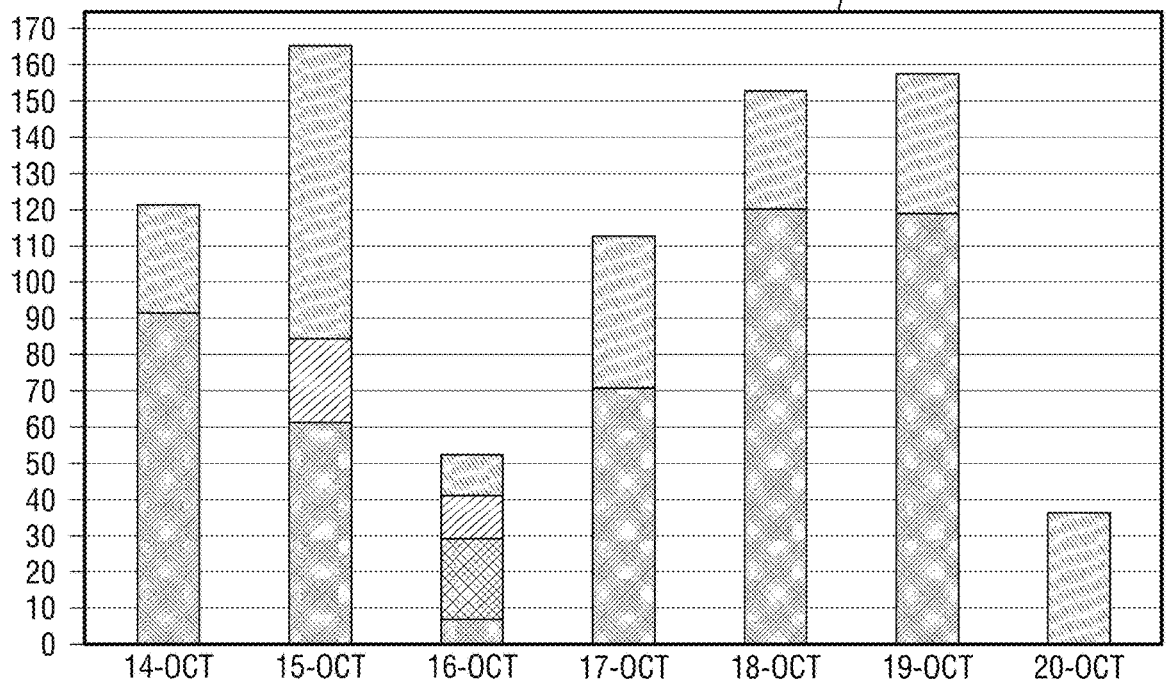
FIG. 80 depicts an example of a report that may be generated by the system described herein.

In embodiments, the report engine 6618 may provide reports to individuals in different roles identify store statistics, data regarding discarded items, areas of possible concern based on received data and the like. Reports may include highest velocity items (items that are in sale and likely have microdata), differences from previous weeks reports, graphs of fixed sensor temperatures, product sensors, and the like. Referring to FIGS. 80, 81, and 73-75, examples of reports are shown. Referring to FIG. 80, a report 8010 may include a visible depiction 8012 and table summary 8014 of number of items being disposed of and the underlying cause for disposition such as visibly spoiled 8016, store damage 8018, failure of refrigeration 8022, received in poor condition 8024, out of date 8026, donation 8028, and the like. Referring to FIG. 81, a report 8110 for a given time period may include a table describing the items dispositioned for a variety of items of sale. The reports might be filtered or sorted by item description 8114, item code 8116, item category 8118, total dispositioned 8120, and the like. Referring to FIGS. 73074, example reports 7304A, 7304B, 7304C may include detailed data and images 7302A, 7302B, 7302C, 7302D regarding a specific item of sale, SKU, or the like. Reports may include data from underlying sensors. Reports may include detailed comparisons of multiple products. Reports may include information regarding the overall performance of a store (FIG. 75) including variance in the cold supply chain 7502, average time to shelf 7504, customer satisfaction 7506, average food loss 7508, current freshness score 7510, year over year freshness improvement 7512, and the like. Reports may include recommendations for next steps, and the like. Reports may include curated examples of discarded items where the items were being inappropriately discarded. Reports may include recommendations for personnel training regarding discard criteria, acceptance criteria, and the like.

Figure 77:
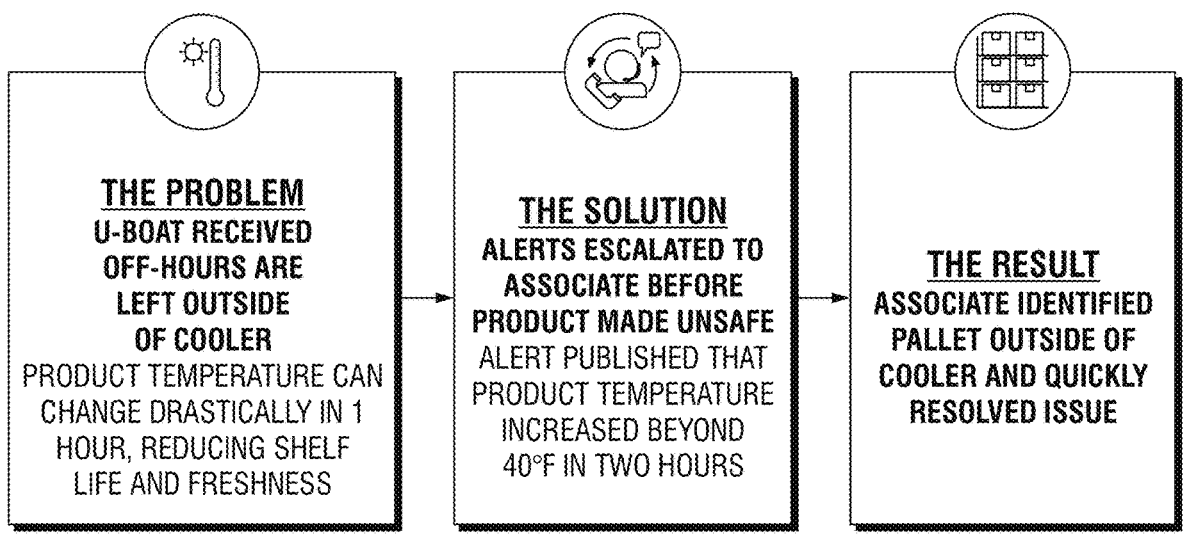
FIG. 77 depicts an example of a problem, how it is identified by the system described herein, and the problem resolution.

Referring to FIG. 77, an example of a problem, how it is identified by the system described herein, and the problem resolution is depicted. In this illustrative and non-limiting example, a U-Boat received off-hours is left outside the produce cooler. This is a problem because product temperature can change drastically—potentially resulting in an increase in temperature that may reduce product shelf-life. The system of this disclosure may identify a deviation from SOP, in this example a temperature exceeding a threshold over a defined time period. The system then provides alerts to a store associate who can take action, in this case by moving the U-Boat in question into the produce cooler.

Figure 76:
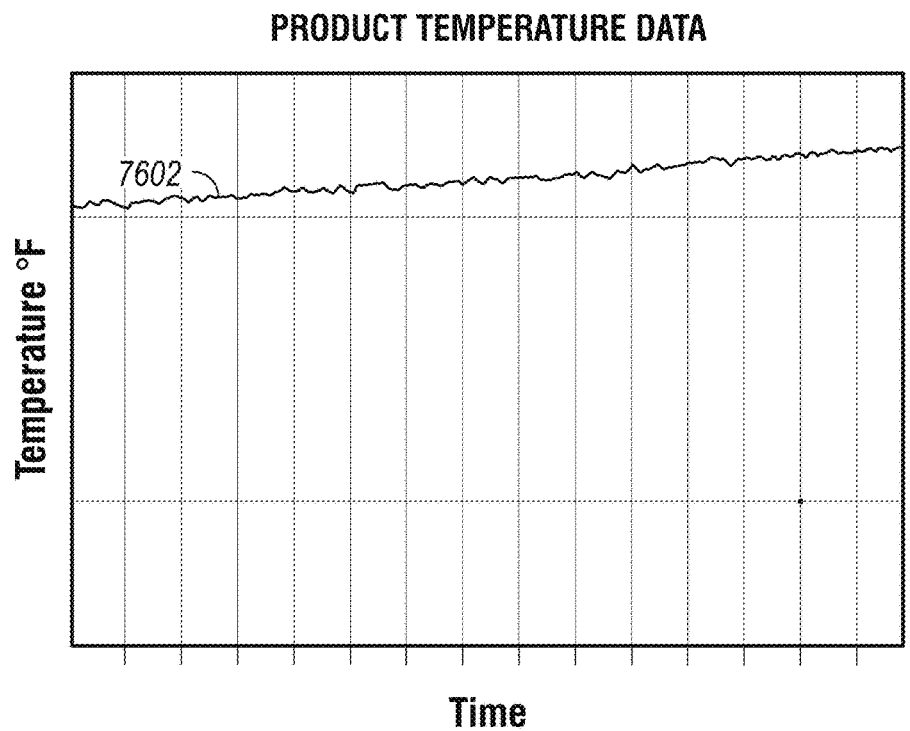
FIG. 76 shows an example of a product temperature profile.

Referring to FIGS. 76 and 78, example temperature profiles are depicted 7602, 7802A, 7802B, 7802C. FIG. 76 depicts a temperature profile for an individual product. FIG. 78 depicts temperature profiles 7802A, 7802B, 7802C at different locations in a produce cooler. It may be seen that the temperature profile by the front door of the cooler is consistently elevated relative to the other locations in the produce cooler.

Figure 79:
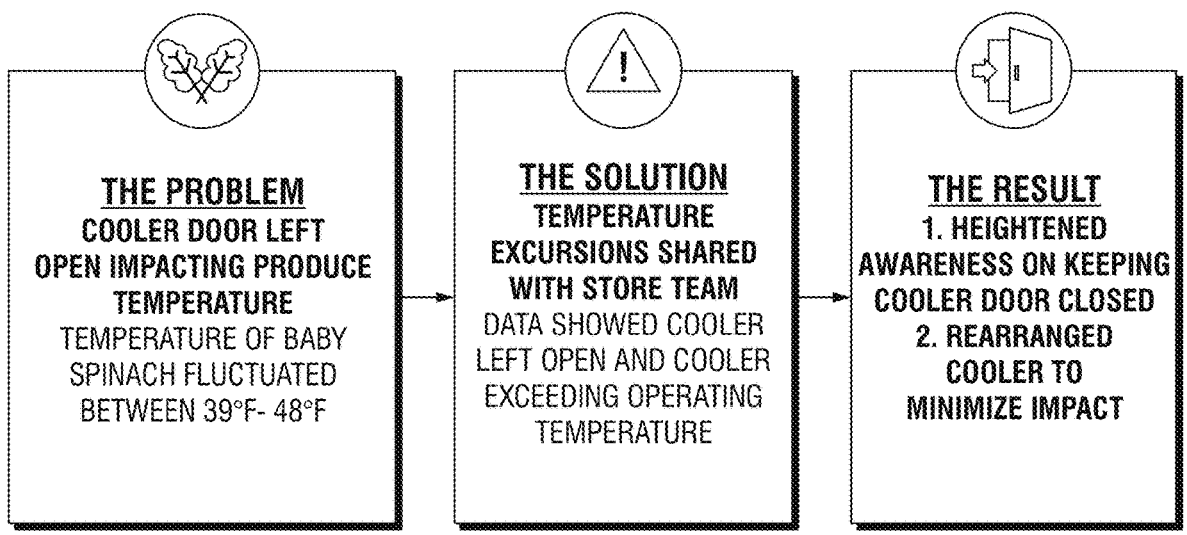
FIG. 79 depicts an example of a problem, how it is identified by the system described herein, and the problem resolution.

Referring to FIG. 79, an example of a problem, how it is identified by the system described herein, and possible problem resolutions are depicted. In this illustrative and non-limiting example, a cooler door is left open, resulting in an increase in temperature of a product in the cooler. The system of this disclosure may identify a deviation from SOP, in this example temperature fluctuations seen by the product exceeding an SOP. As result of the information, there may be heightened awareness regarding keeping the cooler door closed; the produce cooler may be rearranged to locate product sensitive to temperature fluctuations farther from the door; and the like.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, circuits and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

Accordingly, by using micro-climate sensors to collect/generate product-flow data from items of sale and transforming the product flow data into flow analysis data, some embodiments of the system for product management may provide for improved insights, e.g., presentation of actionable items, as opposed to mere display of uncorrelated data, into the causes of deviations that reduce the commercial appeal of items of sale. Further, by generating deviation and/or alert messages, as described herein, some embodiments of the system for product management may provide for corrective actions, e.g., sale-improvement actions, actions to be taken in order to eliminate and/or reduce damage to an item of sale, which may in turn improve the likelihood that the item of sale will be purchased. Further still, by providing for the generation and/or collection of disposition data, some embodiments of the system for product management may provide for improved insight into the causal reasons items of sale are being disposed of prior to being purchased, which in turn, may provide for modification of a corresponding SOP to reduce the likelihood that future items of sale will be disposed. Further, the fresh score value provided by some embodiments of the system for product management may provide for an immediate and/or near immediate evaluation of the overall/cumulative quality, e.g., freshness, of items in a particular store, or across multiple stores. As will be understood, such an evaluation may provide for a store operator to readily detect problematic stores that may need adjustments to their corresponding SOP and/or further employee training. Further still, by capturing product flow data downstream of and/or including a distribution center, some embodiments of the system for product management may provide insights into portions of a supply chain that has been overlooked by traditional approaches. Further still, by capturing product flow data including a source, such as a farm, the data can be used in negotiations regarding the quality of the product received from the vendor as it will be possible to verify that the item of sale had been handled according to SOP after it left the vendor so that if there are high levels of disposal before the sell by date there may be issues at the vendor. Further still, by reusing the micro-climate sensors, it becomes feasible to deploy them for low margin, highly environmentally sensitive items of sale.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The invention claimed is:

1. A repository device for decommissioning a plurality of micro-climate sensors for generating product flow data for each of a plurality of items of sale flowing through a supply chain, the repository device comprising:
   an opening for receiving at least one micro-climate sensor of the plurality;
   at least one space for storing the at least one micro-climate sensor;
   a plurality of sensors operative to detect a presence of the at least one micro-climate sensor;
   a sensor decommission circuit structured to generate a decommission command value in response to detection of the at least one micro-climate sensor via the plurality of sensors;
   a backhaul initiation circuit structured to generate an initiate backhaul command value structured to initiate a pickup of the at least one micro-climate sensor from the repository device; and
   a backhaul provisioning circuit structured to transmit the initiate backhaul command value.

2. The repository device of claim 1, further comprising a sensor communication circuit structured to transmit the decommission command value to at least one of:
   the at least one micro-climate sensor; or
   a server.

3. The repository device of claim 1, wherein, in response to the decommission command value, the at least one micro-climate sensor enters a decommissioned mode.

4. The repository device of claim 1, wherein the decommission command value is structured to insert a marker in the product flow data for the at least one micro-climate sensor.

5. The repository device of claim 4, wherein the marker denotes an end of valid product flow data.

6. The repository device of claim 1, wherein the plurality of sensors includes at least one of:
   magnetic sensors;
   optical sensors;
   pressure sensors; or
   RFID sensors.

7. The repository device of claim 1 further comprising:
   a status circuit structured to determine and transmit a status of the repository device.

8. The repository device of claim 7, wherein the status is full, wherein full indicates the repository device contains a maximum number of micro-climate sensors.

9. The repository device of claim 7, wherein the status is empty, wherein empty indicates an absence of micro-climate sensors.

10. The repository device of claim 1 further comprising:
    a sensor identification circuit structured to determine and transmit an identification value of the at least one micro-climate sensor in response to detection of the at least one micro-climate sensor.

11. A method of decommissioning a plurality of micro-climate sensors for generating product flow data for each of a plurality items of sale flowing through a supply chain, the method comprising:
    receiving at an opening of a repository device, at least one micro-climate sensor of the plurality;
    detecting, via a plurality of sensors, a presence of the at least one micro-climate sensor;
    generating, in response to detecting the presence of the at least one micro-climate sensor, a decommission command value; and
    generating and transmitting an initiate backhaul command value structured to initiate a pickup of the at least one micro-climate sensor from the repository device.

12. The method of claim 11, further comprising transmitting the decommission command value to a server.

13. The method of claim 11, further comprising decommissioning the at least one micro-climate sensor in response to the decommission command value.

14. The method of claim 11, further comprising inserting a marker in the product flow data for the at least one micro-climate sensor in response to the decommission command value.

15. The method of claim 11, further comprising storing the at least one micro-climate sensor in a space of the repository device.

16. The method of claim 11, wherein the plurality of sensors includes at least one of:
    magnetic sensors;
    optical sensors;
    pressure sensors; or
    RFID sensors.

17. The method of claim 11 further comprising:
    generating and transmitting a status of the repository device.

18. The method of claim 17, wherein the status is full, wherein full indicates the repository device contains a maximum number of micro-climate sensors.

19. The method of claim 17, wherein the status is empty, wherein empty indicates an absence of micro-climate sensors.

20. The method of claim 11 further comprising:
identifying and transmitting an identification value of the at least one micro-climate sensor in response to detection of the at least one micro-climate sensor.

21. The method of claim 11 further comprising:
in response to the initiate backhaul command value, removing the at least one micro-climate sensor from the repository device.

* * * * *

UNITED STATES PATENT AND TRADEMARK OFFICE
CERTIFICATE OF CORRECTION

PATENT NO. : 11,295,256 B2
APPLICATION NO. : 17/028498
DATED : April 5, 2022
INVENTOR(S) : Nicholas L. Whitman et al.

It is certified that error appears in the above-identified patent and that said Letters Patent is hereby corrected as shown below:

On the Title Page

Item (54), in Column 1, in "Title", Line 2, delete "MICROCLIMATE" and insert -- MICRO-CLIMATE --.

In the Drawings

On sheet 11 of 58, in figure 15, Line 2, delete "MICOR-CLIMATE" and insert -- MICRO-CLIMATE --.

In the Specification

In Column 1, Line 2, delete "MICROCLIMATE" and insert -- MICRO-CLIMATE --.

In Column 44, Line 24, delete "73074," and insert -- 73-74, --.

Signed and Sealed this
Eleventh Day of April, 2023

*Katherine Kelly Vidal*

Katherine Kelly Vidal
*Director of the United States Patent and Trademark Office*